(12) United States Patent
Shahar

(10) Patent No.: US 6,603,904 B1
(45) Date of Patent: Aug. 5, 2003

(54) ALL OPTICAL NARROW PULSE GENERATOR AND SWITCH FOR DENSE TIME DIVISION MULTIPLEXING AND CODE DIVISION MULTIPLEXING

(75) Inventor: Arie Shahar, Moshave Magshimim (IL)

(73) Assignee: Jaffalight Holdings LLC, West Harrison, NY (US)

( * ) Notice: Subject to any disclaimer, the term of this patent is extended or adjusted under 35 U.S.C. 154(b) by 245 days.

(21) Appl. No.: 09/819,589

(22) Filed: Mar. 28, 2001

(51) Int. Cl.[7] .................................................. G02B 6/34
(52) U.S. Cl. .............................. 385/37; 385/3; 385/18; 385/1; 385/16; 385/24; 359/115; 359/124
(58) Field of Search ............................ 385/1–3, 15–18, 385/24, 37; 359/115, 124

(56) References Cited

U.S. PATENT DOCUMENTS

| | | | |
|---|---|---|---|
| 3,698,795 A | 10/1972 | Flint .......................... 350/162 R |
| 4,426,130 A | 1/1984 | Knop ....................... 350/162.2 |
| 5,060,305 A | 10/1991 | Pruenal et al. ............... 359/140 |
| 5,710,845 A | 1/1998 | Tajima .......................... 385/16 |
| 5,739,933 A | 4/1998 | Dembeck et al. ............ 359/117 |
| 5,900,956 A | 5/1999 | Cotter .......................... 359/139 |
| 5,963,683 A | 10/1999 | Goorjian ....................... 385/16 |
| 6,023,360 A | 2/2000 | Morioka et al. ............. 359/123 |
| 6,081,634 A | 6/2000 | Attard .......................... 385/16 |
| 6,172,811 B1 | 1/2001 | Wood et al. .................. 359/573 |
| 6,198,864 B1 | 3/2001 | Lemoff et al. ................. 385/47 |
| 6,204,944 B1 | 3/2001 | Uchiyama et al. ........... 359/123 |
| 6,215,570 B1 | 4/2001 | Ellis et al. ................... 359/158 |
| 6,236,775 B1 | 5/2001 | Nir .............................. 385/17 |

Primary Examiner—Robert H. Kim
Assistant Examiner—George Y. Wang

(57) ABSTRACT

An optical system for modulating and switching logical information-bits in optical communication networks and optical computers. The system includes at least one input, at least one interference device, and at least one output. The interference device receives radiation from the input along multiple orientations at different timings. The interference device produces one interference pattern from a group of different interference patterns so that it can produce a pattern according to the timings, and directs this pattern toward the one output. The output receives the interference pattern produced by the one interference device and selectively emits radiation from the system according to the interference pattern produced according to the timings. The system has two basic versions. In the first version the system operates as an all-optical modulator for generating very short pulses. The second version of the system operates as an all-optical switch. In both versions the system has two operational modes. In the first a control beam activates the system. In the second the system is self-activated. The narrow pulses that the system produces allow the use of Dense Time Division Multiplexing (DTDM) and the self-activating mode of the system allows using Code Division deMultiplexing (CDM) for switching and packet routing.

31 Claims, 27 Drawing Sheets

ALL OPTICAL NARROW PULSE GENERATOR AND SWITCH FOR DENSE TIME DIVISION MULTIPLEXING AND CODE DIVISION MULTIPLEXING

FEDERALLY SPONSORED RESEARCH

None

SEQUENCE LISTING OR PROGRAM

None

BACKGROUND—Field of Invention

The invention relates generally to the field of optical communication, particularly to generating and switching extremely narrow pulses. Such pulses are used generally for ultra-fast optical communication, especially for Dense Time Division Multiplexing (DTDM), Code Division Multiplexing (CDM), and Demultiplexing.

BACKGROUND—Prior Art

In optical communication networks there is a continuous demand for increasing the transmitted information (vocal, video and data) rate and capacity. Optical fibers used in optical networks have a great capability to transmit the required optical-information at high-rate and large-volume. On the other hand, there are several components in optical networks that limit the capability of the optical fibers to transmit high-rate and large-volume information and thus cause to bottlenecks in the optical networks. Such components are the optical modulators and the electronic switches. The optical modulators are limited in their capability to produce optical pulses (logical digital bits) at the desired width and speed and the electronic switches are limited in their capability to switch and route the optical information at the desired rate.

Two methods are used to increase the transmission rate in the optical networks. The first one is the Wavelength Division Multiplexing (WDM) or its improvement Dense Wavelength Division Multiplexing (DWDM). The second method is the Time Division Multiplexing (TDM).

WDM or DWDM methods increase the transmission rate by using parallel information channels. The information in each optical channel is carried by a different light frequency. These light frequencies are very accurate and well defined and are produced by Distributed Feedback Lasers (DFB) or by Distributed Brugg Reflector lasers (DBR). In Brugg reflection multiple reflections, usually received from a stack of multiple dielectric layers or from a grating along its plane, are all in phase. The light frequencies of the channels are combined together and are inserted into the input of a single optical fiber, which carries their information to its output. The combined light frequencies at the output of the fiber are received by the DWDM network, which separates them back to different parallel channels that each has a specific light frequency.

For example, if the bit rate at each information channel is at a frequency f and $\alpha$ channels are inserted to a single optical fiber, then the bit rate F at the fiber is $\alpha \cdot f$. At the other side of the fiber after the demultiplexing of the DWDM, the bit frequency of each channel is reduced back to f. A typical number for $\alpha$ is between 80 to 160 for WDM and up to 320 for DWDM. The number of channels used is limited for the following reasons:

1. The optical fiber has a limited bandwidth (F when it has good optical properties, such as low loss and low chromatic dispersion.

2. The light frequency separation between the different channels is $F/\alpha$. Increasing the number of channels $\alpha$ decreases the light frequency separation $F/\alpha$ between the channels. The light frequency separation $F/\alpha$ between the channels must be larger than the line width of the DFB or the DBR lasers which serve as light sources of the channels. Due to the limitation of the line width of these lasers, it is clear that the number of channels J is also limited. Currently the number of channels used (320) is reaching its maximum value.

While the WDM and the DWDM methods increase the information rate in the optical fibers by using parallel information channels, the TDM method is used to increase the bit rate in each channel. According to this method, the bits of several parallel channels having the same light frequency are interleaved in a predetermined periodic order to create a single serial data stream of a single channel. This method is very effective when using a buffer, which accumulates and compresses the data of several channels into a dense serial data stream of a single channel by reorganizing this data with suitable delays. However the bit rate of this method and others is still limited by the bit rate and duty cycle that the light sources (DFB and DBR lasers) can produce.

There are two techniques to produce light pulses which are used as, logical bits.

The first technique is to modulate the current injected to the DFB and DBR lasers. This technique, called direct modulation suffers from the following disadvantages:

1. It has a relatively low duty factor (repetition rate) due to long recovery time of the lasers.

2. It produces chromatic dispersions in the optical fibers due to broadening of the emitted spectral line of the modulated lasers. This is caused by spontaneous emission, jittering, and shifting of the gain curve of the lasers during the current injection.

Due to the above disadvantages, an alternative way or second technique of modulation is used. In this method the lasers are operated in a Continuous Wave (CW) mode. Separate modulators do the modulation of the radiation beams. These modulators are usually made from interference devices such as Mach-Zender's, directional couplers and active half wave-plates combined with polarizers and analyzers.

Applying modulating voltage that affects the electro-optical characteristics of the materials from which the modulators are made activates these devices. The electro-optical properties of these devices are used to produce phase shifts and polarization change. Such changes involve with creating and removing space charges, which change the density of the charge carriers within these electro-optic materials. The formation rate of the space charges is mainly dependent upon the speed and the magnitude of the applied voltage and can be in the order of sub nanoseconds. The charge removal is usually slower and is mainly dependent upon the relaxation time of these materials (lifetime of charge carriers) and can be relatively long. Thus the time-on of the modulation is much longer than the time-off of these modulators. Accordingly, the width of the pulses and the duty cycle of the modulation in this technique are mainly dependent upon the long off time of the modulators.

Today the highest bit rate that can be achieved is about 10 G bits per channel and is limited by the modulation rate of the modulators, the pulse width that they produce, and the switching time of the electronic switches. This bit rate is not sufficient even for the present needs and the demand for a capability to produce and rout faster bit rate will increase in the near future.

BACKGROUND—OBJECTS AND ADVANTAGES

Accordingly, one object of the invention is to provide a method and means for increasing the transmitted information rate and capacity for voice, video, and data.

Other objects are to provide:

an optical communication system for performing four cooperative functions to enhance data transmission speed: produce very narrow optical pulses in different parallel channels, multiplex the optical pulses of the channels into a single serial bit stream having a very high bit rate, transmit the optical pulse information at a very high bit rate, and demultiplex, at a very high speed, the serial pulse stream back into the original information channels;

an all-optical modulator for converting optical pulses into extremely narrow optical pulses for using in optical communication networks;

an all-optical modulator for converting optical pulses into extremely narrow optical pulses for using in Dense Time Division Multiplexing (DTDM) optical communication networks;

all-optical communication system including modulators in several different optical channels for performing three cooperative functions to enhance data transmission density and speed: converting optical pulses into extremely narrow optical pulses in different parallel channels, interleaving the optical pulses of the different channels into one dense serial optical stream of pulses to produce DTDM, and transmitting the pulses, at a very high bit rate, along an optical fiber;

an all-optical modulator for converting optical pulses into extremely narrow optical pulses;

such an an all-optical modulator that is activated by a control beam;

a self-triggered all-optical switch for converting, by demultiplexing, a high rate stream of serial optical pulses, at the output of a single optical fiber, into multiple information channels;

an all-optical switch that is activated by a control beam for converting, by demultiplexing, a high rate stream of serial optical pulses, at the output of a single optical fiber, into multiple information channels;

a self-triggered all-optical switch for converting, by demultiplexing, a high rate serial of interleaved optical pulses, at the output of a single optical fiber, into multiple information channels; and all-optical communication system including modulators, particularly all-optical modulators that are activated by control beams or self-triggered modulators for performing four cooperative functions to increase data transmission speed: converting optical pulses, at several different optical channels, into extremely narrow pulses, encoding the narrow pulses to form codes, interleaving the coded optical pulses of the channels into one dense optical stream of codes to produce DTDM, and transmitting the codes in an optical fiber at a very high bit rate;

Further objects are as follows:

to provide an all-optical communication system including switches, particularly those that are activated by control beams or self-triggered all-optical switches for performing two cooperative functions to enhance the data transmission rate;

to be able to receive, from the output of a single optical fiber, a stream of high rate coded optical pulses interleaved from multiple parallel information channels;

to be able to convert, by demultiplexing, the serial stream of the codes, into multiple information channels according to a predetermined code which dictates to which of the information channels the pulses will be routed; and to be able to demultiplex, by Code Division deMultiplexing (CDM), a series of coded pulses of interleaved channels into multiple parallel information channels.

Yet further objects and advantages will become apparent from the ensuing description and appended drawings.

SUMMARY

An optical system for modulating, switching, multiplexing, demultiplexing, routing and routing packets of data. The system has two versions: it can be used either as an all-optical modulator or as an all-optical switch. For both versions, the system can be operated either as a self-triggered system or it can be activated by at least one control beam. When the system is self-triggered, it includes at least one input, at least one interference device, and at least one output. The input is arranged to receive input radiation pulses for directing each of the input radiation pulses as multiple radiation pulses that propagate along multiple radiation paths having lengths. The interference device is arranged to receive, from the multiple radiation paths, multiple radiation pulses. The interference device receives the multiple radiation pulses at timings corresponding to the lengths of the radiation paths; The interference device produces and directs, toward the output, one interference pattern out of a group of multiple interference patterns that are producible by the interference device according to the timings. The output is arranged to receive, from the interference device, the interference pattern. The output selectively emits output radiation pulses according to the timings in which the interference device receives the radiation pulses.

DRAWINGS—FIGURES

DETAILED DESCRIPTION—Preferred Embodiment

Figure 1A:
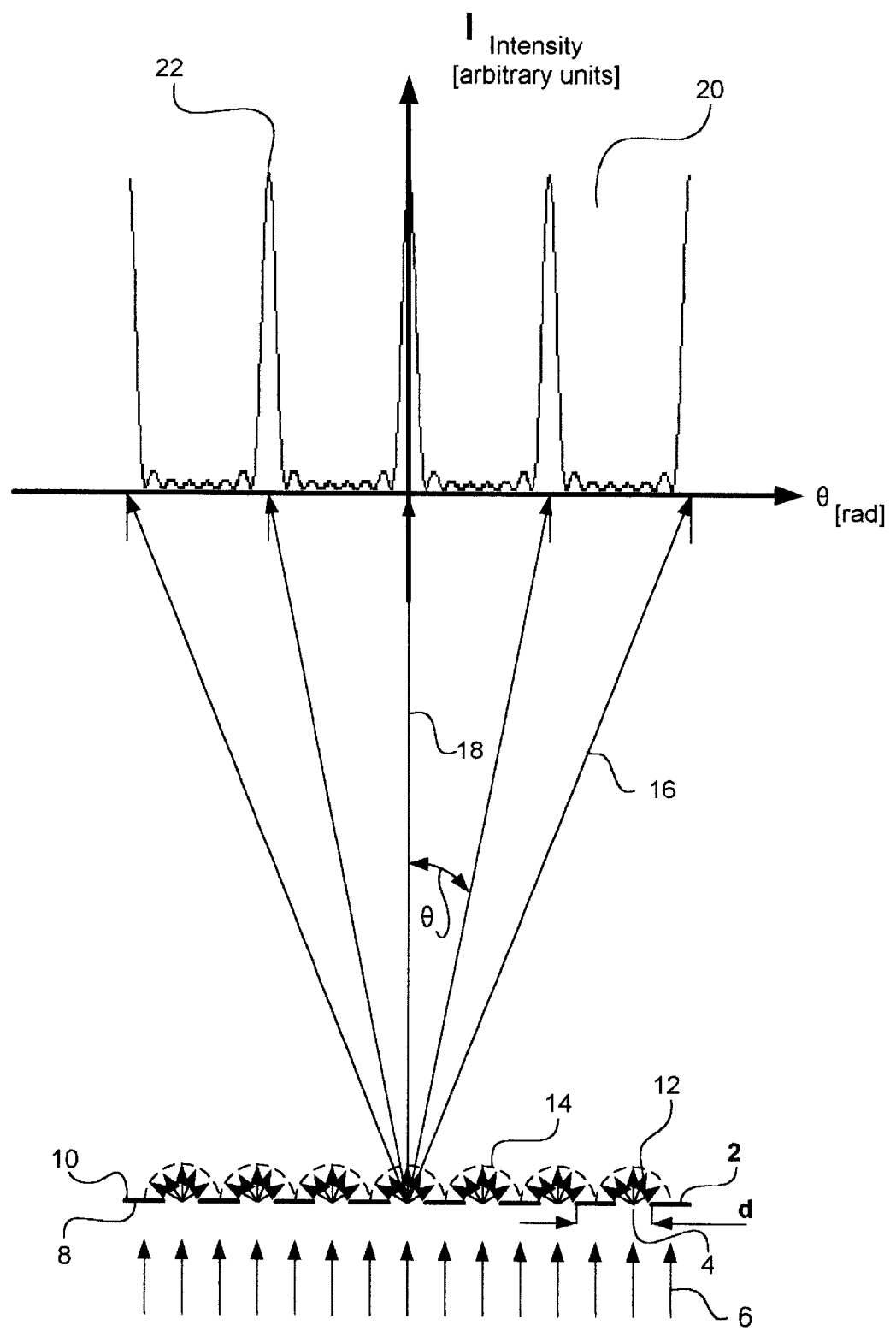
FIGS. 1a and 1b are illustrations of the optical operation of prior-art transmitting and reflecting gratings.

FIG. 1a—Prior Art—Transmitting Grating

Figure 1B:
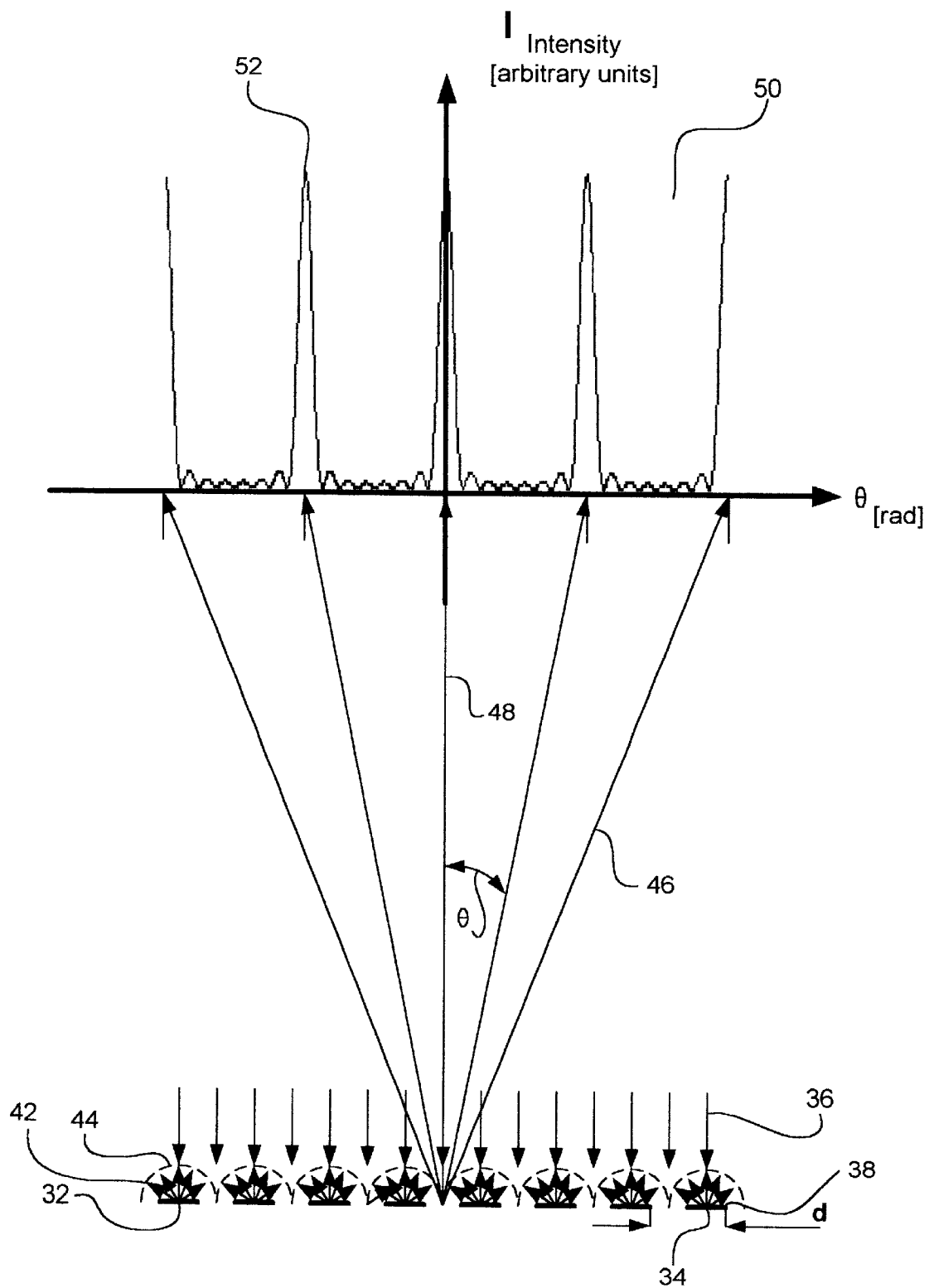

FIGS. 1a and 1b illustrate the optical operational principle of prior-art transmitting and reflecting gratings, respectively. I provide FIGS. 1a and 1b to assist in understanding the present invention.

FIG. 1a shows a transmitting grating 2 with openings 4 with pitch d. Grating 2 receives planar radiation waves 6 on its side 8. Only part of the radiation of waves 6 is transmitted, by openings 4, to the other side 10 of grating 2. Radiation 12 exits from openings 4 and has a spherical front wave (diffraction effect) and its intensity distributed isotropically over half spheres 14 along which it propagates.

The radiation of propagating spheres 14 interfere with each other to create constructive and distractive interference. Arrows 16 schematically illustrate the directions along which the constructive interferences exist. The directions of arrows 16 are indicated by angles θ, measured in radians, with respect to the axis of symmetry 18 of grating 2. Arrows 16 actually indicate the orientations along which radiation 6 is oriented, by grating 2, and thus point to the values of the angles θ, on the θ axis. The latter is a part of graph 20, which illustrates the spatial distribution of the radiation intensity I of radiation 6 versus angle θ. Arrows 16 point to the angle values θ in which the intensity I of radiation 6 reaches its maximum values 22.

The mathematical relationships between intensity I of radiation 6, transmitted by grating 2, and propagation angle θ of this radiation are given by equation (1):

$$I [\sin(n \cdot \beta \cdot d \cdot \sin(\theta)/2)/\sin(\beta \cdot d \cdot \sin(\theta)/2)]^2 \qquad \text{Eq. (1)}$$

In this equation n is the number of openings 4 and β is the wave vector of radiation 6 that is equal to $2 \cdot \pi/\lambda$ and λ is the wavelength of radiation 6.

The intensity I according to Eq. (1) reaches a maximum value when:

$$(\beta \cdot d \cdot \sin(\theta)/2)) = i \cdot \pi \qquad \text{Eq. (2)}$$

This occurs when I is an integral number, known as the order of the diffraction.

When substituting β for $2 \cdot \pi/\lambda$ in Eq. (2), it takes the form:

$$\sin(\theta) = i \cdot \lambda/d \qquad \text{Eq. (3)}$$

FIG. 1b—Prior-Art—Reflecting Grating

FIG. 1b shows transmitting grating 32 with stripes 34 arranged with pitch d. Grating 32 receives radiation planar waves 36 on its side 38. Only part of the radiation of waves 36 is reflected back by stripes 34 and out from grating 32. Stripes 34 have diffusive reflecting surfaces and are very narrow (diffraction effect). Thus they reflect the radiation with equal intensity in any direction. Radiation 42 reflected from stripes 34 have a spherical front wave and its intensity is distributed isotropically over half spheres 44, along which it propagates. The radiation beams from propagating spheres 44 interfere with each other to create constructive and distractive interference. Arrows 46 schematically illustrate the directions along which the constructive interferences exist. The directions of arrows 46 are indicated by angles θ, measured in radians, with respect to symmetry axis 48 of grating 32. Arrows 46 actually indicate the orientations along which radiation 36 is reflected and oriented by grating 32. The values of angles θ are indicated on the θ axis. This axis is a part of graph 50, which illustrates the spatial distribution of the radiation intensity I of radiation 36 versus angle θ. Accordingly it is clear that arrows 46 point out the angle values θ at which the intensity I of radiation 36 reaches its maximum values 52.

The mathematical relationships between intensity I of radiation 36, reflected by grating 32, and propagation angle θ of this radiation are given by equation (4) below:

$$I [\sin(n \cdot \beta \cdot d \cdot \sin(\theta)/2)/\sin(\beta \cdot d \cdot \sin(\theta)/2)]^2 \qquad \text{Eq. (4)}$$

In this equation n is the number of stripes 34, d is the pitch spacing between lines 34 and β is the wave vector of radiation 36 that is equal to $2 \cdot \pi/\lambda$ and λ is the wavelength of radiation 36.

The intensity I according to Eq. (4) reaches a maximum value when:

$$(\beta \cdot d \cdot \sin(\theta)/2)) = i \cdot \pi \qquad \text{Eq. (5)}$$

This occurs when I is an integral number known as the order of the reflection.

When substituting $2 \cdot \pi/\lambda$ for β in Eq. (5) it takes the form:

$$\sin(\theta) = i \cdot \lambda/d \qquad \text{Eq. (6)}$$

For both types of the gratings, the diffraction (transmitting—FIG. 1a) grating and the reflecting grating (FIG. 1b), the mathematical formulas are the same.

The angles $\theta_i$ in which the intensity of the radiation that comes from the gratings is maximal are known as the orders i of the gratings. Accordingly, the angles $\theta_i$ of the diffraction and reflecting orders are given by Eq. (7).

$$\sin(\theta_i) = i \cdot \lambda/d \qquad \text{Eq. (7)}$$

This occurs when i is an integral number and can get the values +/−0, 1, 2, . . .

The incident angle $\phi$ of the incoming radiation is measured relative to a normal to the grating. When the incident angle $\phi$, of the radiation that hits diffracting and reflecting grating is not normal to the grating, i.e., it differs from an incident angle that is equal to zero, then Eq. (7) becomes:

$$\sin(\theta_i) + \sin(\phi) = i \cdot \lambda/d \qquad \text{Eq. (8)}$$

This means that the whole pattern of interference is rotated by an angle $\phi$. For a diffracting grating it means that the zero order of the grating is located on a line along which the incident radiation propagates toward the grating. For a reflecting grating it means that the zero order of the grating is located on a line that is symmetric with respect to the normal of the grating. I.e., it is symmetrical to a line along which the incident radiation propagates toward the grating.

Figure 2A:
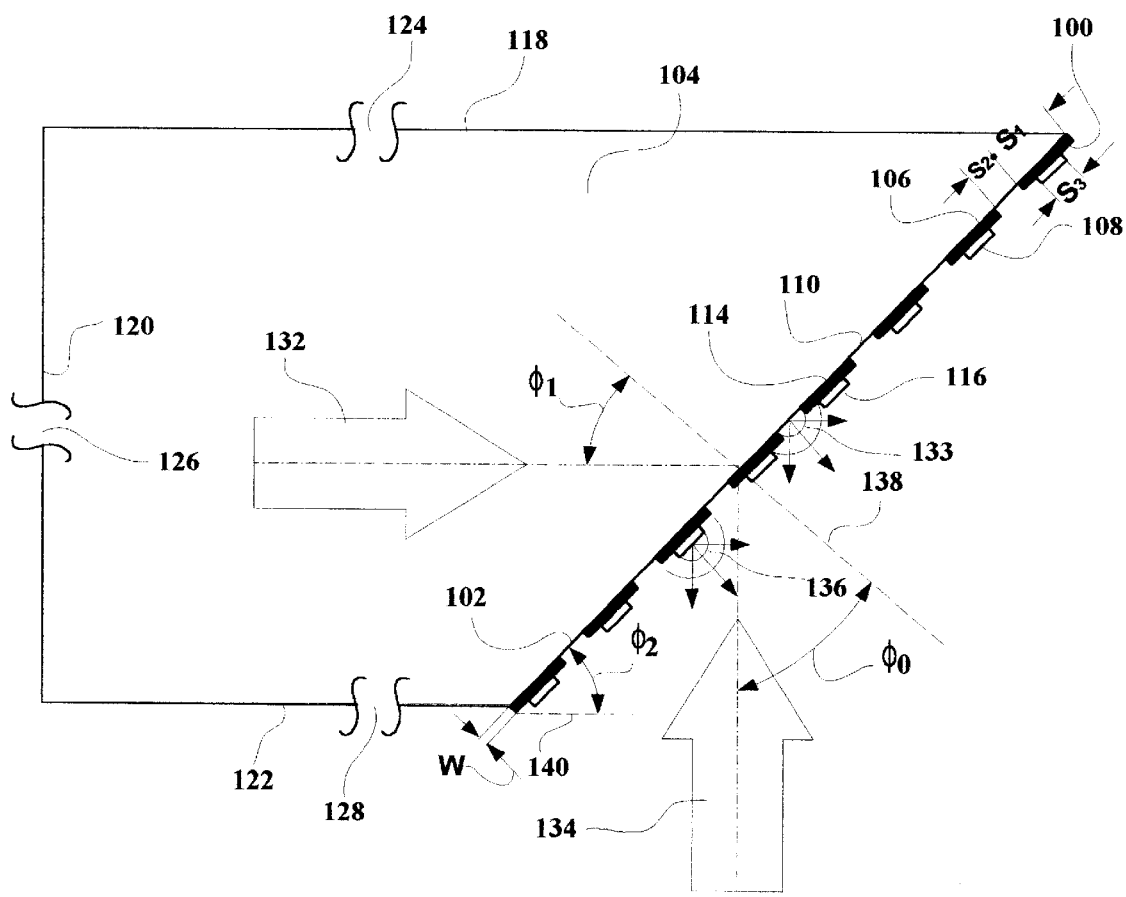
FIGS. 2a and 2b are illustrations of transmitting and reflecting gratings combined together, in accordance with the invention.

FIG. 2a—Transmitting and Reflecting Gratings Combined on One Surface

FIG. 2a is a side view and schematic illustration according to the invention showing a combination 100 of transmitting and reflecting gratings formed on a common surface 102 of transparent block 104. Block 104 can be made, for example, of semiconductors such as Si, GaAr, InGaAr, quarts, glass, silica, fused silica or plastic.

Combined grating 100 includes two layers of gratings 106 and 108. Grating layer 106, on surface 102, is made of high-absorption material that is not transparent and has a surface with a very low reflection. For example, grating layer 106 can be made of silver oxide, which is widely used in the field of projection masks for photolithography.

Grating layer 108 is made of a material having a surface with a very high-reflectivity. For example, grating layer 108 can be made of indium oxide in a similar way to that used to fabricate reflectors and mirrors.

Grating layers 106 and 108 can be produced by standard techniques used to produce gratings. For example layer 106 is formed continuously over surface 102 and coated by a photoresist material. The photoresist is exposed with Ultra Violet (UV) radiation by known holographic techniques. (Holography involves the interference of two beams having a predetermined angle between them which produce an interference pattern.) Also exposure can be made through a projection mask.

The photoresist is backed in an oven after its exposure and is dipped (or soaked) in a developer to create openings in the photoresist, above layer 106, in the areas that were exposed. Dipping (or soaking) the photoresist is done in a selective etching acid, such as acetic acid, which does not attack the photo resist and surface 102. This creates, by selective etching, openings 110 in layer 106 through the openings in the photoresist. After removing the photoresist with acetone, layer 106 on surface 102 of block 104 takes the form of grating layer 106 having multiple lines 114 and multiple openings 110.

For example, the following process, known as lift-off, can produce grating layer 108:

1. Cover grating layer 106 with a layer of photoresist.
2. Create centered openings in the photoresist above lines 114 of grating 106, by the exposing and developing techniques described above.
3. Deposit or evaporate a continuous layer 108 on top of the patterned photoresist.

Dip layer 108 in acetone vibrated at an ultrasonic frequency (lift-off technique)

The liftoff technique removes all the areas that were on top of the photoresist material and leaves only lines 116 of reflecting grating-layer 108; these are centered on lines 114 of grating layer 106.

The formation of grating layer 108 centered on top of grating layer 106 completes the fabrication of combined grating 100.

Lines 118, 120, and 122 of block 104 have cuts 124, 126, and 128, respectively. Cuts 124, 126, and 128 indicate that the drawing of FIG. 2a is not scaled. Especially, the dimensions of combined grid 100 are not scaled. In reality the dimensions of combined grating 100 are very small relative to the dimensions of block 104 and they are enlarged in FIG. 2a for clarity.

For example, the widths $S_1$, $S_2$, and $S_3$ of openings 110, lines 114, and lines 116 of grating layers 106 and 108, respectively, are of the same order of magnitude as the wavelength $\lambda$ of the radiation used in optical communications (about 1.3 $\mu$m and 1.5 $\mu$m). The total thickness W of grating layers 106 and 108 together can be less than 0.1 $\mu$m and is negligible with respect to the radiation wavelength $\lambda$.

When planar-wave radiation 132 is directed toward combined grating 100, part of it passes through openings 110 and is diffracted isotropically with a spherical front wave 133 to create an interference pattern based upon grating layer 106. The other part of radiation 132 is absorbed by lines 114 and is lost.

When planar-wave radiation 134 is directed toward combined grating 100, part of it passes through openings 110 and is lost. Lines 116 of grating layer 108 reflect the other part of radiation 134. Reflecting lines 116 of grating layer 108 are deposited or evaporated at a high-rate to create a grainy surface, which produces diffusing reflecting surface. The diffusing reflecting surface of lines 116 reflects radiation 134 isotropically as radiation 136 having a spherical front wave to create an interference pattern based upon grating layer 108.

When planar-waves radiations 132 and 134 are applied simultaneously, combined grating 100 acts simultaneously as the combination of grating layers 106 and 108. When transmitted and diffracted radiation 133 is in phase with reflected radiation 136 and both have equal intensities, the interference pattern of combined grating 100 is like gratings 106 or 108. However in this case grating 100 has half the pitch (double periodicity or double the density in terms of numbers of lines per unit length).

Accordingly, when only radiation 132 or 134 is directed toward combined grating 100, then grating 100 produces an interference pattern that is about the same for both situations corresponding to the interference pattern of gratings 106 or 108, respectively. When both radiations 132 and 134 are directed toward combined grating 100, then grating 100 produces an interference pattern that is a combination of the interference patterns corresponding to the interference pattern of gratings 106 and 108. It is equivalent to an interference pattern of a grating, having half of the pitch of gratings 106 or 108.

One of the important conditions that should be maintained is the phase matching between radiation 133 diffracted from openings 110 of grating layer 106 and radiation 136 reflected from lines 116 of grating layer 108. This phase matching should be maintained over and along surface 102. Assuming that radiations 132 and 134 have the same wavelength $\lambda$, then the phase matching depends on angles $\phi_0$, $\phi_1$, and $\phi_2$. Angles $\phi_0$ and $\phi_1$ are the impinging incident angles of radiations 132 and 134 on combined grating 100, respectively, and are measured relative to line 138 that is normal to grating 100 and surface 102. Angle $\phi_2$ is the angle between line 140 (parallel to line 122) and surface 102 when line 140 is normal to the direction in which radiation 134 propagates.

Phase matching along surface 102 is achieved when the following mathematical condition is fulfilled:

$$\beta_1 \cdot \sin(\phi_1) = \beta_0 \sin(\phi_0) \qquad \text{Eq. (9)}$$

Here $\beta_1 = 2\pi \cdot N_1/\lambda$ and $\beta_0 = \beta_1 = 2\pi \cdot N_0/\lambda$ and $N_1$ is the refractive-index of the material of block 104. $N_0$ is the refractive-index of the air and is equal to 1. When substituting the expression for $\beta$ in Eq. (9) and reorganizing its form, Eq. (9) takes the form of the optical law known as Snell's law:

$$N_1 \cdot \sin(\phi_1) = N_0 \cdot \sin(\phi_0) \qquad \text{Eq. (10)}$$

The mathematical relationships between $\phi_0$, $\phi_1$, and $\phi_2$ are:

$$\phi_0 = 90° - \phi_2 \text{ and } \phi_0 = \phi_2 \qquad \text{Eq. (11)}$$

By substituting Eq. (11) in Eq. (10) and reorganizing Eq. (10) we get:

$$\phi_2 = \text{arc tang}(N_1/N_0) = \text{arc tang}(N_1). \qquad \text{Eq. (12)}$$

For example, if $N_1 = 1.5$ then $\phi_2 = 56.3°$.

Figure 2B:
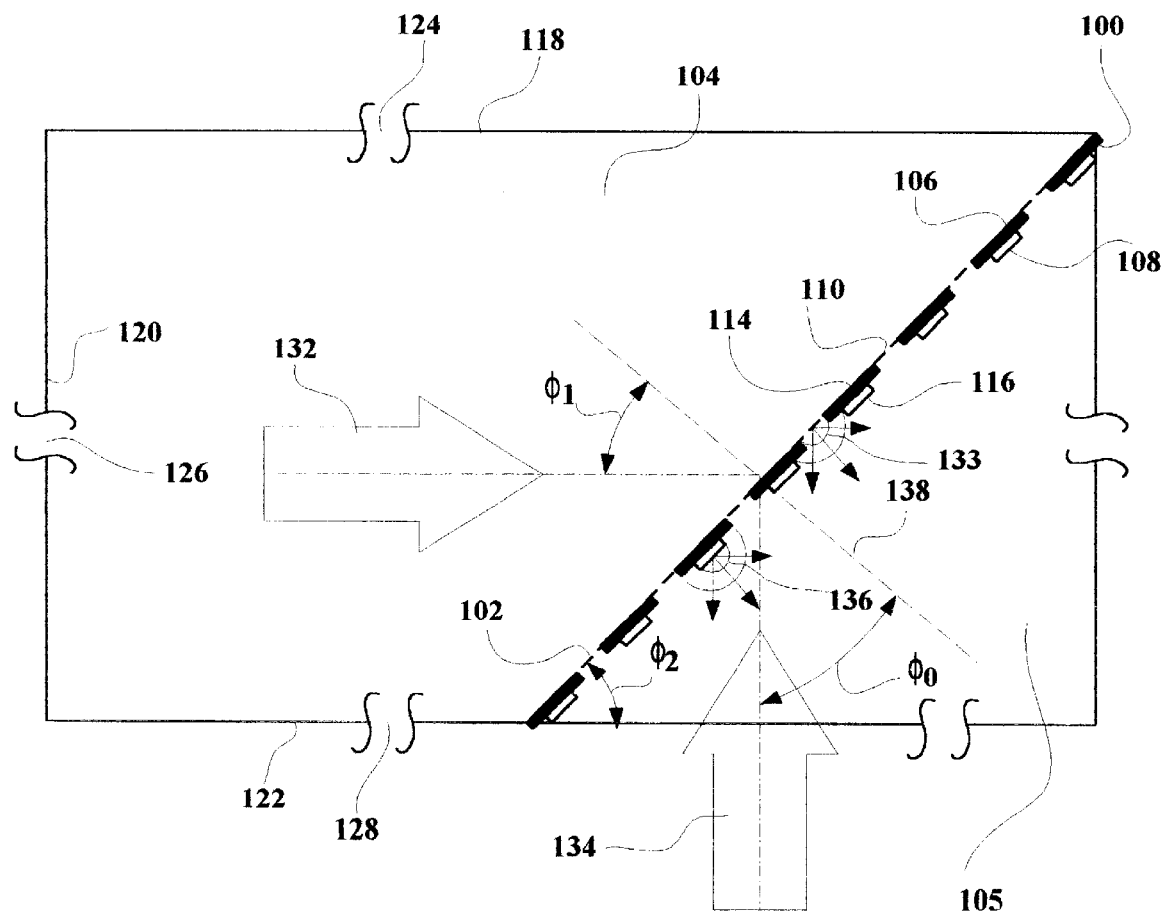

FIG. 2b—Additional Design for Combined Transmitting and Reflecting Grating

FIG. 2b shows an additional design for a combined transmitting and reflecting grating designed according to the invention. This design is based on the design of FIG. 2a and thus the same numerals are used to indicate similar parts. The design of combined grating 100 is achieved by bonding block 105 to block 104 of FIG. 2a. The part of the design in FIG. 2b related to the design of FIG. 2a remains unchanged and thus the explanations of FIG. 2a related to this part are not repeated here.

Block 105 is made of the same material as block 104 and thus has the same index of refraction. Block 105 is bonded to block 104 by index-matching glue having the same refractive index as the blocks. Such glue is commonly used in optical components. Such glue does not cause any reflection of the radiation that passes between blocks. The absence of such reflection hides surface 102; therefore it is illustrated by a broken line. Avoiding reflection between blocks allows complete transmission of radiation 132 through openings 110. Because of this, the refractive index on both sides of combined grating 100 is the same and is equal to $N_1$.

Accordingly, by substituting index $N_0$ with index $N_1$ in Eqs. (11) & (12) we get:

$$\phi_0 = \phi_1 = \phi_2 = 45°.$$

Figure 3:
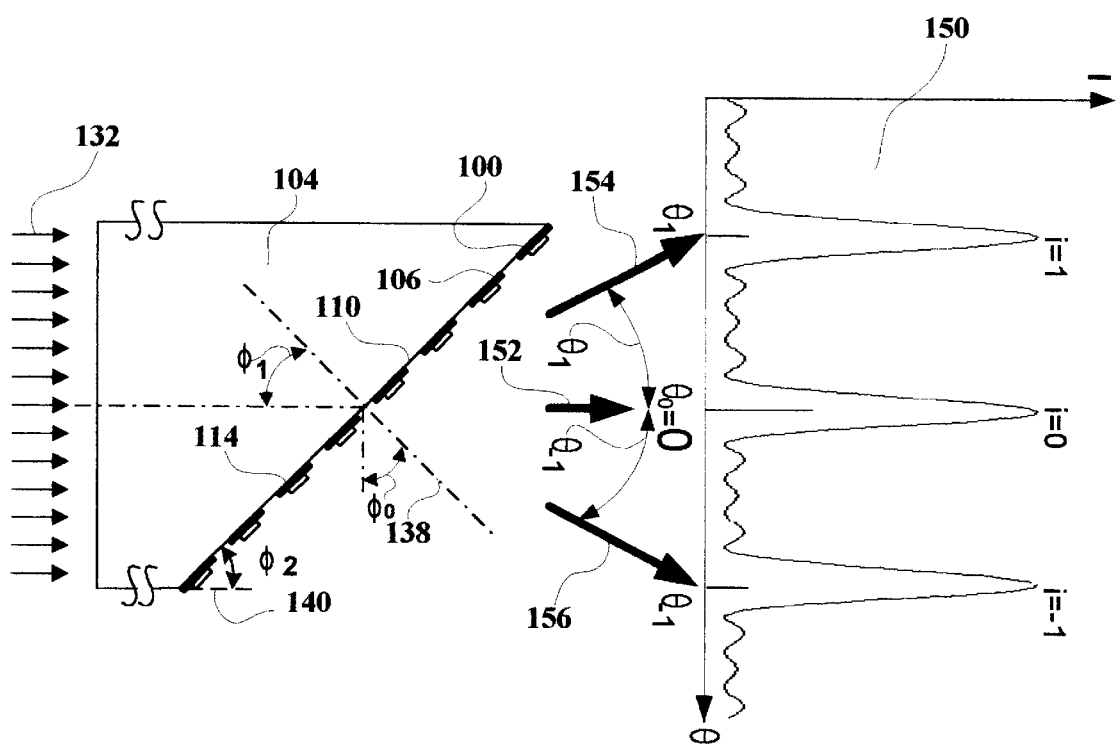
FIG. 3 illustrates an interference pattern of the combined grating.

FIG. 3—Interference Pattern of Combined Grating

FIG. 3 schematically illustrates the interference pattern of combined grating 100. Grating 100 is illustrated according to its version shown in FIG. 2a but it can be designed without any limitation according to the design shown in FIG. 2b. Radiation 132 enters to transparent block 104 without direction change and impinges on combined grating 100 at incident angle $\phi_1$ relative to line 138 that is normal to grating 100. Angles $\phi_0$, $\phi_1$, and $\phi_2$ are adjusted according to Eqs (11) and (12) when angle $\phi_2$ is measured relative to line 140. Radiation 132 impinges on grating 100 on its side that includes grating layer 106. Part of this radiation that passes through openings 110 is diffracted and interferes to produce interference pattern. The interference pattern has three orders in which constructive interference exists in the directions of $\theta_0$, $\theta_1$, and $\theta_{-1}$ indicated by beams 152, 154, and 156, respectively, and correspond to the interference indices i=0, 1, and −1.

Graph 150 illustrates a curve of the intensity I of the interfered radiation (shown in relative units) versus the interference angle $\theta$ (measured in radians). The interference orders of graph 150 are indicated by their indices (i=0, 1, and −1). The axis of graph 150 along which interference angle $\theta$ is measured is scaled to mach between angles $\theta_0$, $\theta_1$, and $\theta_{-1}$, at which orders 0, 1, and −1 exist on this axis, and angles $\theta_0$, $\theta_1$, and $\theta_{-1}$ along which beams 152, 154, and 156 propagate, respectively.

According to Eq. (8) the maximum value that the index of the orders i can get is the value that still maintains $\sin(\theta_1) + \sin(\phi 1) = i \cdot \lambda/d$. The maximum absolute value that $\sin(\theta_i)$ can get is 1. The zero order on axis $\theta$ of graph 150 was chosen to be at the origin. This means that for the presentation of graph 150, $\sin(\phi_1)$ is chosen to be zero. Thus $i \cdot \lambda/d$ should be les than 1 for positives values of i and more than (−1) for negative values of i. The fact that graph 150 has only three orders means, according to Eq. (8) that the index i can get only the values of 0 and +/−1 which means that the absolute value of index is less than 2(i<2). Accordingly the pitch spacing d of grating layer 106 must satisfy d<2λ.

Figure 4:
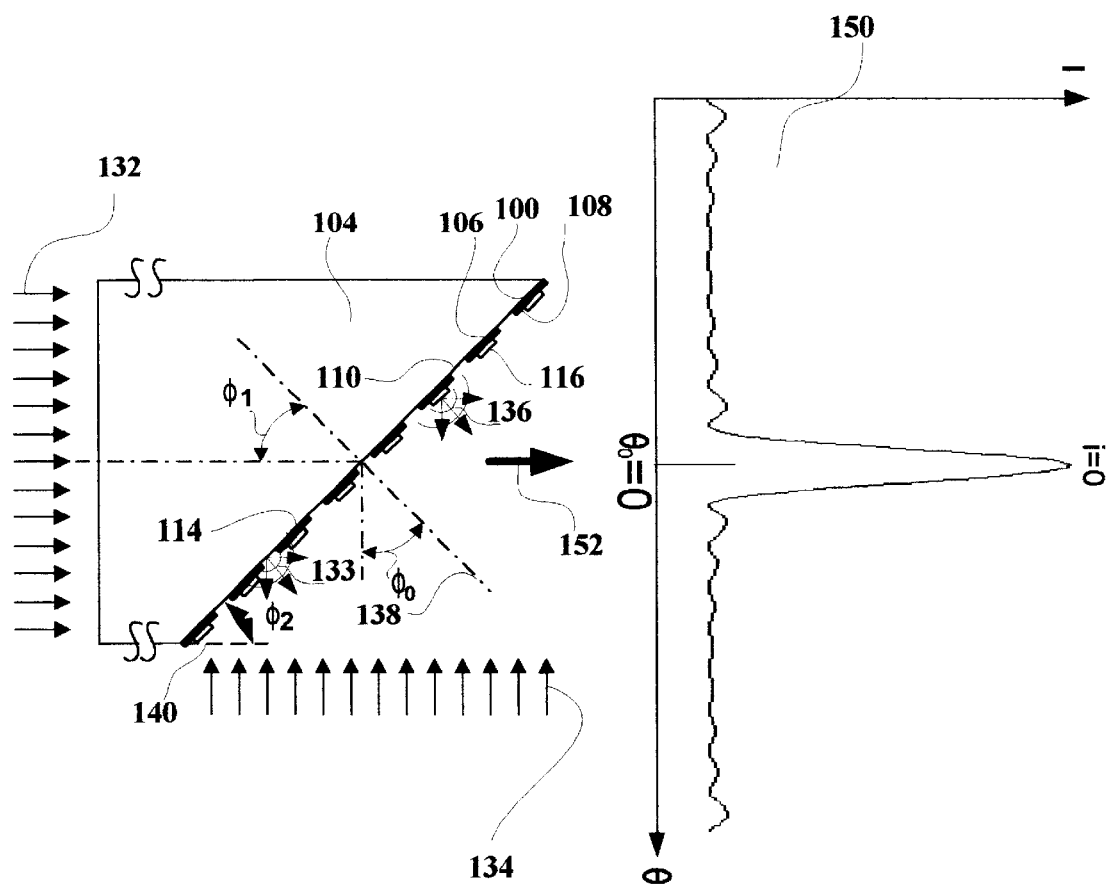
FIG. 4 is an illustration of interference pattern of the combined grating irradiated from two directions.

FIG. 4—Interference Pattern of Combined Grating Irradiated From Two Directions

FIG. 4 schematically illustrates the interference pattern of combined grating 100. Grating 100 is illustrated according to the version of FIG. 2a, but can be designed without any limitations, according to the design shown in FIG. 2b. Radiation 132 enters transparent block 104 without direction change and impinges on combined grating 100 at incident angle $\phi_1$ relative to line 138 that is normal to grating 100. Angles $\phi_0$, $\phi_1$, and $\phi_2$ are adjusted according to Eqs (11) and (12) for maintaining phase matching between radiations 133 and 136, transmitted and reflected, respectively, by grating 100, of Angles $\phi_0$, $\phi_1$, and $\phi_2$ are calculated by taking into account the value of the refractive index $N_1$ of the material of block 104. Angle $\phi_2$ is measured relative to line 140.

Radiation 132 impinges on grating 100 on its side that includes grating layer 106. Part of radiation 132 is absorbed by lines 114 and is lost. The other part of radiation 132 passes through openings 110 and is diffracted out from grating 100, as radiation 133.

Radiation 134 impinges on grating 100 on its other side that includes grating layer 108. Part of radiation 134 passes through openings 110 and is lost. The other part of radiation 134 is reflected isotropically from lines 116 of grating layer 108 of combined grating 100, as radiation 136.

Radiations 132 and 134 impinge on grating 100 simultaneously. Lines 116 are centered between openings 110 and thus the pitch for both grating layers 106 and 108 is the same. Radiation 133, diffracted out from openings 110, and radiation 136, reflected from lines 116, interferes to produce an interference pattern. The pitch of combined grating 100 is the space between lines 116 and openings 110 and thus is equal to half of the pitch of grating layer 106 or grating layer 108. The interference pattern of grating 100 has one order (zero order) in which constructive interference exists in the directions of $\theta_0$ indicated by beam 152 and corresponds to the interference index i=0.

Graph 150 illustrates a curve of the intensity I of the interfered radiation (shown in relative units) versus the interference angle θ (measured in radians). The interference order of graph 150 is indicated by its index (i=0). The axis of graph 150 along which interference angle θ is measured is scaled to match angle $\theta_0$ at which order 0 exists on this axis, and angle $\theta_0$ along which beam 152 propagates.

According to Eq. (8) the maximum value that the index of the orders i can have is the value that still maintains $\sin(\theta_i)+\sin(\phi_1)=i\cdot\lambda/d$. The maximum absolute value that $\sin(\theta_i)$ can have is 1. The zero order on axis θ of graph 150 was chosen to be at the origin. This means that for the presentation of graph 150, $\sin(\phi_1)$ is chosen to be zero. Thus $i\cdot\lambda/d$ should be les than 1 for positives values of and more than (−1) for negative values of i. The fact that graph 150 has only one order means, according to Eq. (8), that index i can have only the values of 0. This means that the absolute value of index i<1. Accordingly the pitch spacing d of combined grating 100 must satisfy d<λ and it is half of the pitch d of grating layers 106 or 108, as derived above from Eq. (8) as explained in connection with FIG. 3.

The above result is in agreement with the pitch relationships between grating layers 106 and 108 and combined grating 100.

While grating layers 106 and 108 have pitch d between openings 110 or between lines 116, respectively, combined grating 100 has pitch d/2 between openings 110 and lines 116. On the other hand the conditions for producing the interference patterns of graph 150 in FIG. 3 (three orders of interference produced by grating layer 106) and of graph 150 in FIG. 4 (one interference order produced by combined grating 100) are d<2λ and d<λ, respectively. These conditions are identical to the relationships between the pitches of grating 106 (or 108) and grating 100 in which grating 100 has half of the pitch of grating 106 (or 108).

Radiation 134 is symmetric to radiation 132 with respect to grating 100 in terms of phase matching. Grating layers 106 and 108, on both sides of grating 100, have the same pitch. Accordingly, it is clear that when only radiation 134 impinges on grating 100, it will produce an interference pattern similar to that shown in graph 150 of FIG. 3 created when only radiation 132 impinges on grating 100.

Figure 5:
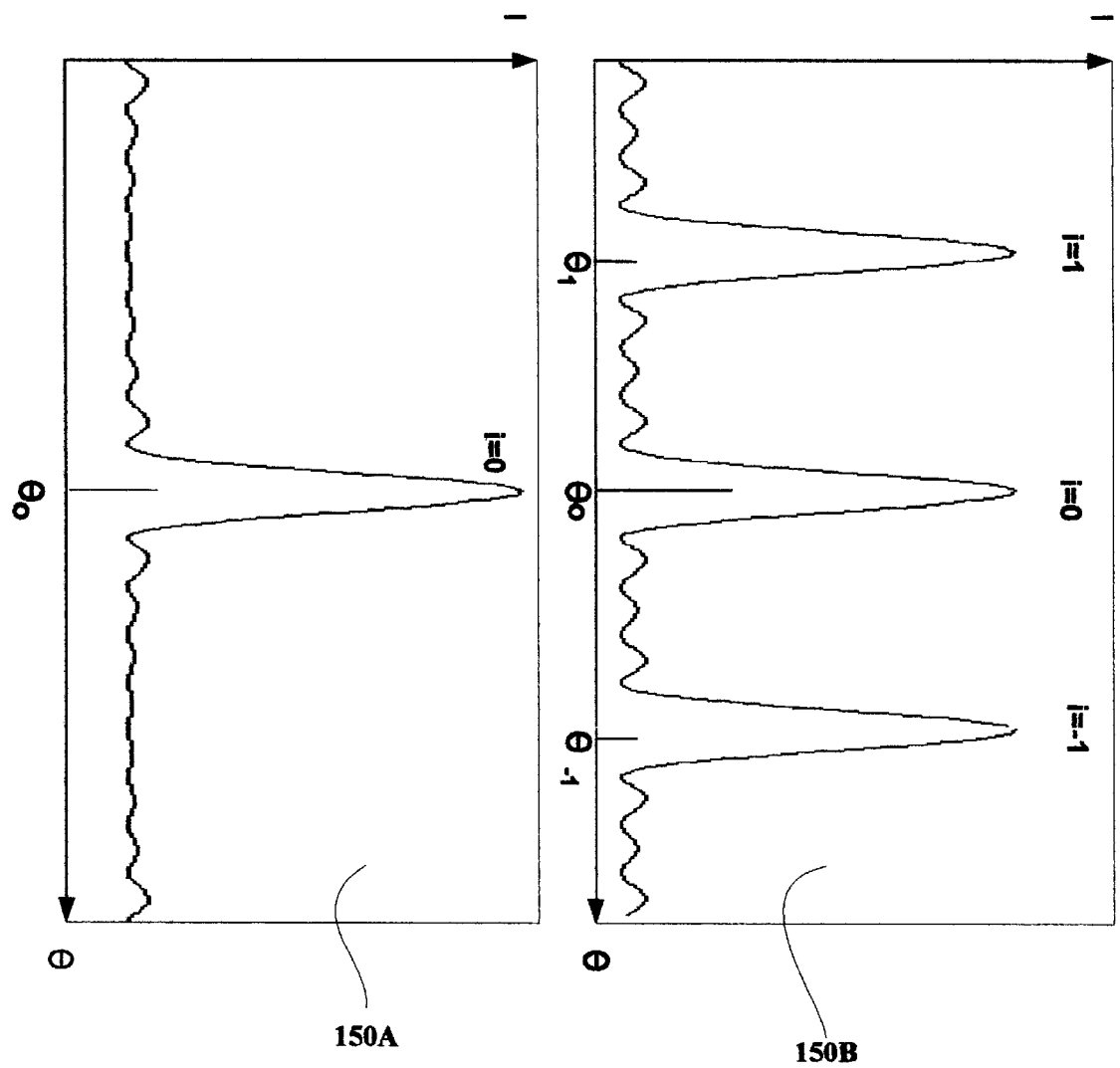
FIG. 5 shows interference patterns of the combined grating with different illuminations.

FIG. 5—Interference Patterns of Combined Grating With Different Illuminations FIG. 5 illustrates two graphs 150A and 150B showing two curves of the interference intensity I versus the interference angle. The intensity I is shown in relative units and the angle θ is measured in radians.

Graph 150B is related to the situation illustrated by graph 150 of FIG. 3, which is produced by irradiating combined grating 100 from one direction, either by radiation 132 or by radiation 134. The interference pattern of graph 150B has three orders 0, 1, and −1 at angles $\theta_0$, $\theta_1$, and $\theta_{-1}$, respectively.

Graph 150A is related to the situation illustrated by graph 150 of FIG. 4 which is produced by irradiating combined grating 100 from two directions and simultaneously by radiations 132 and 134. The interference pattern of graph 150A has one zero order at angle $\theta_0$.

The fact that each of the three interference orders 0, 1, and −1 appears at different angles $\theta_0$, $\theta_1$, and $\theta_{-1}$, respectively, allows the separate collection of the radiation of each order. Accordingly orders 0, 1, and −1 of the interference pattern shown in graph 150B can be collected by three ports $P_0$, $P_1$, and $P_{-1}$, respectively.

Ports $P_0$ and $P_{-1}$ can be joined together into one port $P_2$ in a way such that the radiations they collect and transfer to port $P_2$ destroy each other.

In this configuration, for the situation illustrated in graph 150B, the output at port $P_2$ is zero (the difference between the intensities of order 0 and −1) and the output at port $P_1$ contains the intensity of order 1.

For the same configuration and for the situation illustrated in graph 150A, the output, at port $P_0$, contains the intensity of order 0 that is the only existing order. Order −1 has zero intensity and thus the difference between the intensities of orders 0 and −1, which appears in port $P_2$, equal the intensity of order 0. In this case, the output at port $P_1$, which equals the intensity of order 1, is equal to zero.

Accordingly, for the configuration of ports $P_0$, $P_1$, $P_{-1}$, and $P_2$, described above, the output of port $P_2$ is zero for the situation shown in graph 150B. This is related to the case when grating 100 is irradiated only from one side, either by radiation 132 or by radiation 134. On the other hand, for the situation shown by graph 150A, related to the case when combined grating 100 is irradiated simultaneously on both of its sides by radiations 132 and 134, port $P_2$ contains the intensity of the only existing order, order 0.

Similarly, for the configuration of ports $P_0$, $P_1$, $P_{-1}$, and $P_2$, described above, the output of port $P_1$ contains the intensity of order 1 for the situation shown in graph 150B, this is related to the case when combined grating 100 is irradiated simultaneously on both of its sides by radiations 132 and 134. On the other hand, for the situation shown by graph 150A, related to the case when grating 100 is irradiated only from one side either by radiation 132 or by radiation 134, port $P_1$ contains the intensity of order 1, which is zero.

Thus we have moved from irradiating grating 100 simultaneously on both of its sides by radiations 132 and 134 to irradiating grating 100 only on one of its sides by either radiation 132 or radiation 134. This move switches the radiation intensity from port $P_2$ to port $P_3$ and vice-versa.

Figure 6A:
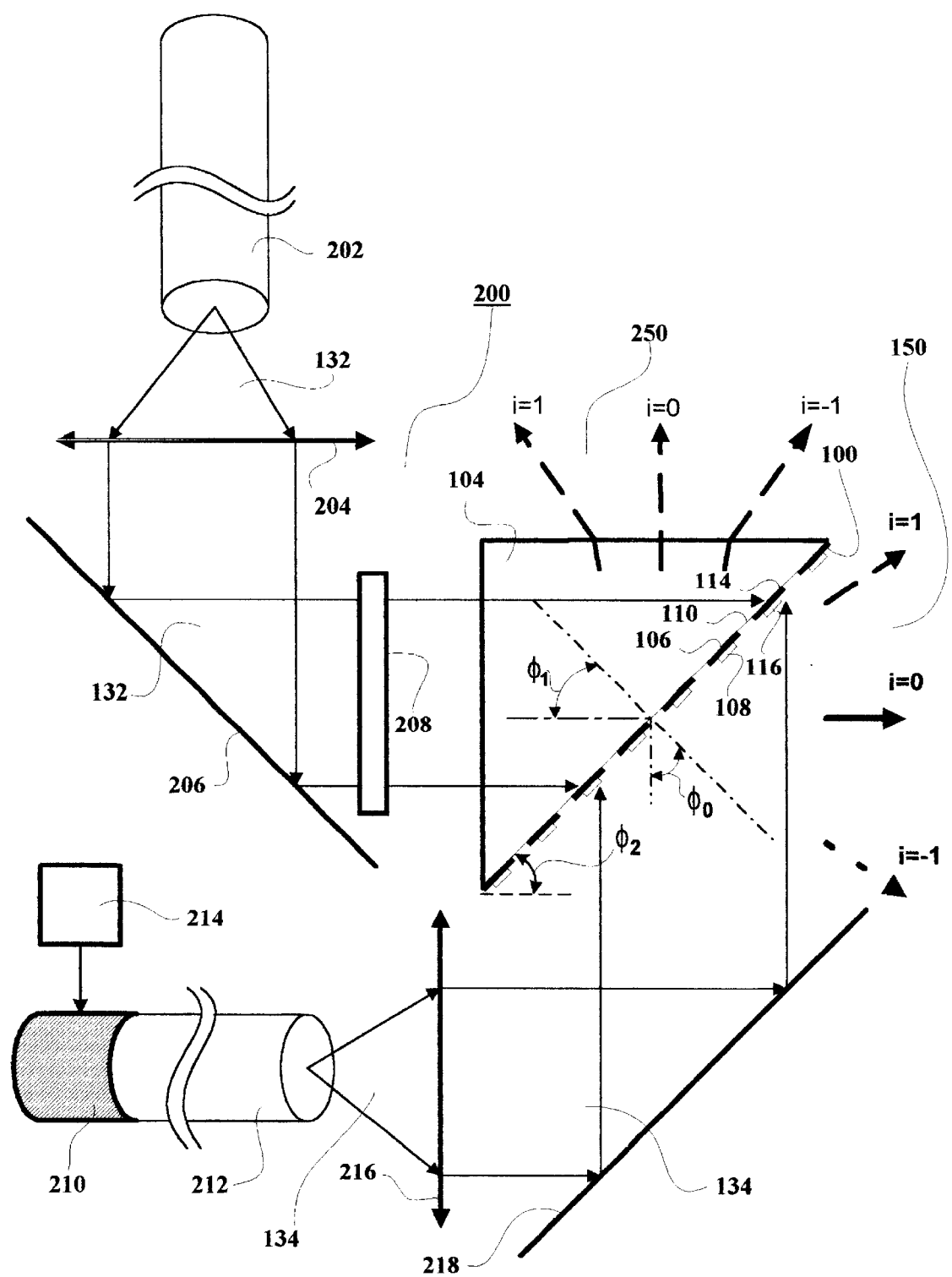
FIG. 6a illustrates the controlling of the interference patterns of the combined grating.

FIG. 6a—Controlling Interference Patterns of Combined Grating

FIG. 6a illustrates optical system 200, which controls interference pattern 150 (not shown) of combined grating 100, by controlling different illuminations of radiations 132 and 134 on grating 100. Optical fiber 202 guides and emits radiation 132 toward lens 204 that converts radiation 132 to parallel radiation beam 132. Radiation beam 132 is the information carrier beam used in optical communication. Reflector 206 receives beam 132 and reflects beam 132 toward attenuator 208, which transmits beam 132 toward transparent block 104. Radiation beam 132 enters block 104 without direction change and propagates in block 104 toward grating layer 106 of combined grating 100.

Laser 210 is optically coupled to optical fiber 212 and is controlled by control unit 214. Fiber 212 guides and emits radiation 134, produced by laser 210, toward lens 216 that converts radiation 134 into parallel beam 134. Radiation beams 132 and 134 have the same wavelength λ and lenses 204 and 216 can be, for example, of the type of Graded Index (GRIN) lens commonly used to expand the beams emitted from optical fibers. Lens 216 direct parallel beam 134 toward reflector 218 that reflect beam 134 toward grating layer 108 of combined grating 100.

Incident angles $\phi_1$ and $\phi_0$ of parallel beams 132 and 134, respectively, and angle $\phi_2$ dictate the orientation of combined grating 100. These angles are adjusted to maintain phase matching between radiation 132, transmitted by grating 100 and radiation 134, reflected by grating 100. Attenuator 208 is adjusted to assure that the intensity of radiation 132, transmitted by grating 100, is equal to the intensity of radiation 134, reflected by grating 100.

Wen control unit 210 turns off laser 210, beam 134 does not exist. In this case only beam 132 impinges on combined grating 100 on the side that includes grating layer 106. The latter has a pitch spacing d that satisfies, for example d<2λ. Grating layer 106 of combined grating 100 acts as a diffraction grating on radiation beam 132 and produces interference pattern 150 of three beams corresponding to interference orders having indices i=0, 1, and −1. In this case the interference pattern 150 produced by radiation beam 132 and grating layer 106 of grating 100 is similar to the interference pattern illustrated by graph 150B of FIG. 5.

When control unit 210 turns on laser 210, radiation beams 134 and 132 hit combined grating on both of its sides, including grating layers 106 and 108. Radiation beam 132 impinges on combined grating 100 on its side that includes grating layer 106 and radiation beam 134 impinges on combined grating 100 on its other side that includes grating layer 108. Reflecting lines 116 of gating layer 108 that reflect radiation beam 143 are centered in between openings 110 of grating layer 106 that transmits radiation beam 132. Thus grating layers 106 and 108 have the same pitch d and combined grating 100 has a pitch d that is half the pitch d of gratings 106 and 108.

Accordingly, pitch d of combined grating 100 satisfies the relationship d<λ. Combined grating 100 acts on radiations beams 132 and 134, impinging on both of its sides simultaneously, and produces interference pattern 150 of one beam corresponding to interference order having only the index i=0. In this case interference pattern 150 produced by radiation beams 132, 134 and combined grating 100 is similar to the interference pattern illustrated by the curve of graph 150A of FIG. 5.

Each time when control unit 214 turns off control beam 134, then interference pattern 150 includes three beams (interference orders 0, 1 and −1).

In the complementary cases when control unit 214 turns on control beam 134, then interference pattern 150 includes only one beam (interference orders 0) and orders 1 and −1 disappear. In these cases, grating layer 106 and radiation beam 134 produce interference pattern 250 having three beams (interference orders 0, 1, −1) which changes their orientation according to Snell's law while exiting block 104. Interference pattern 250 exists every time that beam 134 is on, even when beam 132 is off.

Figure 6B:
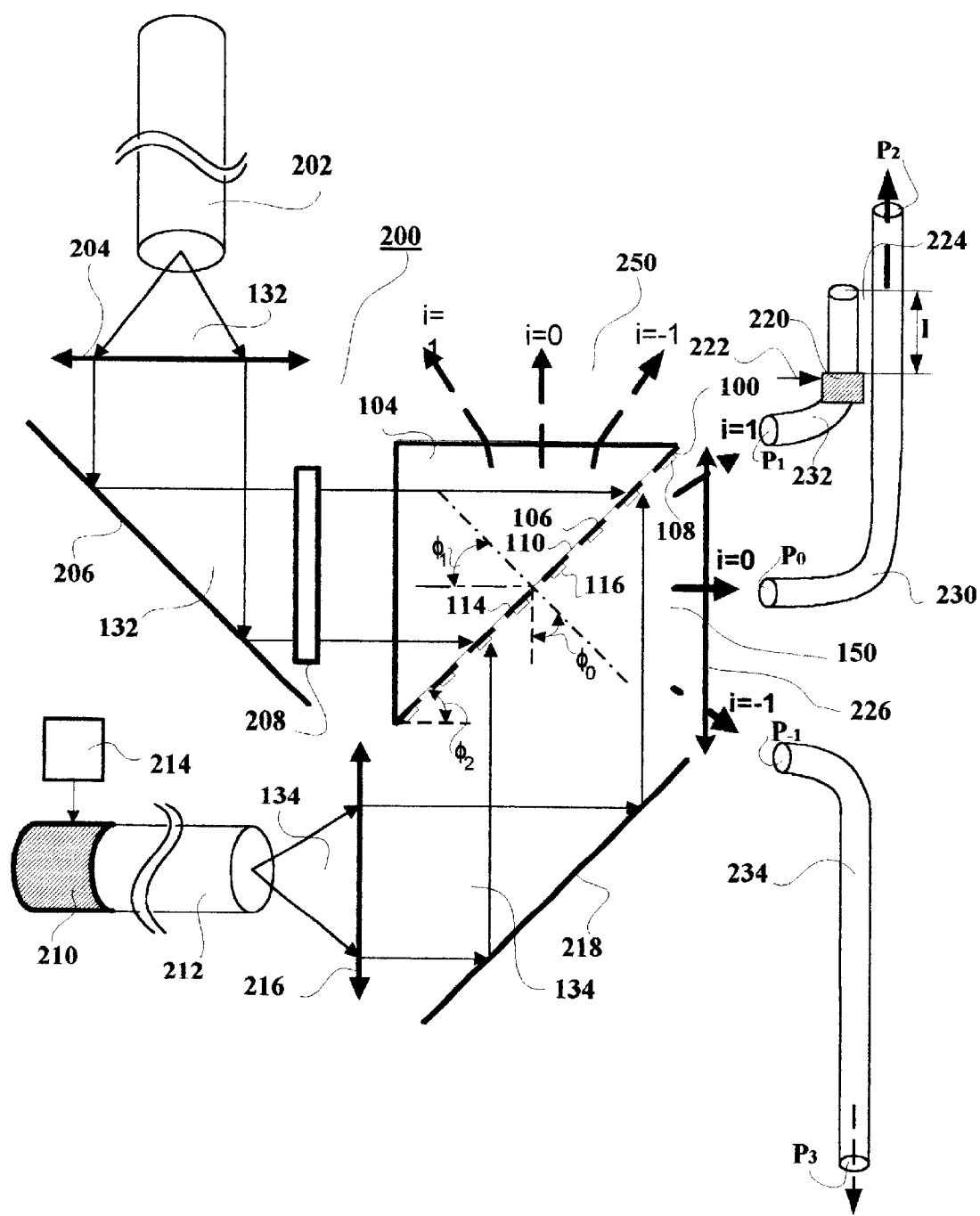
FIG. 6b is an illustration of all-optical switching of the information carrier-beam between ports using a control beam.

FIG. 6b—All-Optical Switching of Information Carrier Beam Between Ports Using Control Beam FIG. 6b illustrates same optical system 200 of FIG. 6a, described above, with additional ports $P_0$, $P_1$, $P_{-1}$, $P_2$, and $P_3$ arranged to receive interference pattern 150 from coupling lens 226. When control beam 134 is off, interference pattern 150 includes three beams. These beams correspond to interference orders having the indices i=0, 1, −1 and are optically coupled by coupling lens 226 into ports $P_0$, $P_1$, and $P_{-1}$, respectively.

Ports $P_0$, $P_1$, and $P_{-1}$ are the inputs of optical fibers 230, 232, and 234, respectively. Fiber 230, 232, and 234 guide the radiation from their inputs to their outputs (ports $P_2$ and $P_3$), respectively. Accordingly fiber 234 guides the radiation of interference order −1 to its output $P_3$.

Directional coupler 224, whose coupling length 1 is adjusted to produce a 3 db directional, coupler, couples fibers 230 and 232. In coupler 224, half of the intensity in fiber 230 is transferred to fiber 232 with a phase shift of j when j is a complex number equal to $(-1)^{1/2}$. Similarly, half of the intensity in fiber 232 is transferred to fiber 230 with a phase shift of j that is equivalent to phase shift of π/2 radians.

Phase shifter 220 shifts the phase of the radiation in fiber 232 by π/2 radians prior to the propagation of the radiation into the coupling region of directional coupled 224. Accordingly the radiation transferred from fiber 232 to fiber 230 has a phase shift of π/2+π/2=π radians relative to the radiation that propagates in fiber 230.

The initial radiation intensities of the radiations in ports $P_0$ and $P_1$ are the same and equal to I. The intensity of the radiation in fiber 230 after directional coupler 224 is the Summation of half of the initial radiation I in fiber 230 and half of the initial radiation I in fiber 232 that has a phase shift of π radians. Thus the total radiation intensity in fiber 230 at port $P_2$ is I/2—I/2=0.

This means that when control radiation beam 134 is off, the intensity at port $P_3$ is I and the intensity at port $P_2$ is zero.

Alternatively when control beam 134 is on, interference pattern 150 includes only one beam corresponding to interference index i=0. The latter is coupled, by lens 226, into the input of fiber 230 through port $P_0$. Interference orders i=1 and −1 disappear and no radiation is coupled by lens 226, into fibers 232 and 234 through ports $P_1$ and $P_{-1}$. Thus the intensity at port $P_3$ is zero. Half of the radiation coupled into fiber 230 at port $P_0$ is lost at directional coupler 224 and the remaining half propagates from fiber 230 at port $P_2$.

This means that when beam 134 in on, the intensity at port $P_3$ is zero and the intensity at port $P_2$ is half of the initial intensity at port $P_0$.

Accordingly, by turning control beam 134 on and off, the intensity of beam 132 can be switched from port $P_3$ to port $P_2$, and vice-versa.

The above description for the switching capability of the system of FIG. 6b is true for both operation modes of information carrier beam 132—the Continuous Wave (CW) mode and the pulse mode.

Phase shifter 220 can be of the type that applies pressure, by use of a piezoelectric crystal, on optical fiber 232 to change its refractive index and thus to change the phase of the radiation that propagates in fiber 232. Phase shifter 220 can be of the type that thermally changes the refractive index of fiber 232 to change the phase of the radiation that propagates in this fiber.

Alternatively, shifter 220 can be made of semiconductor material fabricated by thin film techniques that change its refractive index due to injection of charge carriers into its guiding media. This change in the refractive index shifts the phase of the radiation propagating in the media of shifter 220. In this case the shifter is a separate device and is not an integral part of fiber 232 and thus should have two ports for coupling fiber 232 into and fromf device 220. In all the above types of phase shifter 220, applying voltage to shifter 220 through electrode 222 activates shifter 220. Adjusting the phase shift of shifter 220 is achieved by adjusting the applied voltage on electrode 222.

Figure 7A:
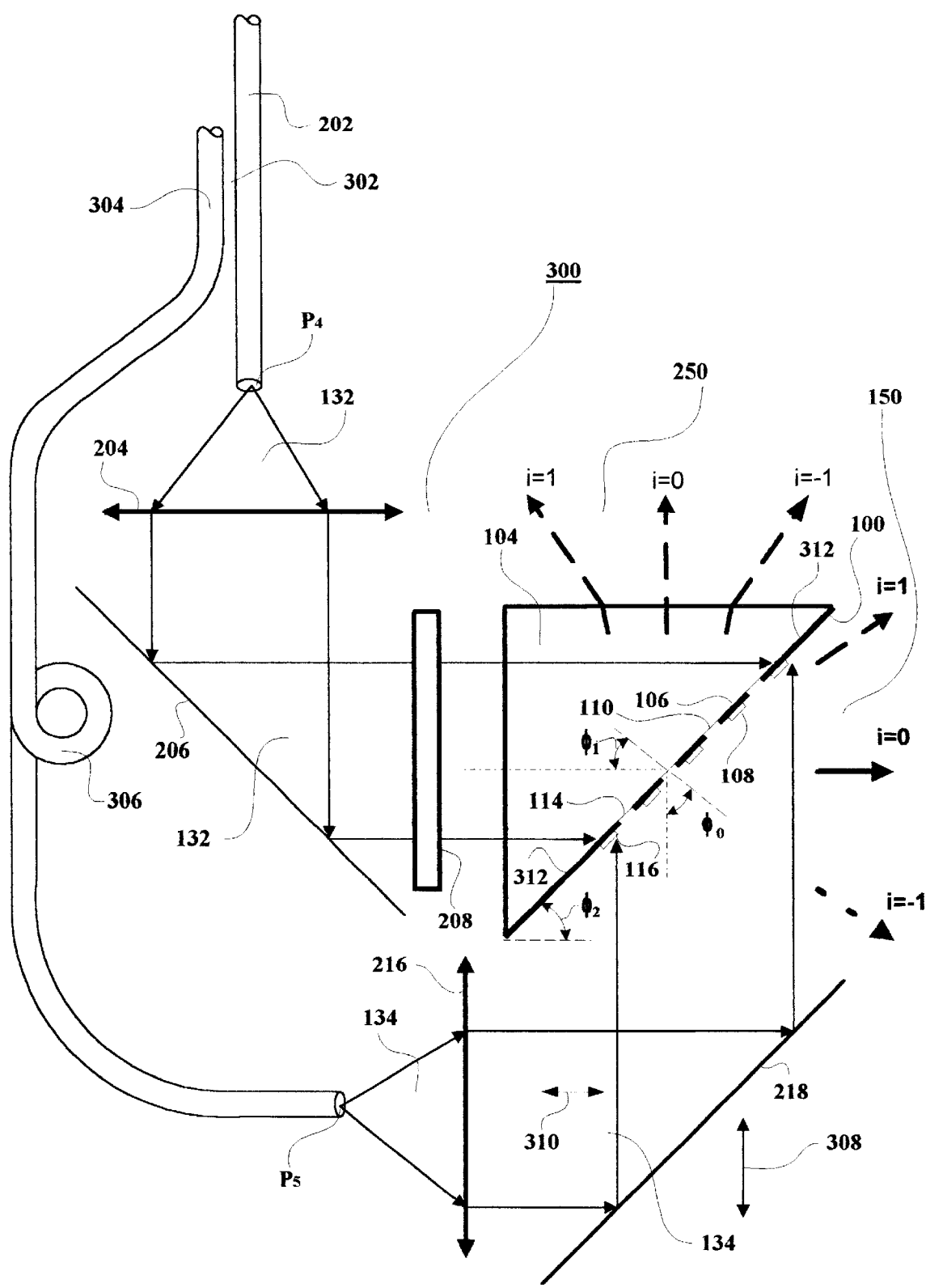
FIG. 7a shows additional all-optical design for controlling the interference patterns of the combined grating.

FIG. 7a—Additional All-Optical Design for Controlling Interference Patterns of Combined Grating FIG. 7a schematically illustrates optical system 300 that is similar to optical system 200 of FIG. 6a. System 300 of FIG. 7a differs from system 200 of FIG. 6a only in the way that control radiation 134 is produced. While in system 200 laser 210, controlled by unit 214, produces control radiation 134, such control radiation 134, in system 300, is produced by coupling part of the radiation of information-carrier radiation 132 from optical fiber 202, into optical fiber 304. Directional-coupler 302 is a 3 dB directional coupler. Thus coupler 302 couples half of the energy of carrier radiation 132 from fiber 202, in which radiation 132 propagates, into fiber 304. The other half of the energy of radiation 132 continues propagating along fiber 202 and is emitted out from port P₄ at the output of fiber 202. The radiation energy that is coupled into optical fiber 304 propagates and guided along this fiber through delay-fiber 306 and is emitted, as control radiation 134, from fiber 304 at its output through port P₅. Radiations 132 and 134 are converted, by lenses 204 and 216, into wide radiation beams 132 and 134, respectively, in the same way that this conversion is performed in system 200 of FIG. 6a.

The rest of the optical paths of beams 132 and 134, started from lenses 204 and 216 in system 300, respectively, are similar to the optical paths of beams 132 and 134, started from lenses 204 and 216 in system 200, respectively, as illustrated by FIG. 6a and described in its explanations.

Similarly, interference patterns 150 and 250 are produced, by beams 132 and 134, in a similar way, in both systems, system 200 and system 300 as illustrated in FIGS. 6a and 7a and explained above in the explanation of FIG. 6a. Thus the explanations given above for FIG. 6a will not be repeated here.

Reflector 218 is arranged to move along arrows 308 to gently adjust the length of the optical path between reflector 218 and combined grating 100 to assure phase matching between beam 132 passing through grating 100 and beam 134 reflected from grating 100. While reflector 218 moves along arrows 308, it also causes to undesired shifting of beam 134 along arrows 310. To avoid any irradiation change of grating 100 by the movement of beam 134 along arrows 310, a non-reflecting, non-transmitting frame with high absorbency is formed in the surrounding of grating 100. Frame 312 is narrower than the width of beam 134 and thus when bean 134 moves along arrows 310, the whole area of grating 100 remains irradiated and without changes.

Delay-fiber 306 produces a time delay Δt between control radiation beam 134 and carrier radiation beam 132. An explanation of how the amount of delay Δt affects interference patterns 150 and 250 is given below in the explanations for FIG. 7c.

Figure 7B:
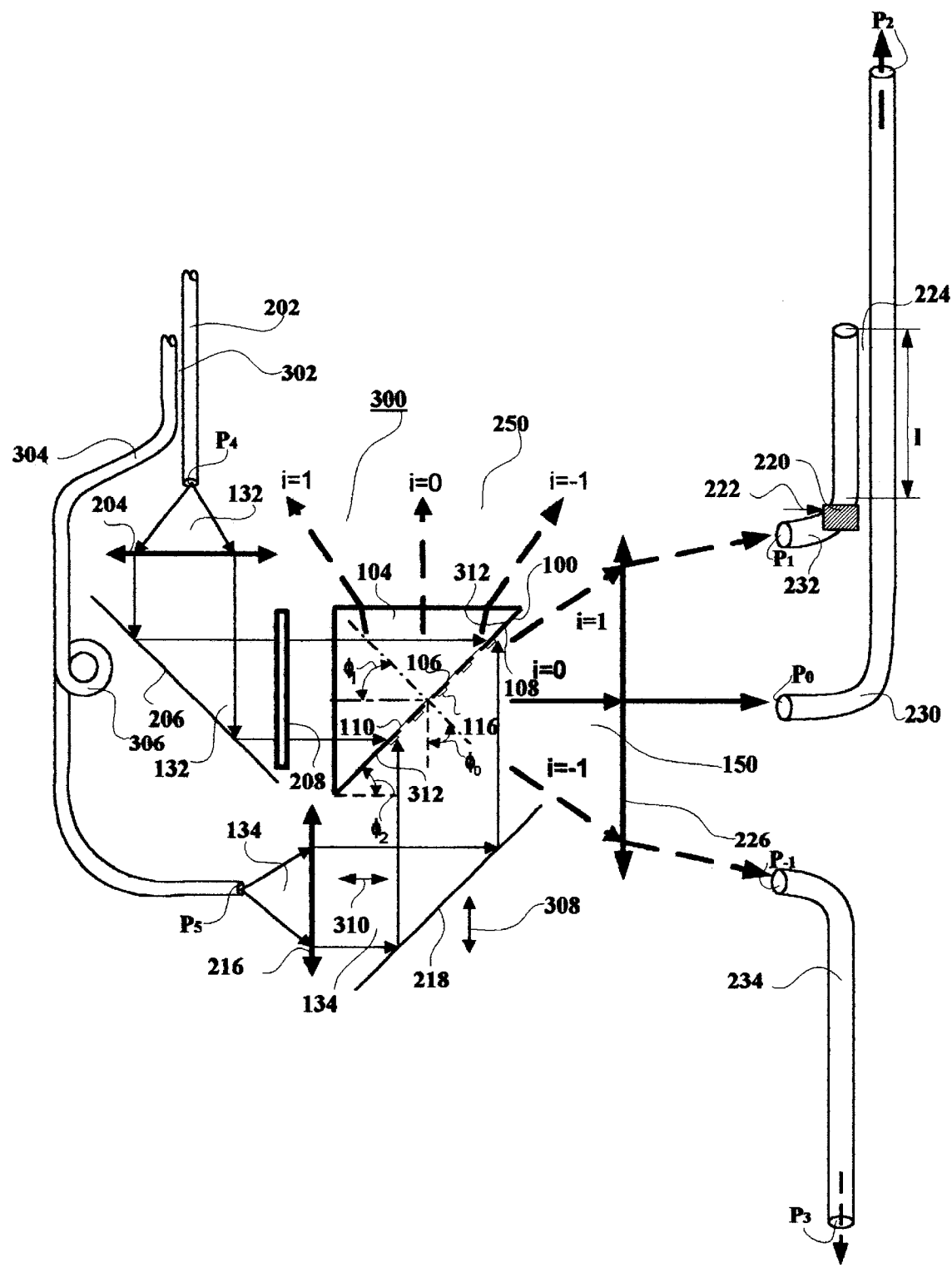
FIG. 7b is an illustration of an additional design for all-optical switching of the information carrier-beam between ports using the control beam.

FIG. 7b—Additional Design for All-Optical Switching of Information Carrier-Beam Between Ports Using Control Beam FIG. 7b illustrates same optical system 300 of FIG. 7a, described above, with additional ports P₀, P₁, P₋₁, P₂, and P₃ arranged to receive interference pattern 150 from coupling lens 226.

Switching the emission of the radiation of information carrier-beam 132 between ports P₂ and P₃ of optical fibers 230 and 234 is achieved by changing interference pattern 150 from having three beams (three interference orders i=0, 1, and −1) to include only one beam (interference order i=0). The way in which the change of interference pattern 150 dictates which of ports, P₂ or P₃, is the one that emits carrier beam 132, similar to FIG. 6b and explained above.

Delay-fiber 306 produces a time delay Δt between control radiation beam 134 and carrier radiation beam 132. The amount of delay Δt affects interference patterns 150 and 250 and thus dictates the switching state between port P₂ and P₃. An explanation of how the amount of delay Δt affects interference patterns 150 and 250 and thus the switching position between ports P₂ and P₃ is given below in the explanations for FIG. 7c.

Figure 7C:
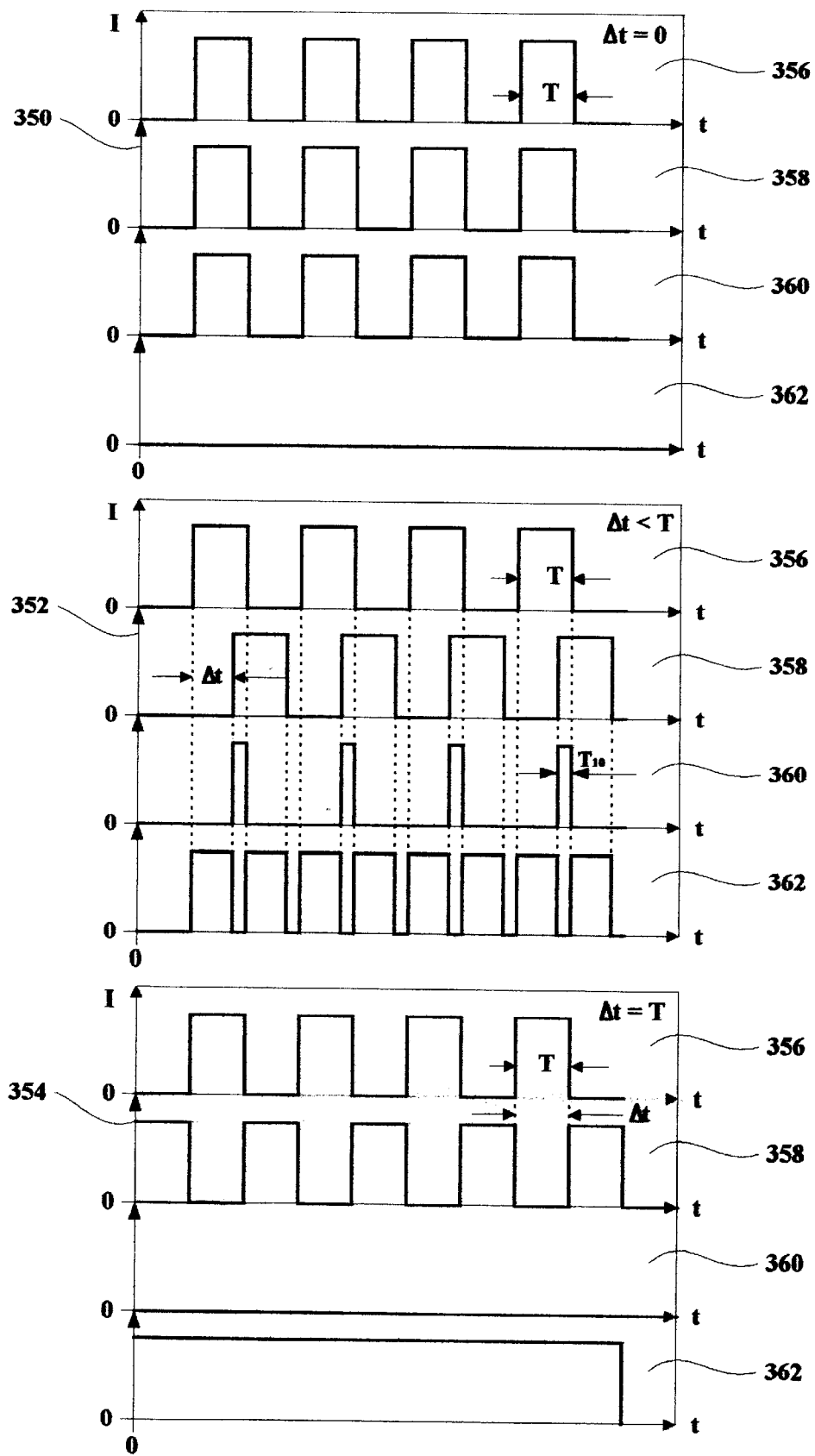
FIG. 7c illustrates, by graphs, all-optical switching of the information carrier-beam between the ports using different pulse width and time delays between the carrier and control beams.

FIG. 7c—All-Optical Switching of Information Carrier-Beam Between. Ports Using Different Pulse-Width and Time-Delays Between Carrier Beam and Control Beam FIG. 7c shows graphs 356, 358, 360, and 362 of the radiation intensity I versus time t for information-carrier beam 132, control beam 134, the radiation emitted from port P₂, and the radiation emitted from port P₃, respectively. P₂ and P₃ are the ports illustrated by FIGS. 6b and 7b and all the pulses in the above graphs have time width T. Intensity I in graphs 356–362 is shown in arbitrary units and there is no proportion between the intensity I of different graphs 356–362.

Graphs 356–362 are gathered in several groups classified according to the time delay Δt between information carrier beam 132 and control beam 134. Graph 356–362 of groups 350, 352, and 354 are related to time delays Δt=0, Δt<T, and Δt=T, respectively.

Time-delays Δt between information carrier beam 132 and control beam 134 can be produced, for example, by control unit 214 of laser 210 as shown in system 200 of FIG. 6b or by delay-fiber 306, as illustrated in system 300 FIG. 7b.

For graphs 356–362 of group 350 Δt=0, which means that the pulses of information carrier beam 132, shown in graph 356, and the pulses of control beam 134, shown in graph 358, are in phase without any delay between them. In this case combined grating 100, in optical systems 200 and 300 of FIGS. 6b and 7b, respectively, is irradiated on both of its sides simultaneously and acts as a grating having pitch d<λ. Accordingly, grating 100 produces interference pattern 150 having only one beam (interference order i=0) that is similar to the interference pattern illustrated by graph 150A of FIG. 5. In such a situation and as explained above in the description to FIG. 6b, the radiation intensities of carrier beam 132 and control beam 134 are emitted out and together only from port P₂, as shown by graph 360. The radiation intensity in port P₃ is zero, as illustrated by graph 362. It is obvious that when the radiation intensity of both of beams 132 and 134 is zero, then the radiation intensities at ports P₂ and P₃ is also zero, as shown by graphs 360 and 362, respectively.

For graphs 356–362 of group 352 Δt<T, which means that the pulses of information carrier beam 132, shown in graph 356, and the pulses of control beam 134, shown in graph 358, have a time-overlapping $T_{10}$ between them. Time overlapping $T_{10}$=T—Δt. In this case, for the time period equal to $T_{10}$, combined grating 100 in optical systems 200 and 300 of FIGS. 6b and 7b, respectively, is irradiated on both of its sides simultaneously and acts as a grating having pitch d<λ. Accordingly, grating 100 produces interference pattern 150 having only one beam (interference order i=0) that is similar to the interference pattern illustrated by graph 150A of FIG. 5. For the time period of time-overlapping $T_{10}$, and as explained above for FIG. 6b, the radiation intensities of carrier beam 132 and control beam 134 are emitted out and together only from port P₂, as shown by graph 360. The radiation intensity in port P₃ is zero, as illustrated by graph 362.

For the time periods that are differ from time-overlapping $T_{10}$, there are three situations:
(1) Carrier beam 132 is on and control beam 134 is off. (2) Carrier beam 132 is off and control beam is on. (3) Beams, 132 and 134 are off.

For the first situation, grating 100, of FIGS. 6b and 7b is irradiated solely, by beam 132, only on its side that includes grating layer 106 and thus behaves as a grating having pitch λ<d<2λ. This produces interference pattern 150 that is similar to interference pattern 150B of FIG. 5. As explained in the description to FIG. 6b, intensity I emitted from port P₂ is zero, as shown by graph 360. Part of the radiation intensity of carrier beam 132 is emitted from port P₃ as illustrated by graph 362.

For the second situation, grating 100 of FIGS. 6b and 7b is irradiated, solely by beam 134, only on its side that includes grating layer 108. Thus it behaves as a grating having pitch $\lambda<d<2\lambda$ which produces interference pattern 150 that is similar to interference pattern 150B of FIG. 5. As explained in the description to FIG. 6b, the intensity I emitted from port $P_2$ is zero, as shown by graph 360. Part of the radiation intensity of carrier beam 134 is emitted from port $P_3$ as illustrated by graph 362.

For the third situation, it is obvious that when the radiation intensity of both beams 132 and 134 is zero, then the radiation at ports $P_2$ and $P_3$ is also zero as shown by graphs 360 and 362, respectively.

For graphs 356–362 of group 354 $\Delta t=T$. This means that the pulses of information carrier beam 132, shown in graph 356, and the pulses of control beam 134, shown in graph 358, have a time-overlapping $T_{10}$ between them that is equal to zero. Grating 100 is irradiated alternately either by beam 132 on its side that contains grating layer 106 when beam 134 is off or by beam 134 on its side that contains grating layer 108 when beam 132 is off. This case is equivalent to switching alternately between the first situation and the second situation described above for group 352 of graphs 356–362. The switching between the first and the second situations is done immediately. As described above for the first and the second situations, the intensity emitted from port $P_2$ is zero for both of the situations. This is shown by graph 360, and part of the radiation intensities of beam 132 or beam 134 is emitted alternately from port $P_3$ in the first or the second situation, respectively.

Accordingly, the radiation intensity emitted from port $P_2$, shown by graph 360, is always zero and the intensity emitted from port $P_3$ is always constant, as shown by graph 362.

Optical systems 200 and 300 of FIGS. 6b and 7b can be operated as optical switches for switching the emitted radiation between ports $P_2$ and $P_3$ by changing $\Delta t$ from zero to $\Delta t=T$ and vice-versa.

In addition, optical systems 200 and 300 of FIGS. 6b and 7b can be operated as optical modulators for producing very narrow pulses.

For example, the time width of the pulses emitted from port $P_2$, illustrated by graph 360 of group 352 is $T_{10}$ when $T_{10}=T-\Delta t$. The pulse width T of carrier beam 132 or control beam 134 is the shortest that can be achieved with the technologies known today. When using $\Delta t \approx T$, then width $T_{10}$ of the pulses emitted from port $P_2$ of systems 200 and 300 of FIGS. 6b and 7b, respectively, approaches zero. This means that the pulses at port $P_2$ are much shorter than the shortest pulses than can be achieved with present technologies. The frequency of the short radiation pulses at port $P_2$ is equals to the frequency of the original longer pulses of radiation beams 132 or 134.

Optical systems 200 and 300 of FIGS. 6b and 7b, respectively, can be operated as optical modulators that act like optical differentiator systems. When optical systems 200 and 300 operate as a differentiator, their operation is similar to electrical differentiator circuits in the sense that in both types of differentiators, optical and the electrical, the short pulses are derived from wider pulses while maintaining the original frequency.

Interference pattern 250 of FIGS. 6a–7b is produced when control beam 134 passes through grating layer 106 when its pitch d satisfies $\lambda<d<\lambda 2\lambda$. Accordingly interference pattern 250 includes three beams corresponding to interference pattern orders i=0, 1, and −1. The beams of interference pattern 250 exist only when control beam 134 is on and thus they are illustrated in FIGS. 6a–7b, by broken lines, having the interference indices i=0, 1, and −1. Similarly, the beams of interference pattern 150 have indices of interference orders i=1 and i=−1. They exist only when one of beams 132 or 134 is on and the other beam (134 or 132, respectively) is off and thus are also illustrated in FIGS. 6a–7b by broken lines.

Figure 8A:
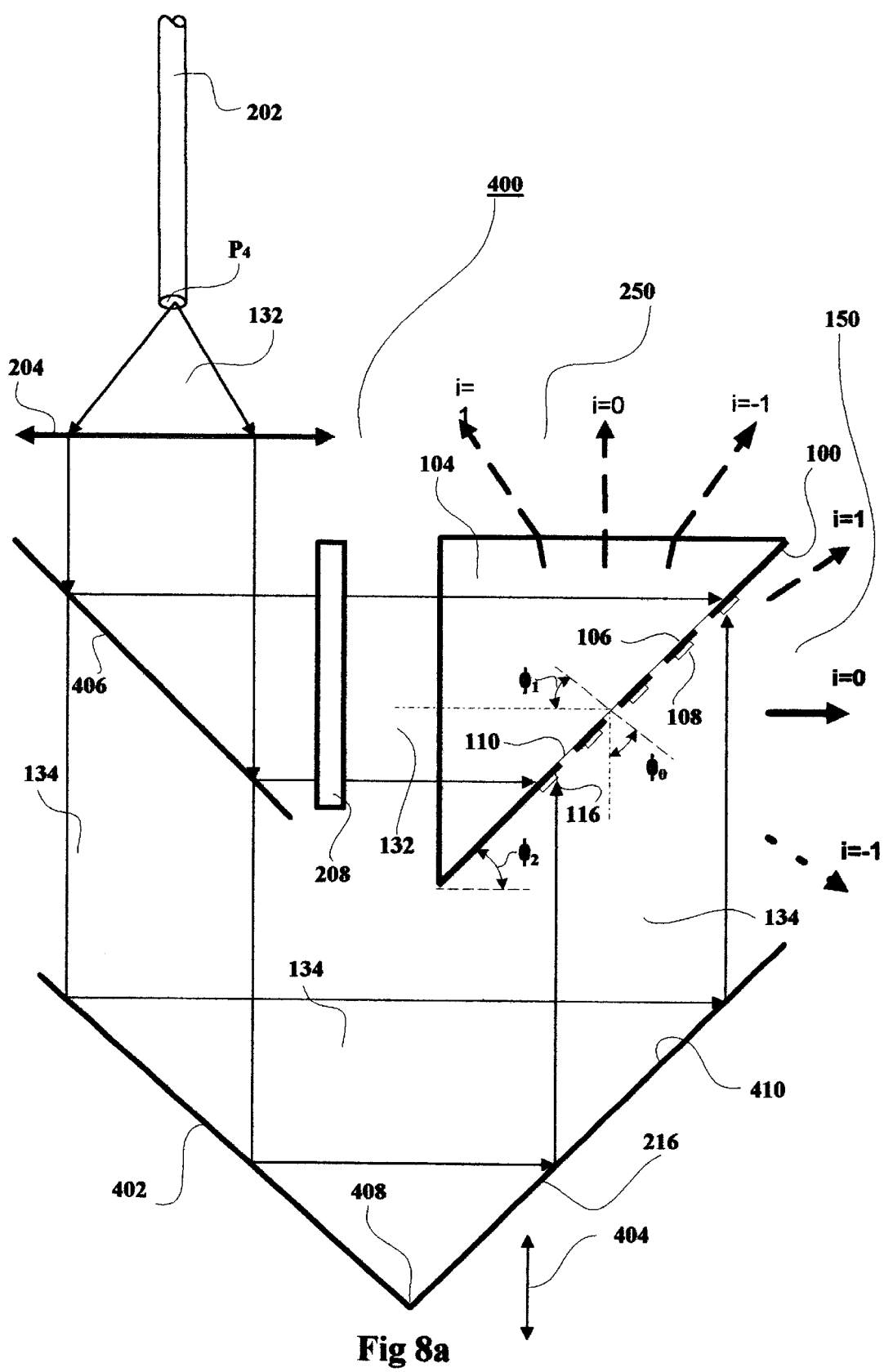
FIG. 8a shows another all-optical design for controlling the interference patterns of the combined grating.

FIG. 8a—Another All-Optical Design for Controlling Interference Patterns of Combined Grating FIG. 8a schematically illustrates optical system 400 that is similar to optical systems 200 and 300 of FIGS. 6a and 7a, respectively. System 400 of FIG. 8a is differing from systems 200 and 300 of FIGS. 6a and 7a, respectively, only in the way that control radiation 134 is produced. In system 200 laser 210 that is controlled by control unit 214 produces control radiation 134. Radiation 134 in system 300 is produced by coupling part of the radiation of information-carrier radiation 132 from optical fiber 202 into optical fiber 304. The radiation that is coupled into optical fiber 304 propagates and guided along this fiber through delay-fiber 306 and is emitted, as control radiation 134, from fiber 304 at its output through port P5.

In optical system 400 of FIG. 8a radiation 132 emitted from the output of optical fiber 202 at port $P_4$ is converted, by lens 204, into wide radiation beam 132. Radiation beam 132 propagates from lens 204 toward beam-splitter 406. Part of beam 132 is directed toward attenuator 208 and passes through this attenuator. Beam 132 continues to propagate from attenuator 208 and enters block 104 to impinge on combined grating 100 on its side that includes grating layer 106. The other part of beam 132 is transmitted by beam-splitter 406 as wide control radiation beam 134 directed toward reflector 402. Reflector 402 receives control beam 134 and reflects this beam toward reflector 216 that reflects and directs beam 134 toward combined grating 100. Control beam 134 impinges on grating 100 on its side that includes grating layer 108.

The rest of the optical paths of beams 132 and 134, started from combined grating 100 in system 400 of FIG. 8a, are similar to the optical paths of beams 132 and 134, started from grating 100 in systems 200 and 300, as illustrated in FIGS. 6a and 7a and described in their explanations.

Similarly, interference patterns 150 and 250 are produced, by beams 132 and 134, in a similar way, in all of the systems, systems 200, 300 and 400 as illustrated in FIGS. 6a, 7a and 8a and explained above in the accompanied explanation to FIGS. 6a and 7a. Thus the explanations given above for FIGS. 6a and 7a will not be repeated here.

Reflectors 402 and 216 are attached together at point 408 and are oriented at right angle to each other. Reflectors 402 and 216 actually form a retro-reflector 410. Reflector 410 is arranged to move, along arrows 404, to gently adjust the length of the optical path between reflector 216 and combined grating 100 to assure phase matching between beam 132, passing through grating 100, and beam 134 reflected from grating 100.

Equalizing the radiation intensities of beam 132, passes through grating 100, and beam 143, reflected from grating 100, is achieved by adjusting the attenuation factor of attenuator 208.

While retro-reflector 410 moves along arrows 404 it does not cause to any undesired lateral shifting of beam 134 as it occurs in system 300 in which moving reflector 218 along arrows 308 causes to movement of beam 134 along arrows 310.

Large movement of retro-reflector 410 along any desired distance, oriented in the direction of arrows 404, changes the length of the optical path between reflector 410 and grating 100 and thus produces a time delay $\Delta t$ between control radiation beam 134 and carrier radiation beam 132. An explanation of how the amount of delay Δt affects interference patterns 150 and 250 is given above in the explanations for FIG. 7c.

Figure 8B:
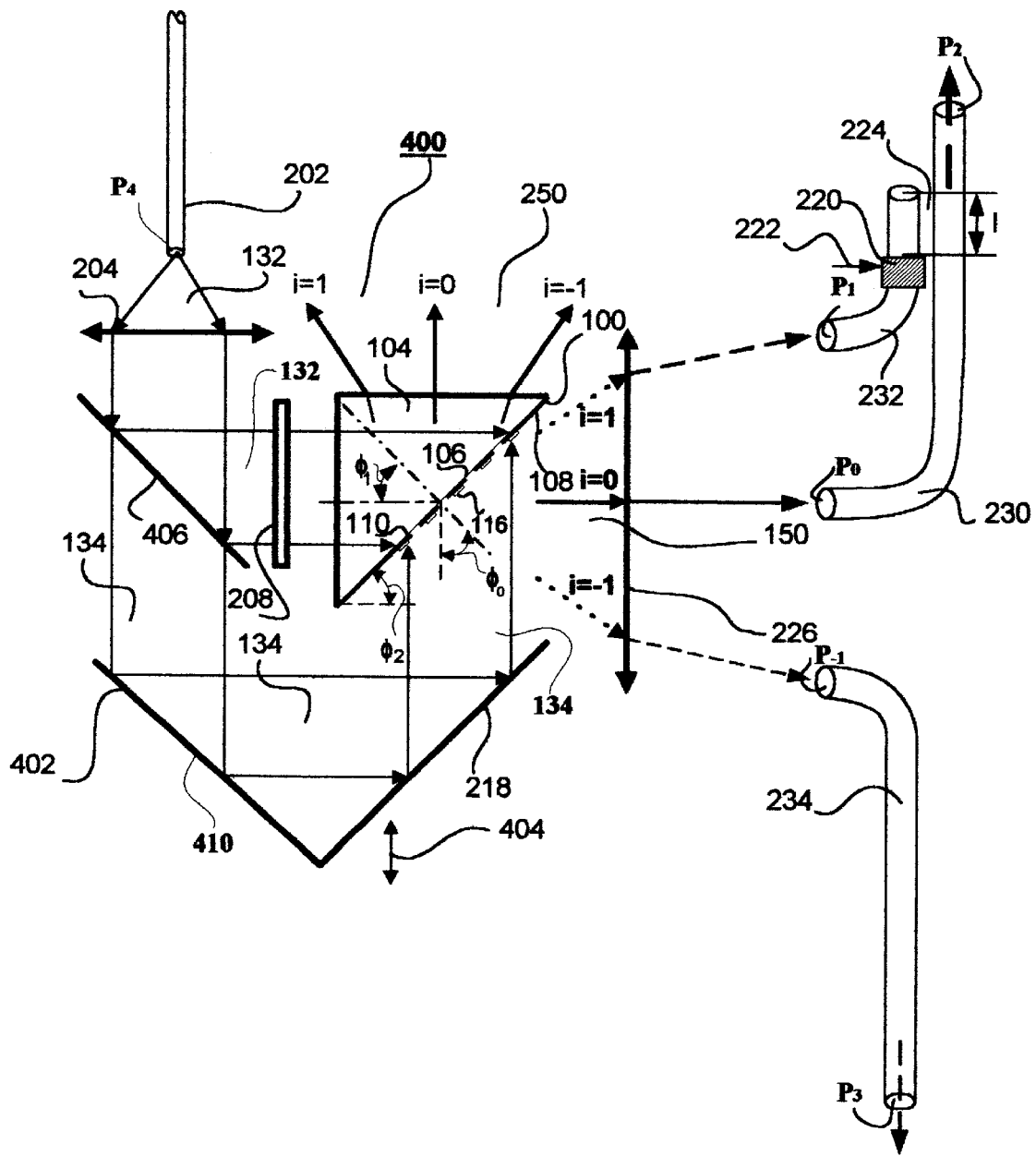
FIG. 8b illustrates additional an all-optical design for switching the information carrier beam between ports using the control beam.

FIG. 8b—Additional All-Optical Design for Switching Information Carrier-Beam Between Ports Using Control Beam FIG. 8b illustrates same optical system 400 of FIG. 8a, described above, with additional ports P₀, P₁, P₋₁, P₂, and P₃ arranged to receive interference pattern 150 from coupling lens 226.

Switching the emission of the radiation of information carrier-beam 132 between ports P₂ and P₃ of optical fibers 230 and 234 is achieved by changing interference pattern 150 from having three beams (three interference orders i=0, 1, and −1) to include only one beam (interference orders i=0). The way in which the change of interference pattern 150 dictates which of ports, P₂ or P₃, is the one that emits carrier beam 132 is similar to the illustrated by FIGS. 6b and 7b, is explained above.

Retro reflector 410 produces a time delay Δt between control radiation beam 134 and carrier radiation beam 132. The amount of delay Δt affects interference patterns 150 and 250 and thus dictates the switching state between port P₂ and P₃. An explanation of how the amount of delay Δt affects interference patterns 150 and 250 and thus the switching position between ports P₂ and P₃ is given above in the explanations of FIG. 7c.

Figure 9:
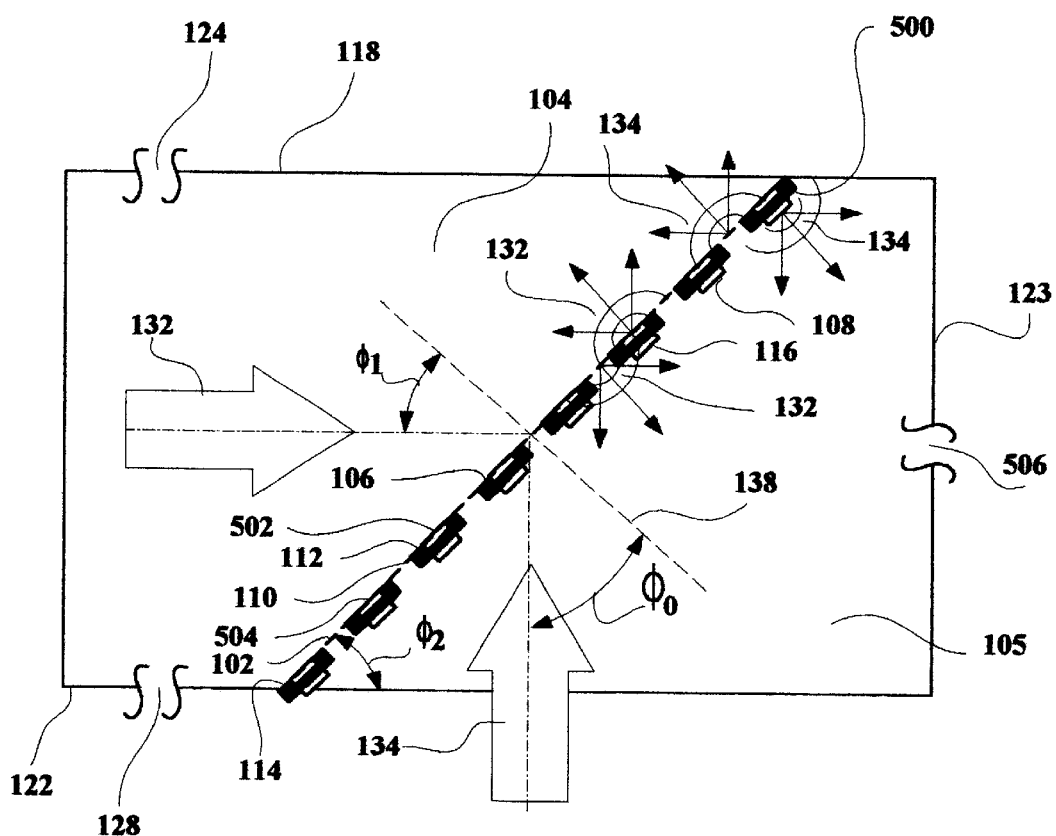
FIG. 9 is an illustration of additional design for a combination transmitting and reflecting grating.

FIG. 9—Additional Design for Combined Transmitting and Reflecting Grating

FIG. 9 is an additional design for a combination of transmitting and reflecting grating 500 designed according to the invention. The design is achieved by bonding block 105 to block 104.

Blocks 105 and 104 and their glue have the same index of refraction, as explained above. Avoiding reflection of the radiation passes from block 104 to 105 (and vice-versa) allows a complete transmitting of radiations 132 and 134 through openings 110. Lines 118, 122, and 123 with cuts 128, 124, and 506 are illustrated for emphasizing that the dimensions of combined grating 500 and are not proportional to the dimensions of blocks 104 and 105. In reality the dimensions of grating 500 are much smaller than their proportional size as illustrated by FIG. 9.

When blocks 104 and 105 have the same refractive index and are bonded with index matching glue, the refractive index on both sides of combined grating 100 is the same and equal to N1.

Accordingly, by substituting refractive index N₀ with refractive index N₁ in Eqs. (11) and (12) we get the condition for maintaining phase matching between radiations 132 and 134 all over the planes of grating 500:

$$\phi_0=\phi_1=\phi_2=45°.$$

The same holographic and photolithographic techniques that produce combined grating 100 produce also combined grating 500. Grating 500 contains grating layers 502, 106, and 108. Reflecting lines 504 and 116 of grating layers 502 and 108 are centered along lines 114 of grating layer 106.

The above condition for angles $\phi_0$, $\phi_1$, and $\phi_2$ assures that there will be phase matching between the radiation reflected from grating 500 and the radiation that passes through grating 500. This phase matching is maintained all over both sides of combined grating 500 that includes grating layers 502 and 108.

Radiation beam 132 passes through openings 110 of grating layer 106 of combined grating 500 and is reflected from lines 504 of grating layer 502 of combined grating 500.

Similarly, radiation beam 134 passes through openings 110 of grating layer 106 of combined grating 500 and is reflected from lines 116 of grating layer 108 of combined grating 500.

When only radiation beam 132 is on, part of it passes through grating layer 106 of combined grating 500 to produce an interference pattern similar to interference pattern 150 of FIGS. 6a–8b. The other part of beam 132 is reflected by grating layer 502 of combined grating 500 to produce an interference pattern similar to interference pattern 250 of FIGS. 6a–8b.

When only radiation beam 134 is on, part of it passes through grating layer 106 of combined grating 500 to produce an interference pattern similar to interference pattern 250 of FIGS. 6a–8b. The other part of beam 134 is reflected by grating layer 108 of combined grating 500 to produce an interference pattern similar to interference pattern 150 of FIGS. 6a–8b.

Grating layers 502, 106, and 108 all have pitch d that satisfies λ<d<2λ. Accordingly, when only one beam 132 or 134 is on and the other beam (134 or 132, respectively) is off, interference patterns such as 150 and 250 shown in FIGS. 6a–8b are of the type of interference pattern 150B shown in FIG. 5. Interference Pattern 150B has three beams corresponding to interference orders i=0, 1, and −1.

When both beams 132 and 134 are on simultaneously, the part of the radiation of beam 134 reflected from grating layer 108 and the part of the radiation of beam 132 that passes through grating layer,106 produce an interference pattern, such as interference 150 of FIGS. 6a–8b. The combination of grating layers 106 and 108 of grating 500 produces grating with a pitch d that satisfies d<λ. Accordingly, in this case, the interference pattern is similar to interference pattern 150A of FIG. 5 that has only one beam corresponding to interference order i=0.

Similarly, when both beams 132 and 134 are on simultaneously, the part of the radiation of beam 132 reflected from grating layer 502 and the part of the radiation of beam 134 that passes through grating layer 106 produce an interference pattern such as interference 250 of FIGS. 6a–8b. The combination of grating layers 106 and 502 of grating 500 produces grating with a pitch d that satisfies d<λ. Accordingly, the interference pattern is similar to interference pattern 150A of FIG. 5 that has only one beam corresponding to interference order i=0.

Combined grating 500 is symmetric with respect to beams 132 and 134 and, unlike combined grating 100, it produces interference patterns such as 150 and 250 of FIGS. 6a–8b that are the same for any combination of on-and-off of beams 132 and 134.

In FIGS. 6a–8b, when using combined grating 100, only the energy of interference pattern 150 is used, for switching and modulating purposes, and the energy of interference pattern 250 is lost. The use of combined grating 500 allows using two interference patterns, such as interference patterns 150 and 250 in FIGS. 6a–8b, for the same or similar applications as shown in FIGS. 10–12 described below.

For the clarity and without limitation, combined grating 500 is illustrated by its simpler version that does not include transparent block 105. The two versions of grating 500 are analoous to the two versions of grating 100 in FIGS. 2a and 2b, without or with transparent block 105, respectively.

Figure 10A:
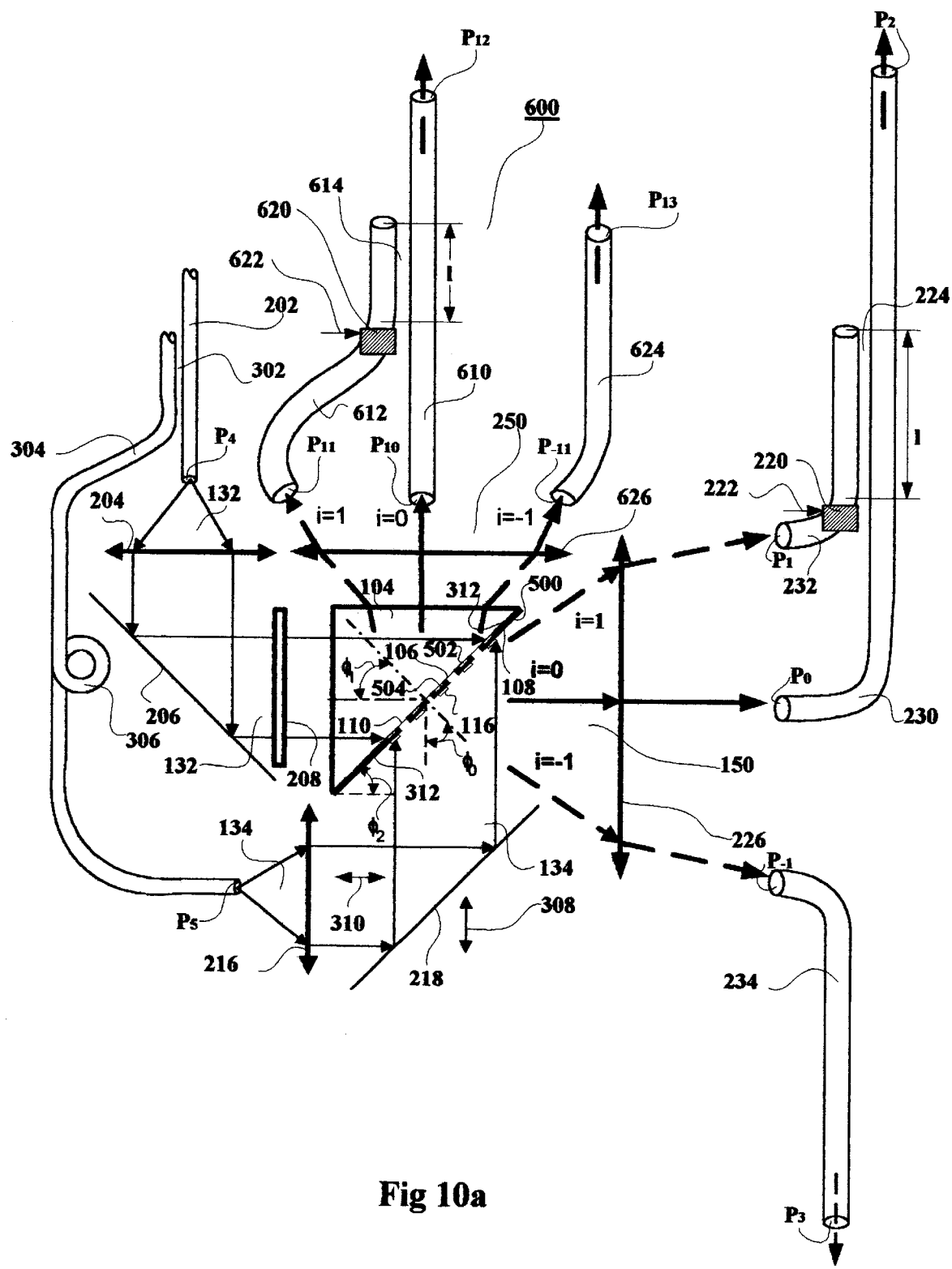
FIG. 10a shows more efficient design of the optical system including additional ports.

FIG. 10a—More Efficient Optical System Including Additional Ports

FIG. 10a schematically illustrates an all optical modulating and switching system 600 that is similar to optical system 300 of FIG. 7b with the following differences:

Combined grating 100 in system 300 of FIG. 7b is replaced in system 600 of FIG. 10a by the more efficient combined grating 500 illustrated by FIG. 9.

Radiation guides 610, 612 and 624 collect the radiation of interference pattern 250, in system 600 of FIG. 10a. Unlike system 300 of FIG. 7b, in which the radiation of interference pattern 250 is lost, system 600 collects the radiation of interference pattern 250 to be used in a way similar to the way that the radiation of interference pattern 150 is used.

Except for the above differences, the rest of the components of system 600, their arrangement, and their way of operation are similar to those of system 300 of FIG. 7b. Thus the explanation for the similar parts of systems 300 and 600 is not repeated.

As explained, grating 500 of FIG. 9 produces, with beams 132 and 134, interference patterns 150 and 250 that are the same and can be used for similar applications. For that reason, unlike system 300 in which interference pattern 250 is lost, in system 600 interference pattern 250 is collected by optical fibers 610, 612, and 624. Fibers 610, 612, and 624 have corresponding ports $P_{10}$, $P_{11}$, and $P_{-11}$ at their inputs to collect the radiation beams related to interference orders i=0, 1, and −1, respectively. The radiation of interference pattern 250 propagating from grating 500 is received by coupling lens 626 that couples this radiation into ports $P_{10}$, $P_{11}$, and $P_{-11}$.

Optical fibers 610, 612, and 624, with their input ports $P_{10}$, $P_{11}$, and $P_{-11}$ and output ports $P_{12}$ and $P_{13}$, are used to collect the radiation of interference pattern 250. These ports are similar to optical fibers 230, 232, and 234 with their input ports $P_0$, $P_1$, and $P_{-1}$ and output ports $P_2$ and $P_3$ used to collect the radiation of interference pattern 150 of FIGS. 6b, 7b, and 8b.

Similarly, directional coupler 614 and phase-shifter 620 with its electrode 622 are similar to directional coupler 224 and phase-shifter 220 with its electrode 222, as illustrated in FIGS. 6b, 7b, and 8b.

Thus all the components of FIG. 7c described above for the all-optical switching and modulating behavior of ports $P_2$ and $P_3$ including the behavior that depends upon the time delay Δt. Pulse width T also applies to ports $P_{12}$ and $P_{13}$.

The beams which have the interference orders i=+/−1 in both interference patterns 150 and 250 are illustrated by broken lines to illustrate that these beams disappear when both beams 132 and 134 are on simultaneously.

Figure 10B:
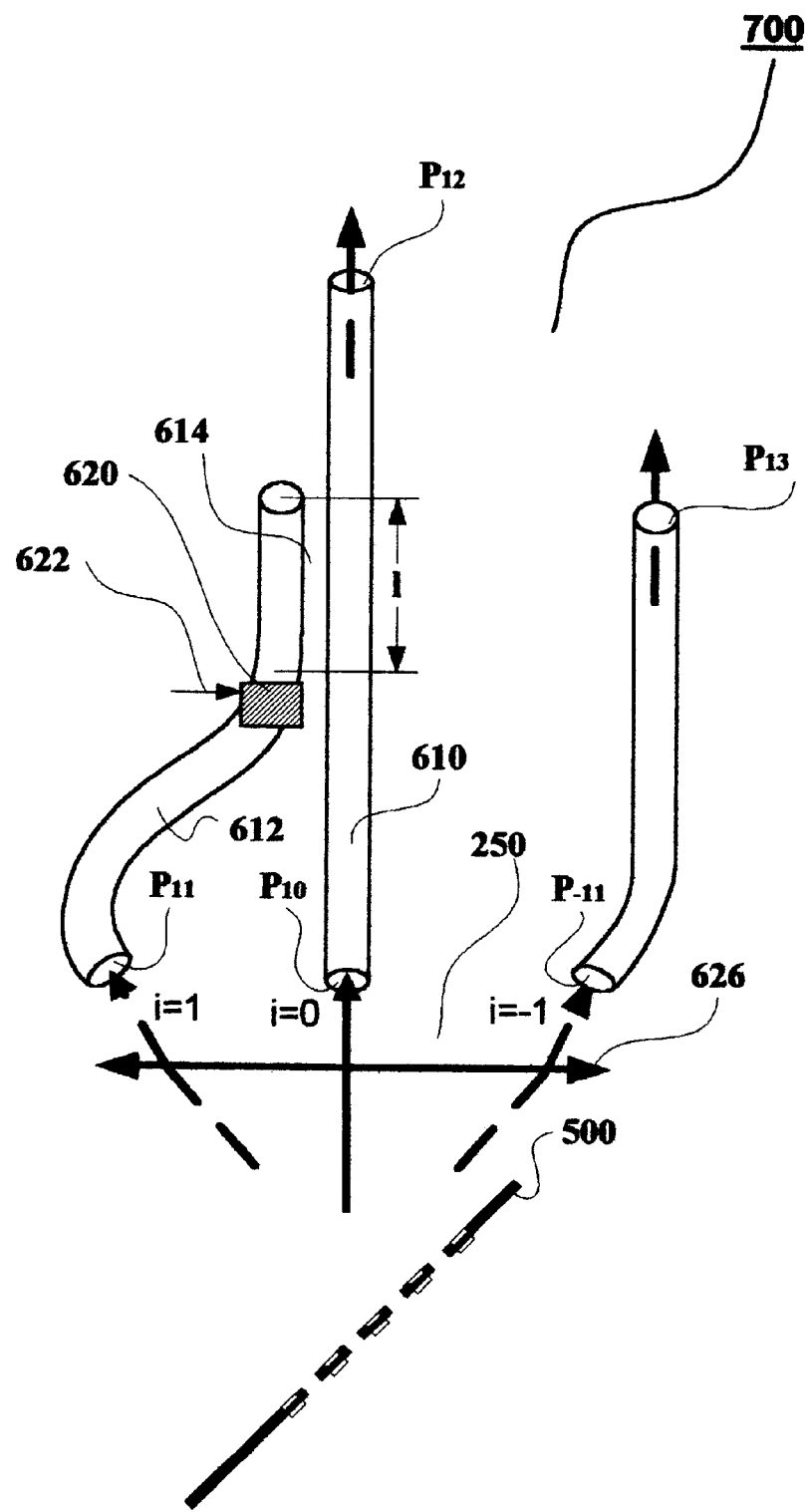
FIG. 10b is an illustration of upgrading unit used to achieve more efficient design of the optical system and including additional ports.

FIG. 10b—Upgrading Unit for More Efficient Design When Integrated With Switching and Modulating Systems, Including Additional Ports FIG. 10b illustrates an upgrading unit 700 designed to also collect the radiation energy of interference pattern 250 of systems 200 and 400 of FIGS. 6b and 8b, when their grating 100 is replaced by grating 500.

As explained above for grating 500 of FIG. 9, this grating produces, with beams 132 and 134 interference patterns 150 and 250 that are the same and can be used for similar applications. In systems 200 and 400 of FIGS. 6b and 8b, respectively, interference pattern 250 was lost. However when these systems are integrated with unit 700, interference pattern 250 is not lost and is collected by optical fibers 610, 612, and 624 of unit 700. Fibers 610, 612, and 624 have corresponding ports $P_{10}$, $P_{11}$, and $P_{-11}$ at their inputs to collect the radiation beams related to interference orders i=0, 1, and −1, respectively. The radiation of interference pattern 250 propagating from grating 500 is received by coupling lens 626 that couples this radiation into ports $P_{10}$, $P_{11}$, and $P_{-11}$.

Optical fibers 610, 612, and 624 of unit 700, with their input ports $P_{10}$, $P_{11}$, and $P_{-11}$ and output ports $P_{12}$ and $P_{13}$, are used to collect the radiation of interference pattern 250. These fibers are similar to optical fibers 230, 232, and 234 of systems 200 and 400, with their input ports $P_0$, $P_1$, and $P_{-1}$ and output ports $P_2$ and $P_3$. These fibers are used to collect the radiation of interference pattern 150.

Similarly, directional coupler 614 and phase-shifter 620 of unit 700, with its electrode 622, are similar to directional coupler 224 and phase-shifter 220 of systems 200 and 400, with their electrode 222, as illustrated in FIGS. 6b, 7b, and 8b.

Graphs 360 and 362 of FIG. 7c illustrate the all-optical switching and modulating behavior of ports $P_1$ and $P_2$ of systems 200 and 400, including how this behavior is dependent upon time delay Δt and pulse width T. The illustration of FIG. 7c stands also for ports $P_{12}$ and $P_{13}$ of unit 700.

The beams which have interference orders i=+/−1 in interference pattern 250 are illustrated by broken lines to show that these beams disappear when beams 132 and 134 are on simultaneously. These beams are coupled into ports $P_{11}$, and $P_{-11}$ by coupling lens 626.

FIG. 10a already illustrates the integration of unit 700 with system 300 of FIG. 7b to produce system 600. The way unit 700 improves the efficiency of optical system 600 is described above in the explanation of FIG. 10a. The improvement of systems 200 and 400 of FIGS. 6b and 8b, by integrating unit 700, is achieved in a similar way to the illustrated in FIG. 10a and described above and thus is not repeated here.

Figure 11A:
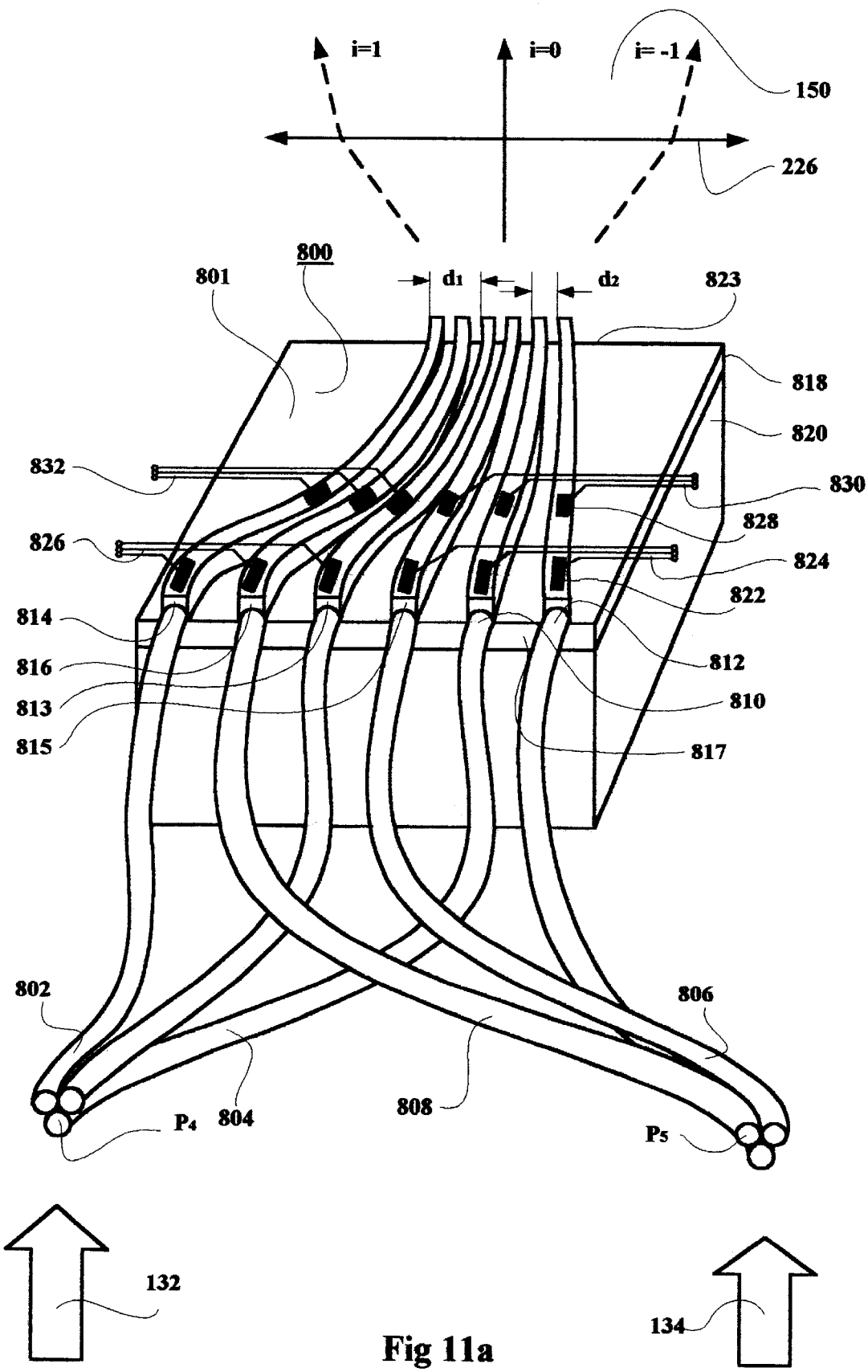
FIG. 11a shows an all-optical switching and modulating system using an interference optical waveguide device.
Figure 12:
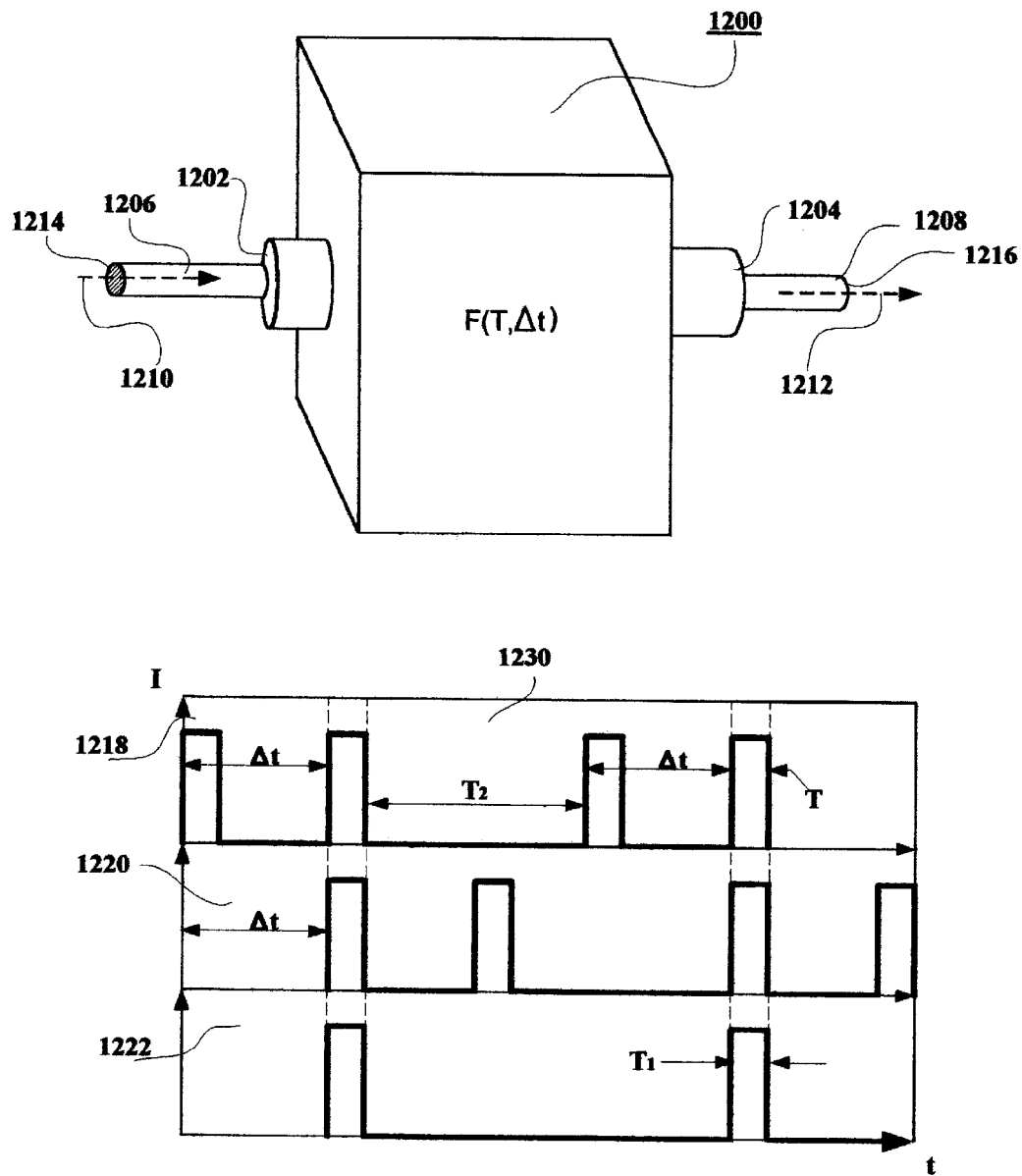
FIG. 12 shows all-optical switch that is self controlled using a predetermined code.

FIG. 11a—All-Optical Switching and Modulating Using Interference Device of Optical Waveguides FIG. 11a schematically Illustrates optical system 800 for an all-optical switching and modulating system, including interference device 801 made of groups of radiation guides 814 and 816.

Information carrier beam 132 is optically coupled into ports $P_4$ at the inputs of radiation guides 802 of bundle 804. The other sides 810, at the outputs of optical fibers 802, are optically coupled to inputs 813 of waveguides 814. Waveguides 814 are one group out of two groups of waveguides 814 and 816 that form interference device 801.

Similarly, control radiation beam 134 is optically coupled into ports $P_5$ at the inputs of radiation guides 806 of bundle 808. The other sides 812, at the outputs of optical fibers 806, are optically coupled to inputs 815 of waveguides 816. Waveguides 816 are one group out of two groups of waveguides that forms interference device 801.

Waveguides 814 and 816 are interleaves such that one waveguide 816 is located in each space between two waveguides 814 and vice-versa. The dimensions of optical fibers 802 and 806 are relatively large; thus the spaces between waveguides 814 and 816 fit the dimensions of fibers 802 and 806. The outputs of fibers 802 and 806 at their ends 810 and 812 are also relatively large. Thus inputs 813 and 815 of waveguides 814 and 816, respectively, are also designed to be large to allow efficient optical coupling between fibers 802 and 806 and inputs 813 and 815 of waveguides 814 and 816, respectively.

Waveguides 814 and 816 at output 823 of device 801 should be arranged in a very dense structure to assure that pitch $d_1$ between two following waveguides 814 or 816 satisfies $\lambda < d_1 < 2\lambda$. Also the pitch $d_2$ between the two following waveguides 814 and 816 should satisfy $d2<\lambda$.

Note, that the configuration of waveguides 814 and 816 changes from large waveguides separated by large spaces, at input 817 of device 801, to small waveguides separated by small spaces at output 823 of device 801. This is achieved by bending waveguides 814 and 816 and changing their size by shaping them in a form of an adiabatic taper.

Device 801 can be made, for example, of silica, fused silica, diffused glass, lithium niobate, liquid crystals, and semiconductors such as silicon, GaAs, AlGaAs, InP, InGaAsP, CdTe and CdZnTe. Device 801 is made of substrate 820, which carry confinement layer 818 to guide the radiation. Layer 818 has an index of refraction that is higher than the index of refraction of substrate 820. Growing epitaxial layers using techniques of Liquid Phase Epitaxy (LPE), Molecular Organic Chemical Vapor Deposition (MOCVD), and Molecular Beam Epitaxy (MBE) can produce layer 818. Diffusing dopants into substrate 820 can also produce layer 818. For example, diffusion of Ag ions into lithium-niobate substrate 820 can produce layer 818.

The fabrication of radiation waveguides 814 and 816 in layer 818 of device 801 is done using standard IC industry etching and photolithography techniques.

The radiation of information carrier beam 132 is coupled into ports $P_4$ of fibers 802 of bundle 804 and exits from fibers 802 at their sides 810. It is then coupled into inputs 813 of waveguides 814 at input 817 of device 801. Waveguides 814 carry the radiation of beam 132 to the output of guides 814 at output 823 of device 801. To avoid any delay between the radiation from guides 814 at output 823 of device 801, the total length of all the optical paths between ports $P_4$ and the outputs of guides 814 at output 823 are adjusted to be the same. Phase matching between the radiations from guides 814 at output 823 can be achieved by strong coupling between guides 814 to produce effect similar to phase lock. To produce more positive phase match between the radiations of guides 814, phase shifters 822 can be produced on top of guides 814 by thin film techniques. Their electrodes 824 and 826 can control each of phase shifters 822 separately. Controlling phase shifters 822 is done by applying control voltages to their electrodes 824 and 826, which in turn changes the refractive index of guides 814 and thus causes a phase shift of the radiation that they guide.

Maintaining equal intensity of all the radiations that exit from guides 814 at output 823 can be achieved by maintaining equal losses for all the optical paths between ports $P_4$ and the output of guides 814 at output 823. Alternatively, optical amplifiers 828 can be produced, on top of guides 814 by thin-film techniques. Amplifiers 828 are controlled separately through their electrodes 830 and 832 by applying control voltages. Thus the intensities of the radiations in guides 814 at output 823 can be controlled to be the same, by adjusting the amplifications of amplifiers 828.

The radiation of control beam 134 is coupled into ports $P_5$ of fibers 806 to be emitted from guides 816 at output 823 of device 801. This is done similar to the way in which the radiation of information carrier beam 132 is coupled into ports $P_4$ to be emitted from guides 814 at output 823 of device 801. In addition, the same control for the phases, the time delays, and the intensities described above for information carrier beam 132 propagating in guides 814 is applied to control beam 134 propagating in guides 816.

Accordingly when the radiation of information carrier beam 132 is coupled through ports $P_4$ of bundle 804 of fibers 802, it is divided and exits with the same intensity and phase. It does so from multiple guides 814 arranged in every other guide in the combined group of guides 814 and 816 at output 823 of device 801.

Similarly, when the radiation of control beam 134 is coupled through ports $P_5$ of bundle 808 of fibers 806, it is divided and exits. It does so with the same intensity and phase, from multiple guides 816 arranged in every other guide in the combined group of guides 814 and 816 at output 823 of device 801. The phases and the intensities of beams 132 and 134 at the outputs of guides 814 and 816 are equal.

As indicated above, waveguides 814 and 816 at output 823 of device 801 are arranged in a very dense structure to assure that pitch $d_1$ between two following waveguides 814 or 816 satisfies $\lambda < d_1 < 2\lambda$. Also the spacing $d_2$ between two following waveguides 814 and 816 should satisfy $d_2 < \lambda$.

The group of waveguides 814 and 816 at output 823 of device 801 is actually a phase array of radiation waveguides that act similarly to combined grating 100, illustrated and explained above. Thus device 801 acts as interference device similar to combined gratings 100 and 500. When only information carrier beam 132 or only control beam 134 is on, the combined group of guides at output 823 has a spacing d1 that satisfies $\lambda < d_1 < 2\lambda$.

This means that when only information carrier beam 132 or only control beam 134 is on, device 801 produces interference pattern 150 similar to interference pattern 150B of FIG. 5. The latter is produced by grating 100, and has three beams corresponding to interference orders i=0, 1, and −1.

When beams 132 and 134 are on simultaneously, the combined group of waveguides at output 823 has pitch $d_2$ that satisfies $d_2 < \lambda$. In this case interference pattern 150 that device 801 produces is similar to interference pattern 150A of FIG. 5, produced by grating 100, and having only one beam corresponding to interference order i=0.

Interference pattern 150 of FIG. 11a is collected by coupling lens 226 to couple the radiation beams of this pattern into the ports of an optical unit (not shown). This unit is similar to unit 700 of FIG. 10b but does not include grating 500 and coupling lens 626. The latter converts device 801 into all-optical switch and modulator.

Figure 11B:
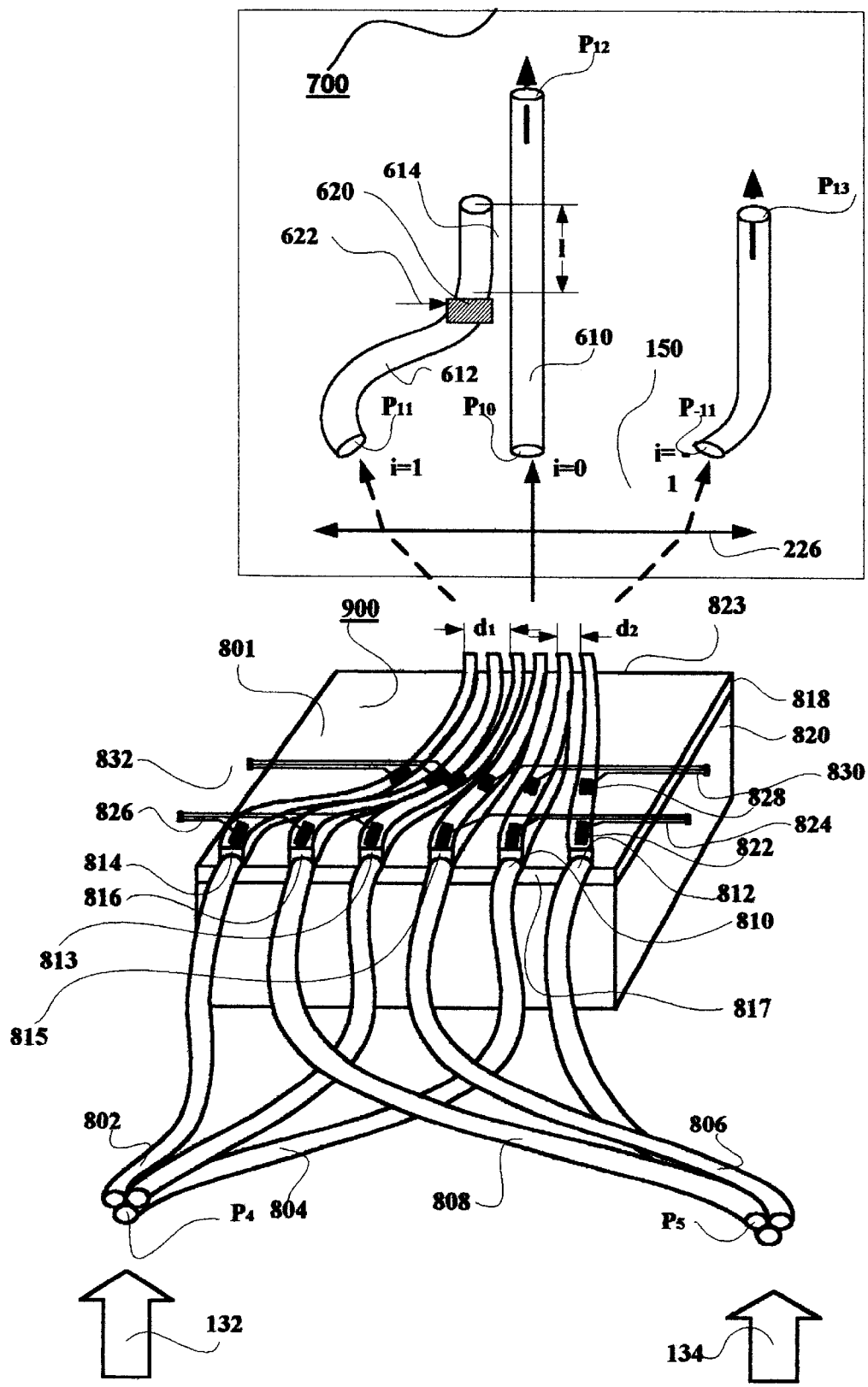
FIG. 11b illustrates an all-optical switching and modulating system using an interference device made of optical waveguides and output ports.

FIG. 11b—All-Optical Switching and Modulating Using Interference Device Having Optical Waveguides and Output Ports FIG. 11b illustrates an optical system 900 for all-optical switching and modulating. System 900 is a combination of systems 800 of FIG. 11a and 700 of FIG. 10b. System 700 does not contain grating 500 or coupling lens 626; the latter is replaced by coupling lens 226 of system 800.

System 900, as illustrated in FIG. 11a and explained above, produces interference pattern 150 of the types 150A or 150B of FIG. 5 according to the on or off condition of beams 132 and 134. The operational principle of system 700 is illustrated in FIGS. 6b, 7b, 8b, 10a and 10b and is explained in the accompanying descriptions. System 700 receives the radiation of interference pattern 150 and emits this radiation alternatively from ports $P_{12}$ and $P_{13}$. When only beam 132 or only beam 134 is on, then interference pattern 150 is of the type 150B, illustrated by FIG. 5, and only port $P_{13}$ emits the radiation of interference pattern 150. The latter is coupled to system 700 by lens 226 into ports $P_{10}$, $P_{11}$, and $P_{-11}$. The radiation intensity at port $P_{12}$ is zero.

Alternatively, when beams 132 and 134 are on simultaneously, then interference pattern 150 is of the type 150A, illustrated by FIG. 5. Only port $P_{12}$ emits the radiation of interference pattern 150; the latter is coupled to system 700 by lens 226 into ports $P_{10}$, $P_{11}$, and $P_{-11}$. Here the radiation intensity at port $P_{13}$ is zero.

The switching and modulating properties of system 900 are similar to those in FIG. 7b. Accordingly, the switching and modulating behavior of system 900 is a function of the pulse width T of beams 132 and 134 and the delay time $\Delta t$ between these beams. This is illustrated by FIG. 7c.

Control beam 134 can be produced, as shown in FIG. 6b, by laser 210 that is controlled by control unit 214. When laser 210 is turned on it is impossible to predict the phase of the its radiation beam 134. Accordingly, this configuration has the disadvantage of the difficulty of controlling the phase of beam 134 relative to beam 132. The configurations of FIGS. 11c and 11d solve this problem.

Figure 11C:
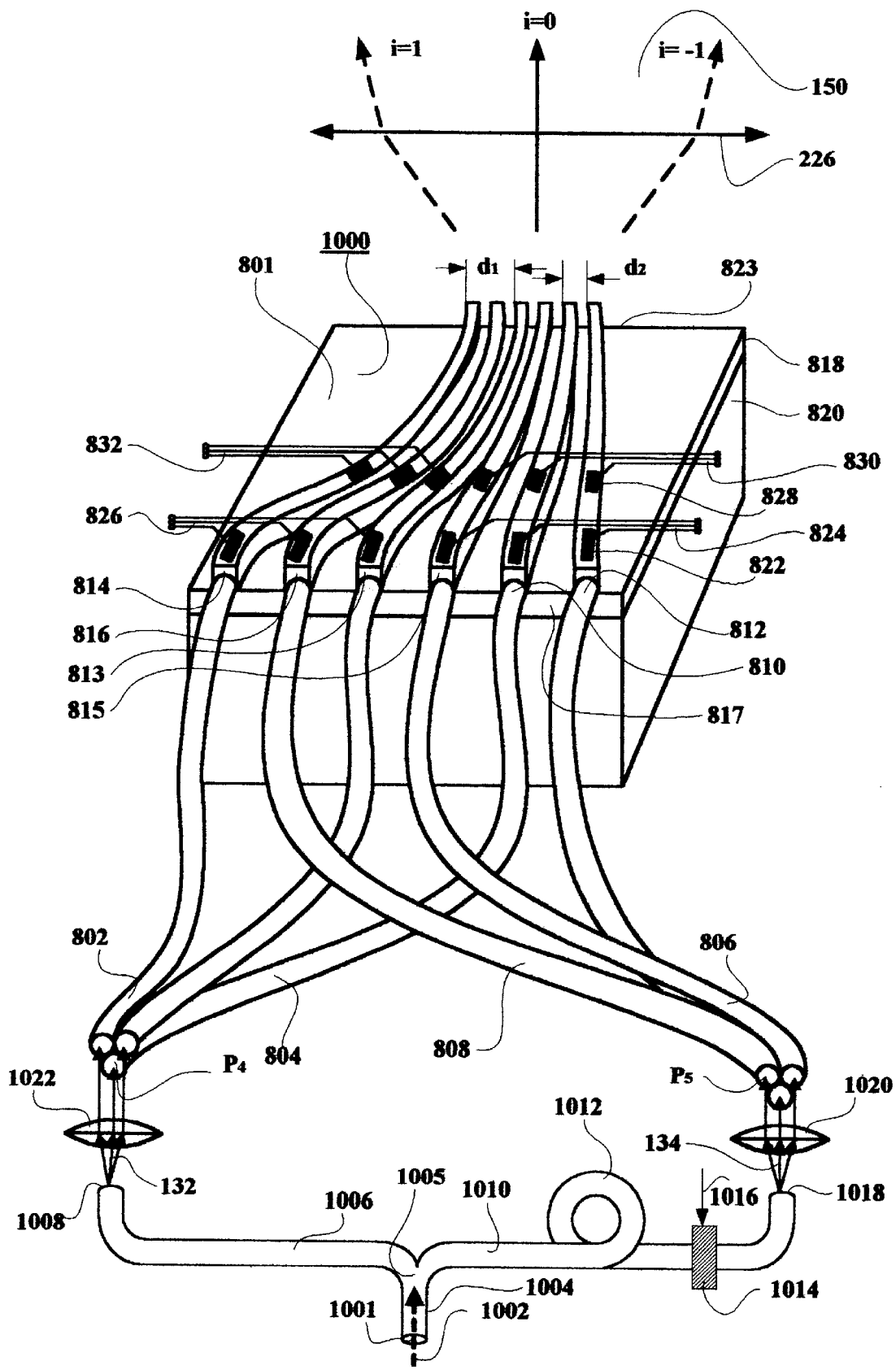
FIG. 11c is an illustration of an all-optical switching and modulating system with a self-control feature.

FIG. 11c—All-Optical Switching and Modulating With Self Control

FIG. 11c schematically illustrates optical system 1000; this is an all-optical switching and modeling system that is self-controlled. System 1000 includes system 800 of FIG. 11a with an additional illustration showing how information carrier beam 132 and control beam 134 are produced.

Information carrier beam 1002 is coupled into optical fiber 1004 through its input 1001 and propagates inside fiber 1004 toward Y-junction 1005. In Y-junction 1005, the radiation of beam 1002 is divided into information carrier beam 132 and control beam 134, which propagates inside optical fibers 1006 and 1010, respectively. Beam 132 exits from fiber 1006 at its output 1008. Beam 132 is collected and expanded, by coupling lens 1022. It is coupled into ports $P_4$ of fibers 802. Beam 134 propagates inside fiber 1010 through time-delayer 1012 and phase shifter 1014 and exits from fiber 1010 at its output 1018. Beam 134 is collected and expanded, by coupling lens 1020. It is then coupled into port $P_5$ of fibers 806.

Time delayer 1012 produces a time delay $\Delta t$ between beam 132 and 134. Phase shifter 1014 changes the phase of beam 134 to match the phase of beam 132. The delay time $\Delta t$, which time delay 1012 produces, depends upon the extra length of its fiber loop. The voltage applied to control electrode 1016 of phase shifter 1014 controls the phase shift of beam 134.

The operational principle of shifter 1014 is similar to that of shifter 220 of FIG. 6b. The optical paths of beams 132 and 134 from ports $P_4$ and $P_5$, respectively, are similar to system 800 of FIG. 11a.

Since beams 132 and 134 are both derived from a single beam 1002, phase shifter 1014 can maintain stable phase matching between these beams.

Figure 11D:
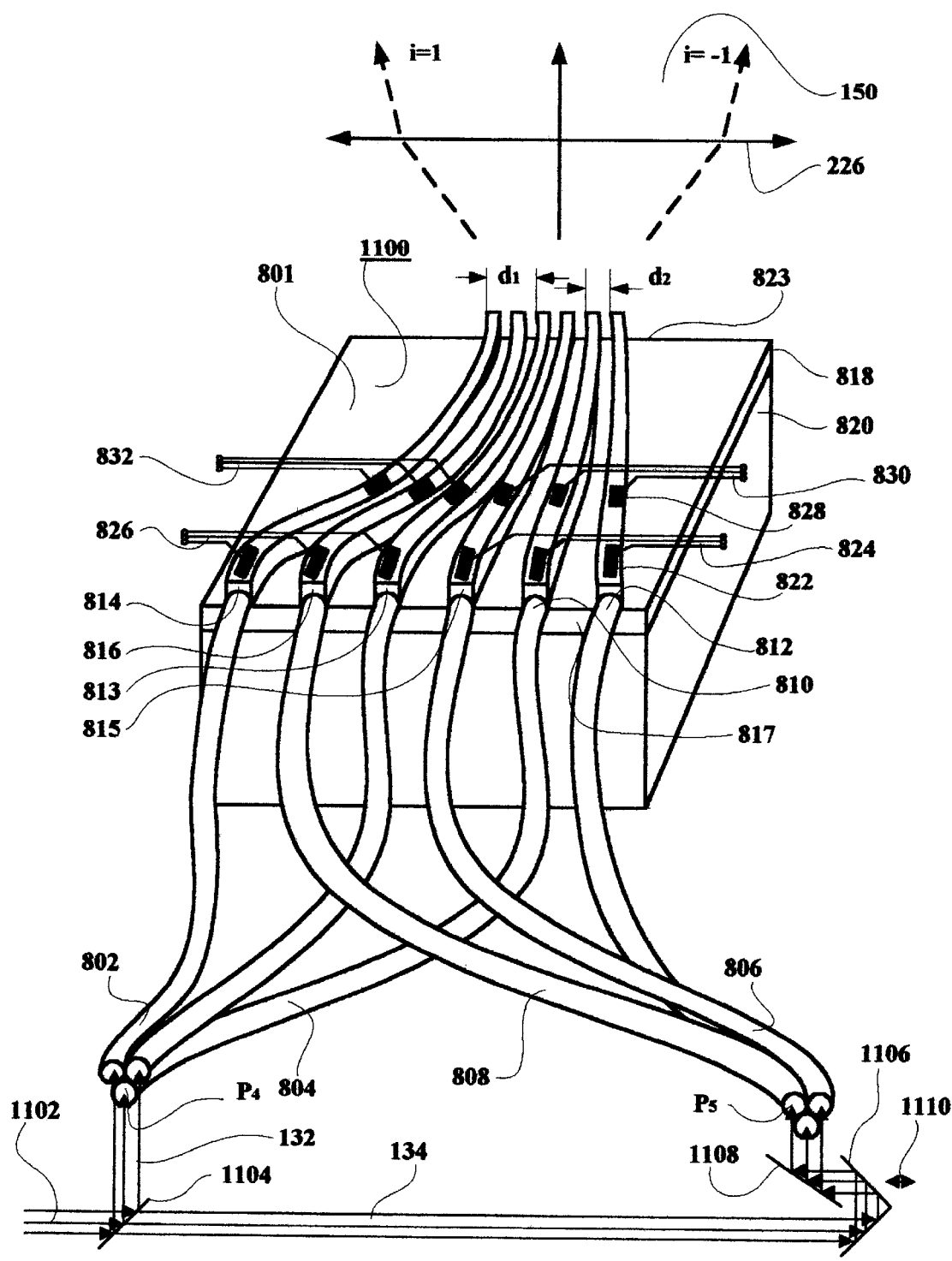
FIG. 11d illustrates a different design for an all-optical switching and modulating system with self-control.

FIG. 11d—Design for All-Optical Switching and Modulating With Self-Control

FIG. 11d schematically illustrates optical system 1100 for an all-optical switching and modeling system that is self-controlled. System 1100 includes system 800 of FIG. 11a with an additional illustration showing how information carrier beam 132 and control beam 134 are produced.

Beam splitter 1104 divides wide information carrier beam 1102 into information carrier beam 132 and control beam 134. Beam 132 is reflected by splitter 1104 and is directed toward bundle 804 of fibers 802 to be coupled into ports $P_4$ of fibers 802. Beam 134 propagates through splitter 1104 toward retro-reflector 1106. Retro-reflector 1106 receives beam 134, from beam splitter 1104, and reflects beam 134 in the opposite direction with a vertical displacement toward reflector 1108. Reflector 1108 receives beam 134, from retro-reflector 1106, and reflects beam 134 toward bundle 808 of fibers 806. It is then coupled into port $P_5$ of fibers 806.

Retro reflector 1106 is arranged to move along arrows 1110 to change the length of the optical path of control beam 134 between splitter 1104 and port $P_5$. Accordingly, the movement of retro-reflector 1106 along arrows 1110 is used to control both the phase and the time delay $\Delta t$ between beams 132 and 134. While a gentle movement of reflector 1106 along arrows 1110 controls the phase matching between beams 132 and 134, a large movement of reflector 1106 along arrows 1110 controls the delay time $\Delta t$ between beams 132 and 134. The above movements of reflector 1106 along arrows 1110 maintain the orientation and the position in which beam 134 hits reflector 1108 and thus do not change the coupling of beam 134 into ports $P_5$.

The optical paths of beams 132 and 134 from ports $P_4$ and $P_5$, respectively, are similar to that illustrated by system 800 of FIG. 11a and described above.

Since beams 132 and 134 are both derived from a single beam 1102, retro-reflector 1106 can maintain phase matching between them that is stable.

FIG. 12—All-Optical Switch Self Controlled by Predetermined Code

FIG. 12 illustrates a modulator and switch 1200 representing an all-optical self-controlled switch that is activated by a predetermined logical code of digital bits of information in carrier beam 1210. Switch 1200 (sometimes referred to as modulator 1200) represents any of the optical switches illustrated and described before. For example, switch 1200 includes and represent system 300 of FIG. 7b when input 1202 of switch 1200 couples optical fibers 1206 with fibers 202 of system 300. Output 1204 of switch 1200 couples port $P_2$ of system 300 with fiber 1208. Switch 1200 also represents an optical operator $F(T, \Delta t)$ characterized by its parameters T and $\Delta t$, where $\Delta t$ is the time delay produced by time delayer 306 of FIG. 7b. The parameter T is the time width of the pulses that switch 1200 receives at its input 1202 and $T_1$ is the time width of the pulses that switch 1200 produces at its output 1204.

Information carrier beam 1210 propagates in core 1214 of fibers 1206 and is coupled by input 1202 of switch 1200 to fibers 202 of system 300 of FIG. 7b. Beam 1210 is divided, by system 300, into two beams, information carrier beam 132 and control beam 134. Beams 132 and 134 inside switch 1200 are phase matched and beam 134 is delayed by $\Delta t$ with respect to beam 132. Port $P_2$ of system 300 is coupled to fiber 1208 by output 1204 of switch 1200 to emit pulses from output 1216 of fiber 1208. Port $P_2$ of system 300 produces pulses only when the pulses of beams 132 and 134 exist together. The pulse width T received by switch 1200 is maintained at output 1216 of fiber 1216 to be equal to $T_1$ only when there is a complete time overlap between the pulses of beams 132 and 134.

Graphs 1230 at the lower part of FIG. 12 show the bit intensity I versus time t. The scale of the intensity I is arbitrary. Graph 1218 is related to the bit stream of information carrier beam 1210 and beam 132 of system 300. Graphs 1220 and 1222 are related to the bit stream of control beam 134 of system 300 and beam 1212 at output 1216, respectively.

The bit stream of beam 1210, illustrated by graph 1218, includes two pairs of bits. In each pair the bits have a width T and are separated by a time $\Delta t$. The pairs of bits in graph 1218 are separated by a time $T_2$. $T_2$, $\Delta t$, and T satisfy $T_2 > \Delta t > T$. The bit stream of beam 132 of system 300 is similar to the bit stream of beam 1210; thus graph 1218 illustrates the bit stream of beam 132 as well.

Graph 1220 illustrates the bit stream of beam 134 of system 300. This bit stream is delayed by an amount $\Delta t$ with respect to the bit stream of beam 132 shown in graph 1218. Accordingly the first bit in each pair of bits of beam 134 has a time overlap with the second bit in each pair of bits of beam 132.

Graph 1222 illustrates the bit stream of beam 1212 at output 1216 of fiber 1208. The pulses of beam 1212 shown in graph 1222 are present only when the bits of beams 132 and 134, shown in graphs 1218 and 1220, respectively, exist simultaneously.

Accordingly switch 1200 or optical operator $F(T, \Delta t)$ is a self activated all-optical switch. Information carrier beam 1210 arranged to include information bits, each of which is followed by activating bit at a time space $\Delta t$. The information bits, together with their following activating bits, produce pairs of bits that are separated by time $T_2 > \Delta t > T$.

Optical operator $F(T, \Delta t)$ emits, from output 1216, the information bits alone without the activating (control) bits.

This emitting of the information bits occurs only when the time delay $\Delta t$ of operator $F(T, \Delta t)$ (switch 1200) is equal to the time spacing between the information bits and the activating bits related to each pair of pairs of bits in beam 1210.

Figure 13:
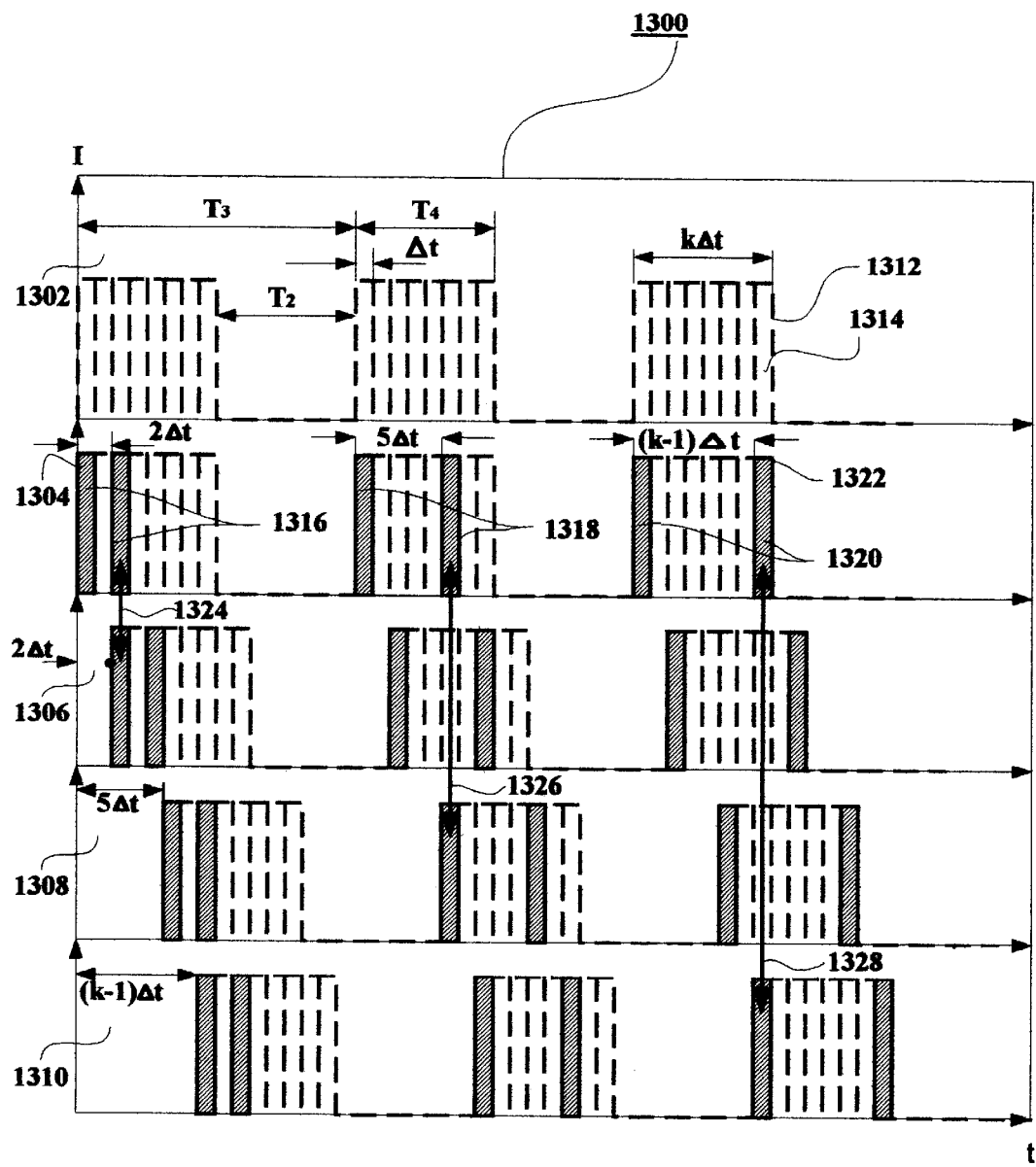
FIG. 13 illustrates, by graphs, a self-triggered all-optical Code Division deMultiplexing (CDM) of a serial bit stream that is fed into multiple parallel ports.

FIG. 13—Self-Triggered All-Optical Code Division DeMultiplexing (CDM) of Serial Bit-Stream Into Multiple Parallel Ports FIG. 13 illustrates a group of graph 1300 demonstrating the principle of all-optical self-triggered CDM according to the invention. Graphs 1302 to 1310 of group 1300 illustrate the intensity I of ONE and ZERO logical bits versus time t.

Graph 1302 shows time-envelope 1312 in which the logical bits of different serial information channels can be placed. Time-envelope 1312 does not contain any logical bits; it shows only time slots 1314 in which logical bits are allowed. Time-envelope 1312 is divided into periodic time periods $T_3$. Each time period contains time period $T_2$ that is equal to or longer than $T_3/2$. Time period $T_2$ is a restricted time zone for any type of bits and neither information nor control (activating or triggering) bits are allowed during this period. Time period $T_4=T_3-T_2$ is the period of time available for sending logical bits. Time period $T_4$ is divided to K time slots 1314 having time width $T_4/K=\Delta t$. Each time slot 1314 of envelope 1312 may contain one logical bit having a time width $\Delta t$.

As described in the explanation of FIG. 12, the code for activating optical switch 1200 of FIG. 13 includes a pair of bits, an information bit and an activating (controlling or triggering) bit. These bits are separated by a time space corresponding to the specific code. Each of the information channels gets its identity by its specific code that includes the above pair of bits. The codes of the different information channels differ from each other by the time between the pair of bits of their specific code.

Time period $T_4$, with its time slots 1314, is reserved for one code (pair of two bits) of one information channel. This means that time period $T_4$ may contain only two logical bits related to one code of one information channel. Since time period $T_2$ is forbidden for any type of logical bits, it means that time period $T_3$ can contain only two logical bits as well.

Envelope 1312 of graph 1302 may contain multiple codes of multiple information channels interleaved serially with the time in any desired order.

For example, graph 1304 illustrates serial bit stream 1322 including codes 1316, 1318, and 1320 of three different information channels arranged in a row with time t and propagating along a single fiber. Codes 1316, 1318, and 1320 include two logical bits separated by a time $2\Delta t$, $5\Delta t$, and (K−1) $\Delta t$, respectively.

In order to demultiplex serial bit stream 1322 of graph 1304 from a single optical fiber into multiple parallel ports of optical fibers, each must contain only one information channel corresponding to this port. Bit stream 1322 should be split into multiple ports. Each port contains all the information in stream 1322. Each of these ports is fed into the inputs of an all-optical switch, such as switch 1200 of FIG. 12. Switches 1200, characterized by their parameters T and $\Delta t$, and have specific values corresponding to the port to which they are coupled. Each of switches 1200 receives at its input, 1202 the codes of all the information channels. It is capable of detecting and emitting, at its output, only the information bits taken from the code corresponding to the information channel to which this switch is related. In this design, each of output ports 1204 of switches 1200 will emit only the information bits of one information channel from the serial of channels of graph 1304.

Graph 1304, illustrates bit stream 1322. All switches 1200 receive this bit stream at their inputs 1202. Thus this graph also illustrates the bit stream of beams 132 inside switches 1200, as described above in the explanation of FIG. 12.

Graph 1306 illustrates bit stream 1322 of graph 1304 with a time delay of $2\Delta t$. As explained above for switch 1200, this graph actually illustrates also the bit stream of control beam 134, inside switch 1200, when this switch has a delay of $2\Delta t$. Thus it is characterized by the optical operator $F(T, 2\Delta t)$. In fact since the bits also have a time width T that is equal to $\Delta t$, the optical operator takes the form $F(\Delta t, 2\Delta t)$.

Arrows 1324 show that only the first bit of code 1316 in graph 1306 has a complete time overlap with the second bit of code 1316 in graph 1304. Graphs 1304 and 1306 also illustrate the bits of beams 132 and 134, respectively. This means that inside this specific switch 1200 there is also a similar time overlap between the bits of beams 132 and 134. Thus, only the information bit of code 1316 will appear at output 1204 of switch 1200. Output 1204 is characterized by operator (F($\Delta t$, 2$\Delta t$). Codes 1318 and 1320 do not produce, in this switch, any time overlap between their bits in corresponding beams 132 and 134. Thus none of their bits appear in the output of switch 1200.

Accordingly, in general, switch 1200 has a delay $2\Delta t$ characterized by operator $F(\Delta t, 2\Delta t)$. Switch 1200 emits only the information bit from the two-bit code of the information channel. It does so only when this code includes two logical bits that are separated by a time space $2\Delta t$. The bits of other codes, separated by a time space equal to the integral number of $\Delta t$ that differs from $2\Delta t$, will not be emitted by switch 1200 and will not appear at its output.

Similar to graph 1306, graph 1308 illustrates bit stream 1322 of graph 1304 with a time delay of $5\Delta t$. As explained above for switch 1200, this graph actually also illustrates the bit stream of control beam 134, inside switch 1200 when this switch has a delay of $5\Delta t$. Thus it is characterized by the optical operator $F(T, 5\Delta t)$. In fact since the bits also have, a time width T equal to $\Delta t$, the optical operator takes the form $F(\Delta t, 5\Delta t)$.

Arrows 1326 show that only the first bit of code 1318 in graph 1308 has a complete time overlap with the second bit of code 1318 in graph 1304. Graphs 1304 and 1308 also illustrate the bits of beams 132 and 134 inside switch 1200, characterized by operator-$F(\Delta t, 5\Delta t)$, respectively. This means that in this switch there is also a similar time overlap between the bits of beams 132 and 134. Thus, only the informations bit of code 1318 will appear at output 1204 of switch 1200, characterized by operator $F(\Delta t, 5\Delta t)$. Codes 1316 and 1320 do not produce any time overlap between their bits in corresponding beams 132 and 134. Thus none of their bits appear in the output of switch 1200 related to operator $F(\Delta t, 5\Delta t)$.

Accordingly, in general, switch 1200 has a delay $5\Delta t$ characterized by operator $F(\Delta t, 5\Delta t)$. It detects only the information bit from the information channel whose code includes the two logical bits that are separated by time $5\Delta t$. The bits of other codes that are separated by a time equal to integral number of $\Delta t$ that differs from $5\Delta t$ will not be detected by switch 1200 and will not appear at its output.

Similar to graphs 1306 and 1308, graph 1310 illustrates bit stream 1322 of graph 1304 with a time delay of (K−1)$\Delta t$. As explained above for switch 1200, characterized by operators $F(\Delta t, 2\Delta t)$ and $F(\Delta t, 5\Delta t)$, this graph actually also illustrates the bit stream of control beam 134, inside switch 1200 when this switch has a delay (K−1)$\Delta t$. Thus it is characterized by the optical operator $F(T, (K−1)\Delta t)$. In fact since the bits also have a time width T equal to $\Delta t$, the optical operator takes the form $F(\Delta t, (K−1)\Delta t)$.

Arrows 1328 show that only the first bit of code 1320 in graph 1310 has a complete time overlap with the second bit of code 1320 in graph 1304. Graphs 1304 and 1310 also illustrate the bits of beams 132 and 134 inside switch 1200, characterized by operator F(Δt, (κ−1)Δt), respectively. This means that in this switch there is also a similar time overlap between the bits of beams 132 and 134. Thus, only the information bit of code 1320 will appear at output 1204 of switch 1200, characterized by operator F(Δt, (κ−1)Δt). Codes 1316 and 1318 do not produce, in this switch any time overlap between their bits in corresponding beams 132 and 134. Thus none of their bits appear in output 1204 of switch 1200 related to operator F(Δt, (κ−1)Δt).

Accordingly, in general, switch 1200, havs a delay (κ−1) Δt characterized by operator F(Δt, (κ−1)Δt). It detects the information bit only from the information channel whose code includes the two logical bits that are separated by time (κ−1)Δt. The bits of other codes are separated by a time equal to an integral number Δt that differs from (κ−1)Δt. They will not be detected by switch 1200, characterized by operator F(Δt, (κ−1)Δt), and will not appear at its output 1204.

Accordingly, each switch 1200, out of all switches 1200 that are fed in parallel by the split information of the coded serial channels, will detect only the information bits from the code whose two bits are separated by a time equal to the delay of the switch. Thus switches 1200 convert the serial coded channels propagating in a single optical fiber into parallel channels, each of which propagates in different parallel optical fibers.

While FIG. 13 illustrates only three channels represented by their codes 1316, 1318, and 1320, the serial channels can contains κ−1 different channels (for any desired κ). These κ−1 channels can be divided, as explained above, from propagating in a single fiber to propagate in multiple parallel fibers, each of which contains only the information bits from a different information channel.

Time period $T_2$ is the forbidden time zone in which the logical bits are restricted and are not allowed. Time zone $T_2$ is needed to avoid unwanted time overlap between the bits of different codes that exist in information carrier beam 132 and control 134 inside switches 1200. In a situation when time zone $T_2$ does not exist, the time delay between beams 132 and 134 could cause time overlap between the bits of different codes in beams 132 and 134. Such overlap could cause mixing and crosstalk between the divided different information channels propagating in parallel fibers, which should be isolated from each other.

Time zone $T_3$ contains only one pair of bits code and actually only one bit of this pair is an information bit. Time period T3 is at least 2κ times longer than the time width Δt of the information bit. Accordingly, this CDM unjustifiably seems to be an inefficient method in terms of information density. In practice, according to the invention and as illustrated by FIG. 7c and explained above in its description, the logical bits can be produced with time width T that is very narrow. Pulse width T can be produced, according to the invention, to be so narrow that time period $T_3$=2κ·T still will be much shorter than any pulse width produced by the modulators known today. Accordingly, a very dense serial stream of information channels can be used with the CDM method for what is here defined as Dense Time division Multiplexing\deMultiplexing (DTDM). The combination of the high density of information that can be achieved with the DTDM with the ultra high switching speed of the CDM makes the use of the DTDM very attractive for use in optical networks for transmitting a large volume of information at a high rate.

Figure 14:
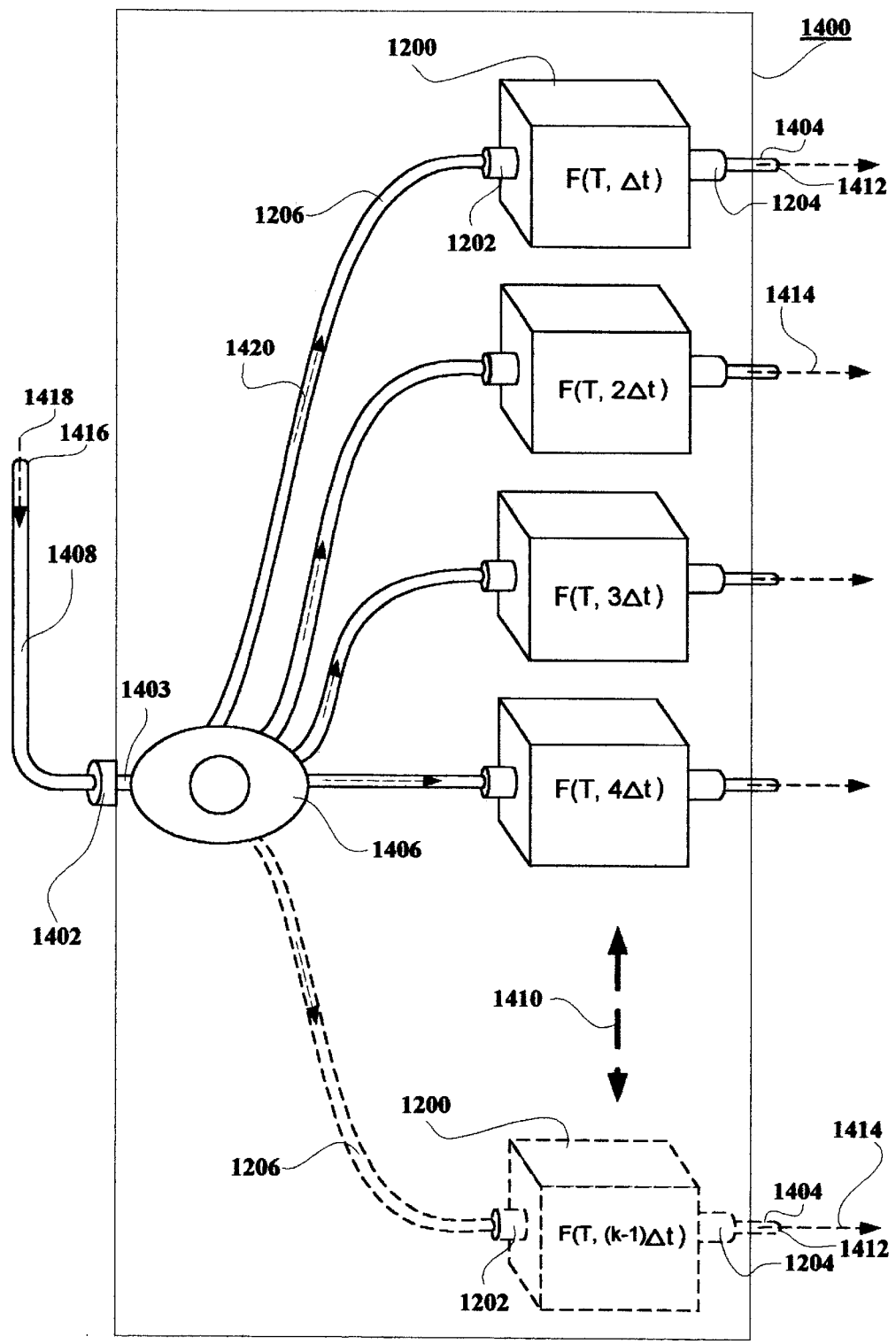
FIG. 14 is an illustration of an all-optical self-triggered CDM system for DTDM.

The optical system that actually performs the principle of the CDM, illustrated by the graphs of FIG. 13, is illustrated by FIG. 14.

FIG. 14—All-Optical Self Triggered CDM System for DTDM

FIG. 14 schematically illustrates a self-triggered Code Division deMultiplexing (CDM) system 1400 that is used for DTDM (Dense Time Division Multiplexing). Demultiplexing optical system 1400 is the optical system that practically performs the CDM method whose principle is illustrated in FIG. 13. System 1400 has a single input 1402 to which optical fiber 1408 is optically coupled. Information carrier radiation beam 1418 enters fiber 1408 through its input 1416 and propagates along fiber 1408 to be coupled to system 1400 at input 1402. Input 1402 couples information carrier beam 1418 into fiber 1403. Beam 1418 propagates in fiber 1403 toward optical node (junction) 1406. Node 1406 can be a one-to-many coupler. It divides single information carrier beam 1418 into κ−1 information carrier beams 1420 that propagate along optical fibers 1206. Each of beams 1420 contains all the information exists in carrier beam 1418. Each of fibers 1206 connects node 1406 to switch 1200, which is of the type illustrated in FIG. 12 and which has input 1202 and output 1204.

Switches 1200 are differ from each other only by their corresponding delay parameter and thus are indicated by their optical corresponding operators F that include that parameter. The delay parameters of the (κ−1) operators of switches 1200 have values that are integral number of Δt and create a mathematic series having serial different Δt's that starting with Δt and end with (κ−1)Δt. Broken arrows 1410 represents those of switches 1200 that are not shown in FIG. 14.

Information carrier beam 1418, propagating in a single fiber 1408, includes a serial bit stream that includes κ−1 different information channels interleaved between each other in any desired serial order. Beam 1418 has a time envelope 1312 (FIG. 13). Thus its logical bits may occupy each of time slots 1314 in time period $T_4$ of envelope 1312 of FIG. 13 in a configuration that time period T2 is empty from any bit. Similar to graph 1304 of FIG. 13, the codes of the different information channels are formed by their corresponding pairs of two bits. They are formed in a configuration where only one code is related to a specific information channel and exists during time period $T_4$ of envelope 1312. Each code includes one information bit and one control bit.

The time between the two bits of each of the codes related to a different information channels varies from one channel to another and has a specific value corresponding to the specific information channel. The time spaces between the two bits of the (κ−1) different codes have values that are integral number of Δt and create a mathematic-series having serial different Δt's that start with Δt and end with (κ−1)Δt.

All the codes of the information channels that information carrier beam 1418 carries arrive to inputs 1202 of switches 1200 through fibers 1206 and by beams 1420 into which beam 1418 is divided. Beams 1420 that carry all the codes of the information channels that beam 1418 carries. These codes are coupled into switches 1200 by their inputs 1202.

Each of switches 1200 detect and transmits to its output 1204 only the information bits taken only from the code of the information channel that it is related to I.e., the code by which its information bit is separated from its control bit by a time interval equal to the time delay of the switch. Neither the information bits nor the activating bits of the codes of other channels that are not related to the above specific switch 1200 are detected and are transmitted, by this specific switch 1200, to its output 1204. Accordingly, the information bits of each type of code related to a specific information channel exit from output 1412 of a respectively different switch 1200.

The information bit of each code is one of the two logical bits that construct the code. Each of switches 1200 receives, at its input 1202, various codes of different information channels. From these various codes switch 1200 detects and transmits to its output 1204 only the information bit of the code that is related to the specific information channel. In this case the time interval between the two bits of the code is equal to the delay parameter of this specific switch 1200.

For example, (K–1) optical switches 1200 are indicated by their optical operators F(T, Δt), F(T, 2Δt), F(T, 3Δt), F(T, 4Δt), and F(T, (K–1)Δt). These switches will transmit to their outputs 1204 only the information bits taken only from the (K–1) codes that their two bits are separated by time spaces equal to Δt, 2Δt, 3Δt, 4Δt, and (K–1)Δt, respectively.

The information bits of the different information channel are coupled by different outputs 1204 of switches 1200 into different fibers 1404 and are carried by different radiation beams 1414 that are emitted out by different outputs 1412 of system 1400.

Accordingly, optical system 1400 is an all-optical Code division deMultiplexing (CDM)] system. System 1400 receives, in its single input 1402, a series of multiple coded information channels interleaved in any desired order. System 1400 emits, from its multiple outputs 1412, only the information bits of the different coded information channels. These information bits are fed into its input 1402, when each of the different information channels exits, by demultiplexing process, from a different output 1412 without any crosstalk between the channels.

Figure 15A:
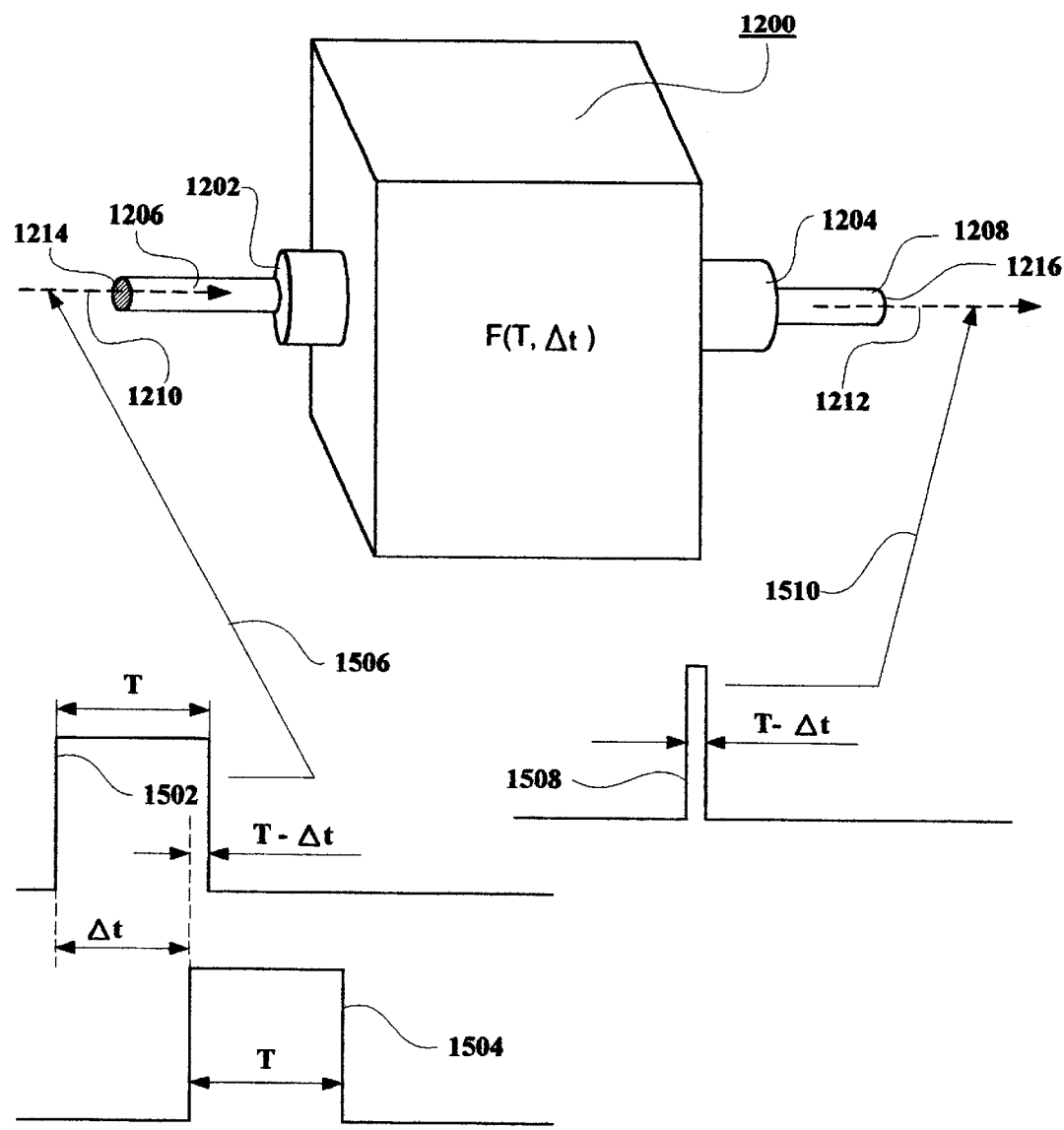
FIGS. 15a and 15b illustrate an ultra-fast all-optical modulator-cum-switch and an all-optical multiplexing system, respectively.

FIG. 15a—Ultra-Fast All-Optical Modulator/Switch

FIG. 15a illustrates how modulator and switch 1200 of FIG. 12 is used to produce ultra narrow pulses 1508 of radiation beam 1212 at output 1204.

Modulator 1200 receives in its input 1202, through optical fiber 1206, information carrier beam 1210 that is coupled to fiber 1206 into its core 1214. Arrow 1506 indicates that pulse 1502 is related to beam 1210 and has a width T. As explained above, beam 1210 is divided into carrier beam 132 and control beam 134 inside modulator 1200. Carrier beam 132 includes all the information of beam 1210 and thus pulse 1502 also represents beam 132. Control beam 134 is delayed by a time delay Δt, as illustrated by pulse 1504 that is time shifted by Δt, relative to pulse 1502 of beam 132, and has the same time width T as pulse 1502.

The time overlap T–Δt between pulses 1502 and 1504 of beams 132 and 134, respectively, produce narrow pulse 1508 at output 1204 of modulator 1200, that has a time width T–Δt.

Pulse 1508 at output 1204 of modulator 1200 is coupled into optical fiber 1208 and is emitted, by beam 1212, from fiber 1208 through its output 1216, as is illustrated by arrow 1510.

The delay values Δt of modulator 1200 can be adjusted as desired and thus Δt can be chosen to produce pulse 1508 with an extremely narrow width T–Δt.

Accordingly modulator 1200 receives radiation pulses 1502 that can be produced in a conventional way by conventional radiation sources and modulators. These pulses are converted, by modulator 1200 into ultra narrow pulses 1508. These pulses are much narrower than the pulses produced by any known modulating technique.

Modulators, such as modulator 1200, can be placed in the optical path of parallel information channels to convert their pulses into much narrower pulses. Due to the narrow width of the new pulses in these parallel information channels, they can be interleaved to a serial bit stream by standard DTM techniques. This stream will have a much higher information density, so as to produce DTDM. This serial bit steam of the above mentioned DTDM should be demultiplexed by the fastest standard techniques known today.

In addition to the DTDM, narrow pulses, such as pulse 1508 produced by modulator 1200 or any other modulator according to the invention, can also be used to increase the information density of any other communication method, such as WDM or DWDM.

Figure 15B:
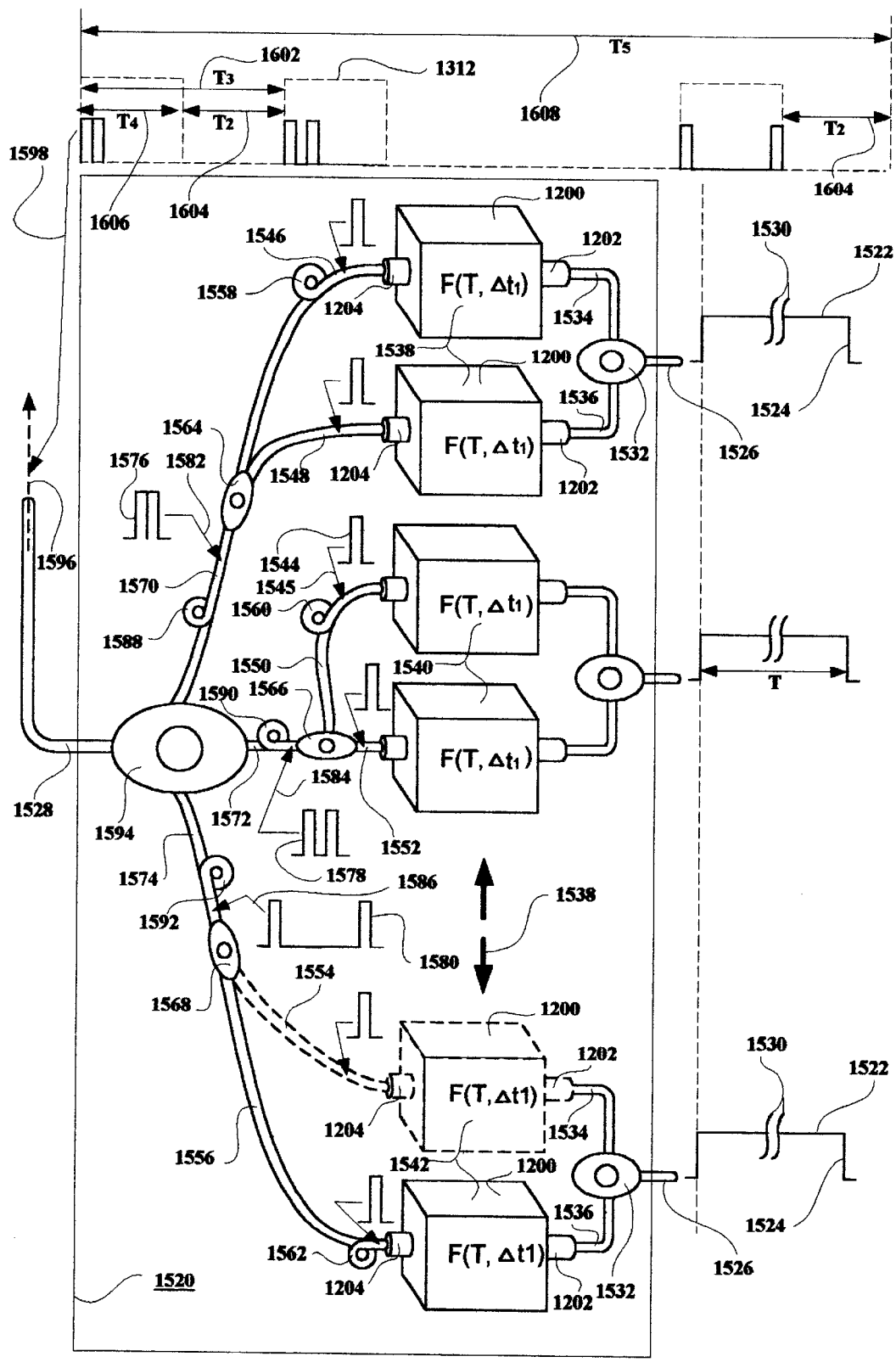

The all-optical CDM according to the invention should have special codes. These codes should be encoded, by multiplexing, into the serial interleaved bit stream of the DTDM to allow the multiplexing by CDM technique of the invention. FIG. 15b, described below, illustrates an interleaving or multiplexing system according to the invention that is also capable of encoding the codes needed for the demultiplexing by the CDM technique of the invention.

FIG. 15b—All-Optical Encoding System

FIG. 15b illustrates a system 1520 for encoding, by multiplexing, the specific codes according to the invention, of multiple parallels channels 1522 that are interleaved into serial bit stream for TDM, DTDM, CDM, WDM, and DWDM, Asynchronous Transmitting Mode (ATM), Dense Asynchronic Transmitting Mode (DATM), or any other application of optical communication, including packet routing.

System 1520 has multiple inputs 1526 and a single output 1528. Parallel information channels 1522, represented by their information pulses 1524, are fed into inputs 1526 of system 1520. Pulses 1524 are the shortest pulses that can be achieved today. Pulses 1524 are cut by lines 1530 to indicate that, in spite of their narrow width, their length is still much longer than that illustrated.

Inputs 1526 of system 1520 are coupled into nodes 1532. Nodes 1532 that receive radiation bits 1524 of channels 1522 divide this radiation equally into optical fiber 1534 and optical fibers 1536. The radiations from fibers 1534 and 1536 are fed into inputs 1202 of modulators 1200.

Modulators 1200 produce very short pulses 1544 at their outputs 1204. Each of pulses 1544 is accompanied by arrow 1545 that indicates in which fibers pulses 1544 propagate. The width Δt=T–Δt1 of pulses 1544 depends upon width T of pulses 1524 and delay time Δt1 of modulators 1200 (optical operators F(T, Δt₁). Modulators 1200 are arranged in (K–1) pairs, starting with pair 1538 through pair 1540 to pair 1542. Broken arrows 1538 represent the pairs of modulators 1200 that are not shown in FIG. 15.

Pulses 1544 at outputs 1204 of modulator pair 1538 are coupled into optical fibers 1546 and 1548, respectively. Pulses 1544 at outputs 1204 of modulator pair 1540 are coupled into optical fibers 1550 and 1552, respectively. Similarly, pulses 1544 at outputs 1204 of modulator pair 1542 are coupled into optical fibers 1554 and 1556, respectively.

Delay fibers 1558, 1560, and 1562 in fibers 1546, 1550, and 1556 produce time delays corresponding to the specific codes of modulator pairs 1538, 1540, and 1542, respectively. For example, delay fibers 1558, 1560, and 1562 produces delays of Δt, 2Δt, and (K–1)Δt, respectively. Index (K–1) represents the number of modulator pairs used when the (K–1)$^{th}$ pair is pair 1542.

Node 1564 receives pulses 1544, having time width Δt, from fibers 1546 and 1548. Node 1564 combines these two pulses and emits them, through single fiber 1570, on the other side of node 1564. Pulses 1544 of fibers 1546 and 1548 have a time width Δt and are delayed by time interval Δt. Thus when combined into fiber 1570, they produce a specific code pair 1576 corresponding to modulator pair 1538, that includes two bits that are shifted by Δt.

Node 1566 receives pulses 1544 from fibers 1550 and 1552. Node 1566 combines these two pulses and emits them, through single fiber 1572, on the other side of node 1566. Pulses 1544 of fibers 1550 and 1552 have time width Δt and are delayed by interval 2Δt. Thus when they are combined into fiber 1572, they produce specific code pair 1578 corresponding to modulator pair 1540, that includes two bits that are shifted by 2Δt.

Similarly, node 1568 receives pulses 1544 from fibers 1554 and 1556. Node 1568 combines these two pulses and emits them through single fiber 1574, on the other side of node 1568. Pulses 1544 of fibers 1550 and 1552 have a time width Δt and are delayed by time interval (K−1)Δt. Thus when are combined into fiber 1574, they produce a specific code pair 1580, corresponding to modulator pair 1542, that includes two bits that are shifted by (K−1)Δt.

Specific codes 1576, 1578, and 1580 of modulator pairs 1538, 1540, and 1542 are accompanied by arrows 1582, 1584, and 1586 that indicate fibers 1570, 1572, and 1574 in which they propagate, respectively.

Fibers 1570, 1572, and 1574 include delay fibers 1588, 1590 and 1592, respectively. Delay fibers 1588 to 1592 represent a series of (K−1) delay fibers corresponding to (K−1) modulator pairs 1538 to 1542. The time delays that delay fibers 1588 to 1592 produce are an integral number of time periods $T_3$, shown in FIG. 13. These delays create a mathematical series having a serial difference $T_3$ that starts with a delay $T_3$ and ends with a delay (K−1)$T_3$ for first and last delays 1588 and 1592, respectively.

Fibers 1570, 1572, and 1574 are connected to node 1594, which has only a single output 1528 that is also the output of system 1520. The (K−1) specific codes 1576 to 1580 of the (K−1) information channels 1522 that are coupled to (K−1) inputs. 1526 of system 1520 propagate in (K−1) fibers 1570 to 1574. These codes enter node 1594 with time differences $T_3$ between them. Node 1594 combines (K−1) codes 1576 to 1580 into a serial bit stream that consists of codes 1576 to 1580 that are interleaved in every time period $T_3$. Radiation beam 1596 that exits from output 1528 of system 1520 carries the serial bit stream produced by node 1594 that interleaves (K−1) codes 1576–1580 in serial of codes spaced by a time shift $T_3$.

Nodes 1564–1568 can be two-to-one couplers and node 1594 can be a many-to-one coupler Arrow 1598 indicates that the series of bits that beam 1596 carries is represented by the bits confined in time-envelope 1312, similar to time envelope 1312, illustrated in FIG. 13. Time envelope 1312 includes time cells 1602 having time width $T_3$ and defined as code cells 1602. Each code cell 1602 includes restricted time zones 1604 and occupied time zone 1606. The occupied time zone is a time period that can be used to transmit the codes bits. The time widths of restricted time zone 1604 and occupation time zone 1606 are $T_2$ and $T_4$, respectively. Time width $T_2$ is greater or equal to $T_3/2$.

Any of occupation zones 1606 contains only one code out of (K−1) codes 1576–1580. Since occupation zones 1606 may, include any of (K−1) codes 1576–1580, their size $T_4$ must be great enough to allow them to contain even the longest code that has a time width Δt(K−1)Δt=KΔt. Accordingly, the time length of time zone 1606 is $T_4$=KΔt.

Codes 1576–1580 are interleaved in (K−1) code cells 1602, where each code cell 1602 contains only one specific code related to its specific information channel 1522. Codes 1576–1580 are arranged in a series of (K−1) cells. These cells are arranged in a multiplexing or interleaving order that starts with code 1578 and ends with code 1580. Specific codes 1576–1580 are used in all-optical demultiplexing system 1400, illustrated in FIG. 14.

System 1400 receives cells 1602 and includes switches 1200 that produce a time shift between their inside beams, carrier beam 132 and control beam 134. The maximum time shift between beams 132 and 134, inside switches 1200 of system 1400, is illustrated by FIG. 14. It can reach a value of (K−1)Δt. To avoid any mixing and crosstalk between the codes in cells 1602, any time overlap between the different bits of different codes 1576–1580 in cells 1602 of beams 132 and 134 should be avoided. Such over lap can be avoided if the separation time $T_2$ between code cells 1602 is grater than the maximum shift (K−1)Δt between beams 132 and 134 inside switches 1200 of system 1400. Accordingly $T_2$ is equal to or longer than (K−1)Δt. Since $T_3=T_2+T_4$, it is equal to KΔt+(K−1)Δt=(2K−1)Δt and thus $T_2$ is approximately longer than or equal to $T_3/2$.

The total length 1608 of all (K−1) code cells 1602 is $T_5$=(K−1)T3=(K−1)(2K−1)Δt. When T2 is equal to $T_4$=2KΔt, then $T_5$=(K−1)(2K)Δt. The time length $T_5$ is the time that system 1520 of FIG. 15b is busy in producing code cells 1602. Thus system 1520 is free to get the next period of bits, from information channels 1522 in its inputs 1526, only after time period $T_5$.

Accordingly, system 1520 operates at a frequency rate of 1/$T_5$. The time width of bits 1524 in information channels 1522 is much larger than the time width of the bits in codes 1576–1580. Thus there is a significant time saving using the system of 1520 with respect to standard TDM system.

Compression Factor of DTDM with Respect to Standard TDM—FIG. 15b

Compression factor C is defined as the ratio between the average bit rate exists in DTDM as, illustrated by FIG. 15b, and conventional TDM, as used today.

According to the invention and as illustrated in FIG. 15b, each code cell 1602, in the DTDM method, carries two bits of code, but only one information code. Accordingly, for a time period $T_5$, that includes (K−1) codes cells 1602, the number of interleaved information bits transmitted is (K−1). Thus the average bit rate $R_1$ in the DTDM is:

$$R_1=(K-1)/T_5=(K-1)/[(K-1)(2K)\Delta t]=\frac{1}{2}K\Delta t$$

In a standard TDM the interleaved pulses, such as the pulses of information channels 1522, have time width of T. Thus for transmitting (K−1) pulses, the time needed is (K−1)T. Accordingly, the average bit rate R2 is:

$$R_2=(K-1)/(K-1)T=1/T$$

Compression factor C equal to:

$$C=R_1/R_2=T/2K\Delta t$$

For example, the time width Δt of the bits in codes 1576–1580 can easily produced to be 1000 times shorter than the width T of standard pulses, as produced and used in present TDMs. Assuming that K the number of information channels interleaved in both methods DTDM and TDM is 50 then:

$$C=1000\Delta t/2\cdot 50\cdot \Delta t=10$$

This means that, by using the DTDM method, the bit rate can easily be increased by a factor of 10.

Achieving compression factor C=10, by the DTDM method with the additional capability of ultra fast all-optical demultiplexing makes the DTDM a very attractive method.

When using DTDM with very short pulses, according to the invention, and interleaving them, by the standard TDM method without encoding codes (as done when using CDM), the compression factor C can be much higher. The need to encode the interleave pulses to be used, in all-optical self-triggering CDM, reduces compression factor C significantly.

For example, when producing, according to the invention, pulses that are 1000 times shorter than available today, by other techniques, and interleaving them by a standard TDM technique, without CDM, then compression factor C is 1000. On the other hand, such a high bit rate cannot be demultiplexed using known techniques; demultiplexing by the CDM technique of the invention is required.

The all-optical switching capabilities of system 1400 of FIG. 14 are per single code corresponding to a single information bit. When the DTDM method is used to interleave packets of information, the code cells of the same packets are arranged in arrows, one after the other. All of the cells of the same packet have the same specific code and thus all will be routed to the same port. Accordingly, all-optical demultiplexing system 1400 is also capable of routing packets. System 1400 can serves as one junction for routing packets. For routing packets through more than one junction, the specific codes should include more information to define the routing path through multiple junctions. Such codes will be discussed in the following section.

Figure 16:
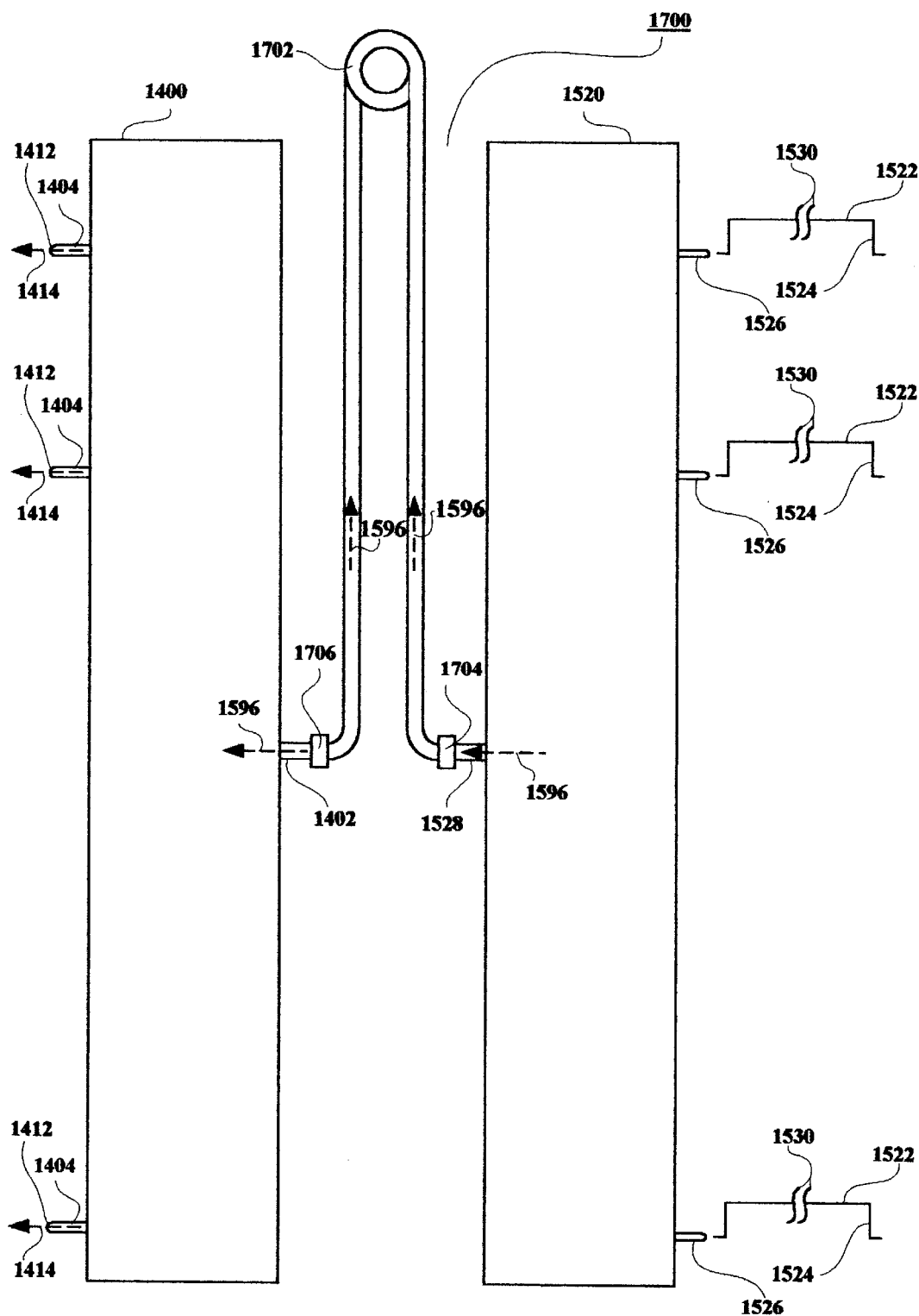
FIG. 16 shows an all-optical network system including an interleaving system of a DTDM system and a demultiplexing system of a self-triggered CDM system connected by a long-haul.

FIG. 16—All-Optical Network System Including Interleaving System and Demultiplexing System Connected By Long-Haul FIG. 16 schematically illustrates all-optical system 1700 representing an all-optical communication network. System 1700 includes system 1520 of FIG. 15b, that serves as an encoding or multiplexing system, and system 1400 of FIG. 14, described above, that serves as a demultiplexing system.

Systems 1520 and 1400 are connected by single long-haul fiber 1702 that transmits a serial bit stream of radiation bits. A long haul is a long information carrier designed to carry multiple information channels for transmitting large information volume, at high rate, between junctions of the communication network. System 1520 has multiple parallel inputs 1526 through which it receives bits 1524 of multiple parallel information channels 1522. Pulses 1524 are cut by lines 1530 to indicate that pulses 1524 are longer than as illustrated. System 1520 produces specific codes corresponding to respective channels 1522; each code consist of a pair of bits.

As illustrated in FIG. 15b, these specific codes are all-optically interleaved, by multiplexing system 1520, in any desired predetermined order to form series of code pairs 1596 that exit from system 1520 through its output 1528. Bit stream 1596 is coupled, by connector 1704, to a single long-haul fiber (backbone) 1702 through which it propagates toward connector 1706. Connector 1706 couples bit stream 1596 into input 1402 of demultiplexing system 1400.

As illustrated in FIG. 14, system 1400 receives the series of the interleaved specific codes of channels 1522, produced by multiplexing system 1520, and all-optically demultiplexes only the information bits of these codes into and from its parallel outputs 1404. The information bits of the specific codes-related to different information channels 1522 are carried by beams 1414 and exit from different subsidiary outputs 1412 related to main outputs 1404 of system 1400.

CONCLUSIONS, SCOPE AND RAMIFICATIONS

Thus the reader will see that I have provided the following:

1. All-optical modulators for generating ultra narrow pulses to produce DTDM.
2. Ultra fast all-optical switches.
3. All-optical modulators and switches that are radiation controlled or are self-triggered.
4. All-optical encoding, interleaving or multiplexing systems for very narrow pulses and codes that are radiation controlled or self-triggered.
5. All-optical decoding or demultiplexing systems for very narrow pulses and codes that are radiation controlled or self-triggered.
6. Extremely fast all-optical systems for multiplexing and demultiplexing to produce DTDM.
7. Extremely fast all-optical systems for multiplexing and demultiplexing codes for CDM, self-routing, self-triggering, ATM, and packet routing While the above description contains many specificities, these should not be considered as limitations on the scope of the invention, but as exemplifications of the presently preferred embodiments thereof. Many other ramifications and variations are possible within the teachings to the invention.

For example the all-optical switches, modulators, encoding and decoding systems, interleaving and multiplexing systems, and demultiplexing systems have been described for use in communication networks. However they can be used in other optical systems as well, such as systems used for optical computing. They also can be used as optical components, devices, and systems in Ethernet systems. Although the invention been described using the examples of DTDM and self-triggered CDM it can be used for producing very narrow pulses to perform standard techniques, such as TDM, ATM and packets routing.

Although the some systems have been described as modulators they also can be operated as switches. While some all-optical encoding and multiplexing systems have been described using sub-units operating as modulators, the situation can be reversed, i.e., the operation of these same sub-units can be change to serve as switches in decoding and demultiplexing systems. Though some switches and modulators have been described with one output they can include multiple outputs. While the modulators and the switches have been described as containing gratings or phase arrays, they can also include another interference devices that are capable of changing their pitch according to the illumination conditions. Although the gratings and the phase arrays have been described as having one ore three interference orders, they are not limited to these numbers of interference orders. While some of the switches and the modulators are illustrated without optical amplifiers they can be integrated with optical amplifiers, such as a Europium Doped Optical Fiber Amplifier (EDOFA).

Thus the scope of the invention should be determined by the appended claims and their legal equivalents, and not by the examples given.

What is claimed is:

1. An optical system for modulating, switching, multiplexing, and routing, comprising:
   (a) at least one input;
   (b) at least one interference device;
   (c) at least one radiation-splitting component; and
   (d) at least one selecting device including a differential receiving terminal and at least one output;
   (e) said one input being arranged to receive input radiation pulses and to emit said input radiation pulses;
   (f) said radiation-splitting component being arranged to receive said input radiation pulses emitted from said one input, to convert each of said input radiation pulses to multiple radiation pulses, and to cause said multiple radiation pulses to propagate along multiple radiation paths having predetermined optical lengths;

(g) said one interference device being arranged to receive, from said multiple radiation paths, said multiple radiation pulses at respective arrival times corresponding to said optical lengths of said multiple radiation paths for producing and emitting an interference pattern according to said respective arrival times;

(h) said selecting device being arranged to receive, at said differential receiving terminal, at least part of said interference pattern for selectively emitting output radiation pulses from said one output according to said respective arrival times.

2. The system of claim 1 wherein said system is an all-optical switch.

3. The system of claim 1 wherein said system is an all-optical modulator.

4. The system of claim 1 wherein said one input is arranged to receive said input radiation pulses having predetermined time widths that are separated by predetermined time intervals in the form of predetermined identifying codes, said one interference device being further arranged to cause said one output to emit said output radiation pulses in response to one of said identifying codes received at said one input, thereby to produce demultiplexing.

5. The system of claim 4 wherein said one interference device is also arranged to produce self-switching by self-code division demultiplexing in response to said identifying codes.

6. The system of claim 5, further including a single radiation guide, multiple radiation guides, and multiple outputs of said system, and wherein said one interference device is arranged to produce said self-code division demultiplexing of interleaved codes received at said one input from said single radiation guide into said multiple radiation guides coupled into said multiple outputs of said system.

7. The system of claim 6 wherein said one interference device is arranged to produce demultiplexing of said codes interleaved by time division multiplexing.

8. The system of claim 6 wherein said one interference device is arranged to produce demultiplexing of said codes for packet routing.

9. The system of claim 1 wherein said one interference device is arranged to cause said output radiation pulses to be narrower than said input radiation pulses.

10. The system of claim 9 wherein said system includes multiple outputs.

11. The system of claim 10 wherein said multiple outputs include time delayers for producing information codes.

12. The system of claim 11 wherein said multiple outputs and said delayers are arranged to interleave said information codes into a single radiation guide.

13. The system of claim 12 wherein said interleaving is done by time division multiplexing.

14. The system of claim 12 wherein said interleaving arranged for packets routing.

15. The system of claim 1 wherein at least one of said multiple radiation paths includes a time delayer.

16. The system of claim 1 wherein at least one of said multiple radiation paths includes a phase shifter.

17. The system of claim 1 wherein at least one of said multiple radiation paths includes an optical amplifier.

18. The system of claim 1 wherein at least one of said multiple radiation paths includes attenuator.

19. The system of claim 1 wherein said one interference device is a grating.

20. The system of claim 19 wherein said grating is a combination of a diffracting grating and a reflecting grating.

21. The system of claim 20 wherein said grating is a double-sided grating.

22. The system of claim 21 wherein at least one side of said double sided grating is a combination of a diffracting grating and a reflecting grating.

23. The system of claim 1 wherein said one interference device is an array of multiple radiation guides arranged to form a radiation phase array.

24. The system of claim 23 wherein said radiation phase array includes a plurality of groups of said radiation guides in an interleaved arrangement.

25. The system of claim 23 wherein said radiation phase array includes phase shifters.

26. The system of claim 23 wherein said radiation phase array includes optical amplifiers.

27. The system of claim 1 wherein said group of multiple interference patterns includes at least one interference pattern having at least one interference order.

28. The system of claim 1 wherein at least one of said multiple radiation paths includes an attenuator.

29. The system of claim 1 wherein said one output includes a directional coupler and a phase shifter arranged to subtract the intensities of the interference orders of said one interference pattern.

30. The system of claim 1 wherein said one output includes phase shifter and directional coupler.

31. An optical system for modulating, switching, and routing comprising:

(a) at least one first input;

(b) at least one second input; and (c) at least one interference device;

(d) at least one selecting device including a differential receiving terminal and at least one output;

(e) said first input being arranged to receive signal radiation pulses and to direct each of said signal radiation pulses toward at least one signal radiation path;

(f) said second input arranged to receive control radiation pulses and to direct each of said control radiation pulses toward at least one control radiation path;

(g) said one interference device being arranged to receive, from said one signal radiation path, said signal radiation pulses at signal arrival times in which said signal radiation pulses arrive to said one interference device, and to receive from said one control radiation path, said control radiation pulses at control arrival times in which said control radiation pulses arrive to said one interference device, and to produce an interference pattern which corresponds to said signal arrival times and said control arrival times;

(h) said selecting device being arranged to receive, at said differential receiving terminal, at least part of said interference pattern for selectively emitting output radiation pulses from said one output according to said signal arrival times and said control arrival times.

* * * * *

UNITED STATES PATENT AND TRADEMARK OFFICE
CERTIFICATE OF CORRECTION

PATENT NO. : 6,603,904 B1
DATED : August 5, 2003
INVENTOR(S) : Shahar, Arie

It is certified that error appears in the above-identified patent and that said Letters Patent is hereby corrected as shown below:

<u>Title page,</u>
Item [73], Assignee, name and address should read as follows:
-- Prima Luci, Inc., White Plains, NY --

Signed and Sealed this

Seventh Day of September, 2004

JON W. DUDAS
*Director of the United States Patent and Trademark Office*